United States Patent
Nanami

(10) Patent No.: US 6,814,506 B2
(45) Date of Patent: Nov. 9, 2004

(54) METHOD OF DENSITY CORRECTION IN HEAT DEVELOPING APPARATUS AND HEAT DEVELOPING APPARATUS CAPABLE OF DENSITY CORRECTION

(75) Inventor: Shoji Nanami, Kanagawa (JP)

(73) Assignee: Fuji Photo Film Co., Ltd., Kanagawa (JP)

(\*) Notice: Subject to any disclaimer, the term of this patent is extended or adjusted under 35 U.S.C. 154(b) by 0 days.

(21) Appl. No.: 10/400,586

(22) Filed: Mar. 28, 2003

(65) Prior Publication Data

US 2003/0219248 A1 Nov. 27, 2003

(30) Foreign Application Priority Data

Mar. 29, 2002 (JP) ...................................... P2002-097089

(51) Int. Cl.[7] .............................................. G03D 13/00

(52) U.S. Cl. ........................ 396/569; 396/570; 396/575

(58) Field of Search ................................ 396/567–570, 396/575; 355/27–30, 400, 405; 219/216; 250/318, 319

(56) References Cited

U.S. PATENT DOCUMENTS 5,014,123 A * 5/1991 Imoto ........................ 358/506
6,072,513 A 6/2000 Agano
6,377,358 B1 * 4/2002 Hayasaki et al. ........... 358/296

FOREIGN PATENT DOCUMENTS

JP 9-307767 11/1997

\* cited by examiner

*Primary Examiner*—D. Rutledge
(74) *Attorney, Agent, or Firm*—Sughrue Mion, PLLC

(57) ABSTRACT

A method of density correction in a heat developing apparatus of which photothermographic recording material is thermally developed by light or heat application, comprising the steps of outputting a density correcting chart for setting density correcting conditions, measuring the image densities of the density correcting chart with a densitometer using a monochromatic light source, and correcting density correcting conditions for image recording in the heat developing apparatus based on the measured densities, wherein the density correcting conditions are corrected by using only the densities of low to middle density areas out of the densities of low to high density areas as measured with the built-in densitometer and corrected based on the density correcting chart.

10 Claims, 11 Drawing Sheets

FIG. 8 (a)

| | DENSITY MEASURED BY BUILT-IN DENSITOMETER | | |
|---|---|---|---|
| | Di | xi | yi |
| 0 | 18 | 0 | 0 |
| 1 | 19 | 18 | 72 |
| 2 | 19 | 21 | 84 |
| 3 | 21 | 25 | 100 |
| 4 | 23 | 30 | 120 |
| 5 | 26 | 35 | 140 |
| 6 | 29 | 41 | 164 |
| 7 | 35 | 48 | 192 |
| 8 | 41 | 56 | 224 |
| 9 | 50 | 66 | 264 |
| 10 | 61 | 78 | 312 |
| 11 | 73 | 91 | 364 |
| 12 | 89 | 107 | 428 |
| 13 | 108 | 126 | 504 |
| 14 | 129 | 148 | 592 |
| 15 | 155 | 174 | 696 |
| 16 | 181 | 204 | 816 |
| 17 | 207 | 240 | 960 |
| 18 | 233 | 282 | 1128 |
| 19 | 256 | 331 | 1324 |
| 20 | 279 | 389 | 1556 |
| 21 | 300 | 457 | 1828 |
| 22 | 318 | 537 | 2148 |
| 23 | 359 | 1023 | 4092 |
| 24 | | | |
| 25 | | | |

FIG. 8 (b)

| VISUAL DENSITIES (PARAMETERS) | | CALCULATION OF SENSITIVITY DIFFERENCE | |
|---|---|---|---|
| DVi | XVi | | XVi |
| 18 | 0 | | 0 |
| 21 | 18 | | 18 |
| 23 | 21 | | 21 |
| 26 | 25 | | 25 |
| 31 | 30 | | 30 |
| 36 | 35 | | 35 |
| 43 | 41 | | 41 |
| 52 | 48 | | 48 |
| 62 | 56 | | 56 |
| 76 | 66 | | 66 |
| 93 | 78 | | 78 |
| 112 | 91 | | 91 |
| 134 | 107 | | 107 |
| 158 | 126 | | 126 |
| 180 | 148 | | 148 |
| 202 | 174 | | 238 |
| 223 | 204 | | 279 |
| 244 | 240 | | 329 |
| 263 | 282 | | 386 |
| 282 | 331 | | 453 |
| 300 | 389 | | 533 |
| 316 | 457 | | 626 |
| 329 | 537 | | 735 |
| 364 | 1023 | | 1401 |

FIG. 8 (c)

| DENSITIES AFTER SUBSTITUTION OF MEASURED VALUES | | |
|---|---|---|
| Di | xi | yi |
| 18 | 0 | 0 |
| 19 | 18 | 72 |
| 19 | 21 | 84 |
| 21 | 25 | 100 |
| 23 | 30 | 120 |
| 26 | 35 | 140 |
| 29 | 41 | 164 |
| 35 | 48 | 192 |
| 41 | 56 | 224 |
| 50 | 66 | 264 |
| 61 | 78 | 312 |
| 73 | 91 | 364 |
| 89 | 107 | 428 |
| 108 | 126 | 504 |
| 129 | 148 | 592 |
| 155 | 174 | 696 |
| 181 | 204 | 816 |
| 202 | 238 | 952 |
| 223 | 279 | 1116 |
| 244 | 329 | 1316 |
| 263 | 386 | 1544 |
| 282 | 453 | 1812 |
| 300 | 533 | 2132 |
| 316 | 626 | 2504 |
| ~~320~~ | ~~735~~ | ~~2940~~ |
| ~~364~~ | ~~1401~~ | ~~5664~~ |

| \multicolumn{3}{c}{DENSITIES AFTER SUBSTITUTION OF MEASURED VALUES} |||
|---|---|---|
| Di | xi | yi |
| 18 | 0 | 0 |
| 19 | 18 | 72 |
| 19 | 21 | 84 |
| 21 | 25 | 100 |
| 23 | 30 | 120 |
| 26 | 35 | 140 |
| 29 | 41 | 164 |
| 35 | 48 | 192 |
| 41 | 56 | 224 |
| 50 | 66 | 264 |
| 61 | 78 | 312 |
| 73 | 91 | 364 |
| 89 | 107 | 428 |
| 108 | 126 | 504 |
| 129 | 148 | 592 |
| 155 | 174 | 696 |
| 181 | 204 | 816 |
| 202 | 238 | 952 |
| 223 | 279 | 1116 |
| 244 | 329 | 1316 |
| 263 | 386 | 1544 |
| 282 | 453 | 1812 |
| 300 | 533 | 2132 |
| 316 | 626 | 2504 |
| ~~320~~ | ~~735~~ | ~~2940~~ |
| ~~364~~ | ~~1401~~ | ~~5604~~ |

| DENSITIES AFTER SUBSTITUTION OF 24TH DATA | | |
|---|---|---|
| Di | xi | yi |
| 18 | 0 | 0 |
| 19 | 18 | 72 |
| 19 | 21 | 84 |
| 21 | 25 | 100 |
| 23 | 30 | 120 |
| 26 | 35 | 140 |
| 29 | 41 | 164 |
| 35 | 48 | 192 |
| 41 | 56 | 224 |
| 50 | 66 | 264 |
| 61 | 78 | 312 |
| 73 | 91 | 364 |
| 89 | 107 | 428 |
| 108 | 126 | 504 |
| 129 | 148 | 592 |
| 155 | 174 | 696 |
| 181 | 204 | 816 |
| 202 | 238 | 952 |
| 223 | 279 | 1116 |
| 244 | 329 | 1316 |
| 263 | 386 | 1544 |
| 282 | 453 | 1812 |
| 300 | 533 | 2132 |
| 341 | 1023 | 4092 |
| | | |
| | | |

METHOD OF DENSITY CORRECTION IN HEAT DEVELOPING APPARATUS AND HEAT DEVELOPING APPARATUS CAPABLE OF DENSITY CORRECTION

BACKGROUND OF THE INVENTION

1. Field of the Invention

This invention relates to a density correction method applied to image formation in a heat developing apparatus in which a photothermographic material including a heat-developable light-sensitive material and a light- anf heat-sensitive recording material is exposed to laser light, etc. The present invention also relates to a heat developing apparatus capable of density correction according to the method.

2. Description of the Related Art

Reduction of waste liquid in the medical field has been keenly demanded for environmental conservation and space saving. Too meet the demand, it has been desired to establish techniques regarding heat-developable light-sensitive photographic materials for diagnosis and for photographic applications which can be efficiently exposed with a laser image setter or a laser imager to form a crisp black- anf-white image with high resolution and sharpness. Such heat-developable light-sensitive photographic materials will provide customers with a simpler and more environmentally friendly heat development system involving no wet chemical processing.

While there has been the same demand in the field of general image formation, images for diagnosis characteristically demand high quality in sharpness and graininess for precision and a cool black tone for facilitating diagnosis. From this viewpoint, hard copy systems using pigments or dyes which are currently available as general image forming systems, such as ink jet printers and electrophotographic apparatus, are not satisfactory as an output system for medical diagnostic imaging modalities.

Under these circumstances, a dry system recording apparatus involving no wet processing has recently engaged attention. Light- and heat-sensitive materials or heat-developable light-sensitive photographic films (hereinafter inclusively referred to as photothermographic recording materials) are used in such a recording apparatus. In the dry system recording apparatus, a photothermographic recording material is irradiated (scanned) with laser light to form a latent image in an image exposure section, brought into contact with a heating unit to perform heat development in a heat development section, and, after cooled, discharged out of the apparatus. The dry system is able to eliminate the waste liquid disposal problem associated with a wet system.

Thermal image formation systems using organic silver salts are described, e.g., in U.S. Pat. Nos. 3,152,904 and 3,457,075 and "Thermally Processed Silver Systems" by B. Shely in J. Sturge, V. Walworth and A. Shepp (eds.), *Imaging Processes and Materials Noblette's Eighth Edition*, 1996, 2. Photothermographic recording materials generally have a light-sensitive layer comprising a catalytic amount of a photocatalyst (e.g., silver halide), a reducing agent, a reducible silver salt (e.g., organic silver salt) and, if needed, a toning agent for controlling the tone of developed silver, all dispersed in a binder matrix. After imagewise exposure, the photothermographic recording material is heated to an elevated temperature (e.g., 80° C. or higher) to induce redox reaction between the silver halide or the reducible silver salt (acting as an oxidizing agent) and the reducing agent thereby to form a black silver image. The redox reaction is accelerated by the catalytic activity of the latent image of silver halide generated on exposure. Therefore, the black silver image is formed in the exposed area. Photothermographic recording materials and systems based on this principle have been disclosed in many documents, such as U.S. Pat. No. 2,910,377 and JP-B-43-4924. Commercially available medical imaging systems using a photothermographic recording material include Fuji Medical Dry Imager FM-DP L supplied by Fuji Medical Systems Inc.

Photothermographic recording materials using an organic silver salt are produced by coating a support with an organic solvent-based coating composition or an aqueous dispersion containing polymer particles as a main binder. Excluding the necessity of extra steps such as solvent recovery, the method using the aqueous dispersion is advantageous for equipment simplicity and suitability to large volume production.

In the above-described heat development systems, image data from an image data supply source are subjected to various image processings, such as sharpness processing and shading correction, to obtain data suited to an image recording method, and an image is recorded on a recording material according to the processed data. The apparatus for image recording is required to always output an image of prescribed density according to the image data sent from various image data supply sources, such as a diagnostic imaging modality and an image reading unit. For example, in an image forming apparatus which receives 10-bit digital data and forms an image according to the data, where 300 digital data correspond to a density of 1.2, the apparatus should always output an image of density 1.2 for 300 digital data.

However, there are variations among individual heat developing apparatus, and the recorded image density also varies depending on the environment in which the apparatus is installed. It is impossible for all the apparatus to output an image of a prescribed density based on a piece of image data supplied. Therefore, density correcting conditions are programmed into a general image recording apparatus so as to output an image having a prescribed density according to image data, whereby the image data are corrected (so-called calibration). Further, because an image recording apparatus changes its condition with the progress of recording or with time, it is difficult to obtain an image of a prescribed density in a stable manner for a long period of time. A laser recording apparatus, for instance, not only suffers from contamination, wear or like changes in its optical system in long-term use but is exposed to environmental changes, particularly in temperature. As a result, the density of the output image based on the same data varies with time. It is therefore necessary to periodically reset the density correcting conditions.

The density correcting conditions are set or reset as follows. A chart for density correction having patches of various densities is outputted from a heat developing apparatus. For example, a density correcting chart 500 shown in FIG. 5 is used. The chart 500 has 24 monochromatic patches of densities varying from 0 to 23. The density of each patch of the output is measured with a built-in densitometer 600 shown in FIG. 6. The built-in densitometer 600 basically comprises a light emitter 601 and a light sensor 602.

In the example shown in FIG. 6, a red LED is used as the emitter 601, and the sensor 602 is adapted to detect transmitted light. The sensor 602 detects light quantity of transmitted light 500*a* through the chart 500 (output) by the photo receptor 602*a*, converts the transmitted light quantity into electrical signals, and outputs the signals to a recording controller 37 (see FIG. 2).

In the built-in densitometer 600, the chart 500 is irradiated with a predetermined amount of light 601a. The sensor 602 receives light 500a transmitted through the chart 500 at the receptor 602a and outputs signals corresponding to the amount of detected transmitted light to the recording controller 37 (FIG. 2). The recording controller 37 processes the signals into densities, compares the densities (measured with the built-in densitometer 600) with the densities of the images which are to be recorded by the heat developing apparatus (i.e., the image densities corresponding to image data) to draw a calibration curve.

The problem is that built-in densitometers generally employed are designed to measure densities of wet-processed images formed by silver salt color formation. It follows that they fail to stably execute accurate measurements when applied to images formed by dye color formation as in thermo-recording. In detail, commonly used built-in densitometers generally have different sensitivities depending on wavelength. When used to measure the density of wet-processed images by silver salt color formation, the densitometer stably gives measurements in good agreement with visual densities because the developed color shows constant absorption irrespective of wavelength. Conversely, because the images by dye color formation show different absorptions with wavelength, the results from the built-in densitometer differ from the visual densities. For example, the densities of a wet-processed image by silver salt color formation and a dry-processed image by dye color formation, both having a visual density of 2.0, are 2.0 and 1.8, respectively, as measured with the same built-in densitometer. Like this, the measured density of dry-processed dye color images tends to be lower than the visual density. Moreover, the measurement results vary with the individual built-in densitometer.

For this reason, density correcting conditions which are set based on the chart density data as measured with a built-in densitometer are not accurate in performing imaging on a recording material relying on dye color formation. Such inaccurate setting fails to provide high quality images properly corresponding to the image data fed from an image data supply source. For example, the resulting recorded images are apt to have a higher density than programmed as a whole. The above-mentioned various problems occur in image recording using various recording materials for a dry system as well as the recording materials relying on dye color formation.

JP-A-9-307767 (corresponding to U.S. Pat. No. 6,072, 513) illustrates a previously-proposed method of density correction for settling these problems. This method enables setting proper density correcting conditions for a dry system image recording apparatus irrespective of differences among different built-in densitometers, whereby high quality images can be recorded in agreement with image data fed from an image data supply source. According to the method, the details of which will be described later, a built-in densitometer is calibrated for density correction by use of a reference chart having known densities corresponding to visual densities.

The method is based on the premise that a recording material has an unchanged color tone. Strictly speaking, however, the tone of a recording material undergoes change with time as hereinafter explained.

A photothermographic recording material used in a heat developing apparatus (sometimes referred simply to "recording material"), of which the details will be described later, shows instable and considerable scatter in red transmitted density in a high density area. The state-of-the-art built-in densitometers have very poor accuracy when used to measure densities in a high density area of this type of recording materials.

Further, since the tone change of the recording material is caused by change of the recording material formulation, change of the recording material itself with time, and the like, a change in tone of the recording material leads to an increased error of measurement with the built-in densitometer, resulting in a greater difference from the visual density. It has turned out that the difference from the visual density is conspicuous in a high density area. This is considered to be because, in a densitometer using a monochromatic light source (e.g., an LED or a laser), the quantity of light transmitted through a higher density area and detected by the receptor of the densitometer is smaller, which will lead to an exaggerated error of measurement. The resultant error of measurement gives rise to a serious problem particularly in diagnosis using low-to-high density areas, such as mammography.

SUMMARY OF THE INVENTION

The present invention provides, in its first aspect, a method of density correction in a heat developing apparatus in which a photothermographic recording material inclusive of a heat-developable light-sensitive material and a light-and heat-sensitive recording material is thermally developed by light or heat application, the method comprising having the heat developing apparatus output a density correcting chart for setting density correcting conditions, measuring the image densities of the density correcting chart with a densitometer built in the heat developing apparatus using a monochromatic light source, and correcting density correcting conditions for image recording in the heat developing apparatus based on the measured densities, wherein:

the density correcting conditions are corrected by using only the densities of low to middle density areas out of the densities of low to high density areas as measured with the built-in densitometer and corrected based on the density correcting chart.

According to the density correcting method of the invention, because the density data from a high density area are not adopted, there is no difference from the visual density even where a recording material showing large scatter in red transmitted density is used or even where a recording material has undergone a change in tone.

In a preferred embodiment of the first aspect of the invention, densities based on a standard tone curve of the photothermographic recording material are extrapolated into the high density area. According to this embodiment, the date of the high density area are corrected to agree with the visual densities so that density correction can be made to substantially eliminate differences from the visual densities.

In a still preferred embodiment of the first aspect of the invention, the density value of the high density area, which is extrapolated based on the standard tone curve of the photothermographic recording material, is adapted to be corrected by a user. This embodiment provides a user-friendly density correction method, allowing a user to alter the density of the high density area at his or her own discretion.

The present invention also provides, in its second aspect, a heat developing apparatus for thermally developing a photothermographic recording material inclusive of a heat-developable light-sensitive material and a light- and heat-sensitive recording material by light or heat application, which comprises (1) means for outputting a density correcting chart, (2) a built-in densitometer for measuring the image densities of the density correcting chart using a monochromatic light source, and (3) means for correcting the image density values of the built-in densitometer by comparison with known image densities supplied from the means for outputting a density correcting chart so as to agree with the known image densities, wherein the means for correcting the image density values uses only the densities of low to middle areas out of the densities of low to high density areas as measured with the built-in densitometer and corrected based on the density correcting chart.

According to the second aspect of the invention, differences from the visual density do not occur even in using a recording material showing large scatter in red transmitted density or even where a recording material has undergone a change in tone.

In a preferred embodiment of the second aspect of the invention, the heat developing apparatus further comprises (4) means for extrapolating density values of a high density area based on a standard tone curve of the photothermographic recording material into the high density area and (5) means for altering the density values in the high density area which allows a user to alter density values in the high density area at the discretion of the user. Because a user can add alteration to the density of the high density area at his or her own discretion, the apparatus according to this embodiment is very user-friendly.

In a conceivable embodiment of the method and the apparatus according to the invention, the monochromatic light source of the built-in densitometer is replaced with a white light source, such as a white lamp. Use of multicolor white light overcomes the red transmitted density scatter problem. That is, the measurements with the densitometer are not influenced by the change in tone of the photothermographic recording material.

In this case, it is recommended to insert an optical filter having such transmission characteristics as to bring agreement with vision between the white light source and the receptor of the densitometer. This configuration furnishes density values close to visual densities even where the recording material has undergone change in tone or even where the densitometer involves large measurement errors. The scatter of measurement values can further be lessened by increasing the luminance of the densitometer light source to intensely irradiate the high density area.

BRIEF DESCRIPTION OF THE DRAWINGS

FIGS. 8(A) to 8(C) show example 1 of density correcting calculations, in which (A) is a table of density values measured with the built-in densitometer, (B) is a table of visual density values (parameters), and (C) is a table of densities prepared in example 1.

DESCRIPTION OF THE PREFERRED EMBODIMENTS

The present invention will be described in detail with particular reference to a laser recording apparatus and a laser recording method as preferred embodiments for implementing the present invention. The accompanying drawings will be referred to.

Figure 1:
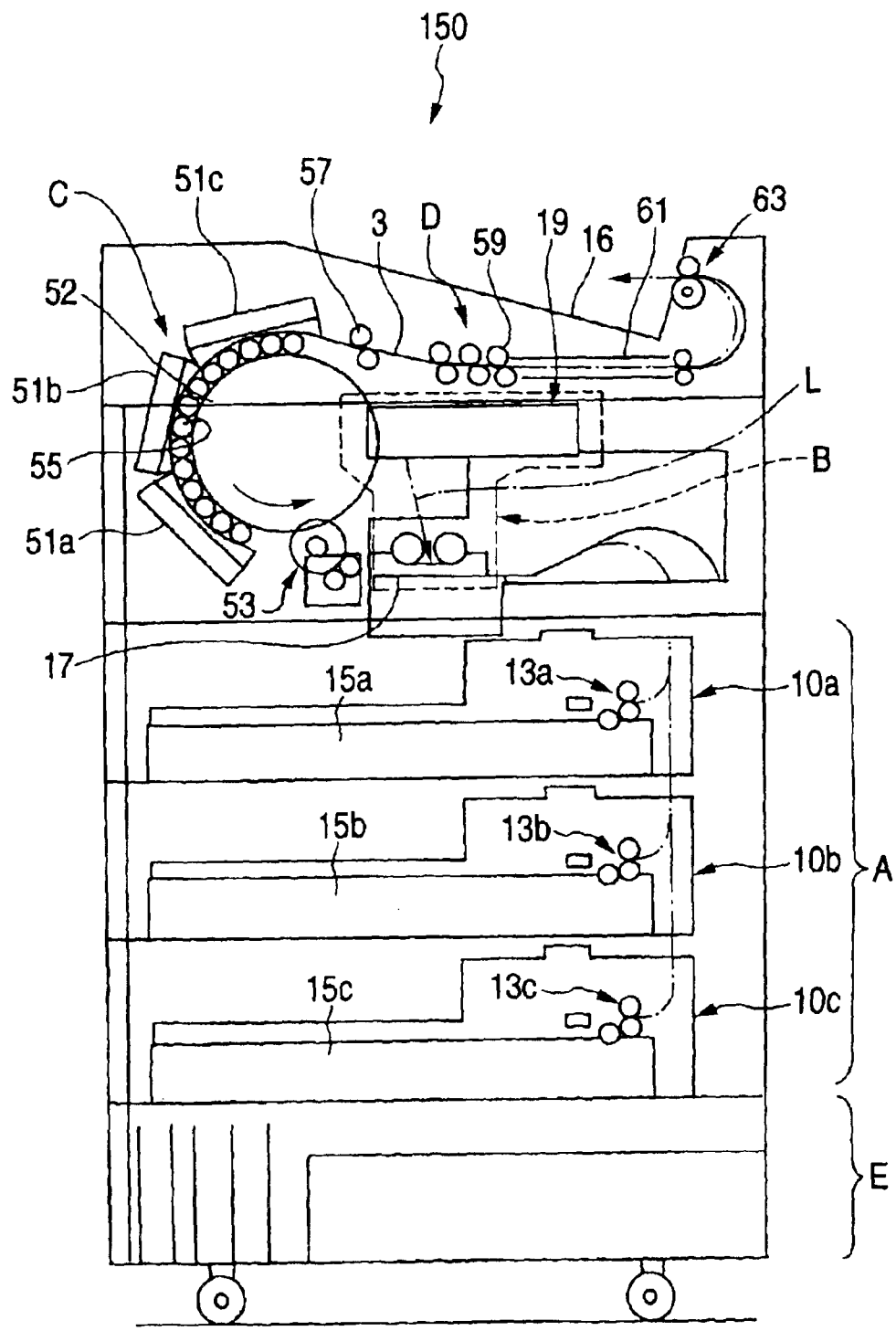
FIG. 1 schematically illustrates a heat development recording apparatus equipped with a laser recording unit.

FIG. 1 schematically illustrates a heat development recording apparatus 150 equipped with a laser recording unit 100. The heat development recording apparatus 150 is configured to expose a photothermographic recording material needing no wet processing by scanning with a laser beam to form a latent image, thermally develop the latent image, and cool the developed photothermographic recording material to room temperature. Accordingly, the apparatus 150 is basically divided into, in the order of flow, a photothermographic recording material feed section A, an imagewise exposure section B (i.e., the laser recording unit 100), a heat development section C, and a cooling section D. The apparatus 150 also has transfer members for carrying the photothermographic recording material, which are provided at necessary positions connecting the sections A to D, and a power source/control section D for driving and controlling each section. The apparatus 150 has the power source/control section E in the bottom, the photothermographic recording material feed section A above the section E, and the imagewise exposure section B, the heat development section C, and the cooling section D above the section A. The imagewise exposure section B and the heat development section C adjoin. According to this configuration, since the steps of exposure and heat development can be performed within a short distance, the pass length a photothermographic recording material travels is minimized, and the time for output can be reduced. The configuration also makes it possible to carry out both the exposure step and the heat development step on the same photothermographic recording material simultaneously.

The photothermographic recording material which can be processed in the invention includes heat-developable light-sensitive materials and light- and heat-sensitive recording materials. The heat-developable light-sensitive materials are recording materials adapted to be imagewise exposed to light (e.g., a laser beam) and thermally developed to develop color. The light- and heat-sensitive recording materials are recording materials adapted to be imagewise exposed to light (e.g., a laser beam), developed by heat or by laser light in the heat mode to develop color, and irradiated with light for image fixation. The details of these recording materials will be described infra.

The photothermographic recording material feed section A operates to feed individual pre-cut sheet of the recording material to the downstream imagewise exposure section B. The section A has three loading units 10a, 10b, and 10c each equipped with feed roller pairs 13a, 13b, and 13c, respectively, carriage rollers (not shown), and carriage guides (not shown). The loading units 10a, 10b, and 10c each contain magazines 15a, 15b, an 15c, respectively, in which photothermographic recording materials of different sizes (JIS B4, 356 mm×432 mm, etc.) are put. A user can choose the size and the facing mode (faceup or facedown) of the recording material.

The photothermographic recording materials are available in packages containing, e.g., a stack of 100 cut sheets usually wrapped in a bag or tied with a band. The stack of sheets is put in each magazine, and the magazines are loaded in the loading units of the section A.

In the imagewise exposure section B, the photothermographic recording material fed from the feed section A is scanned with a light beam L in the fast scan direction while conveyed in the slow scan direction (perpendicular to the fast scan direction) to form a latent image.

The heat development section C operates to heat treat the photothermographic recording material having the latent image to conduct heat development. The developed material is cooled in the cooling section D and delivered to an output tray 16.

Figure 2:
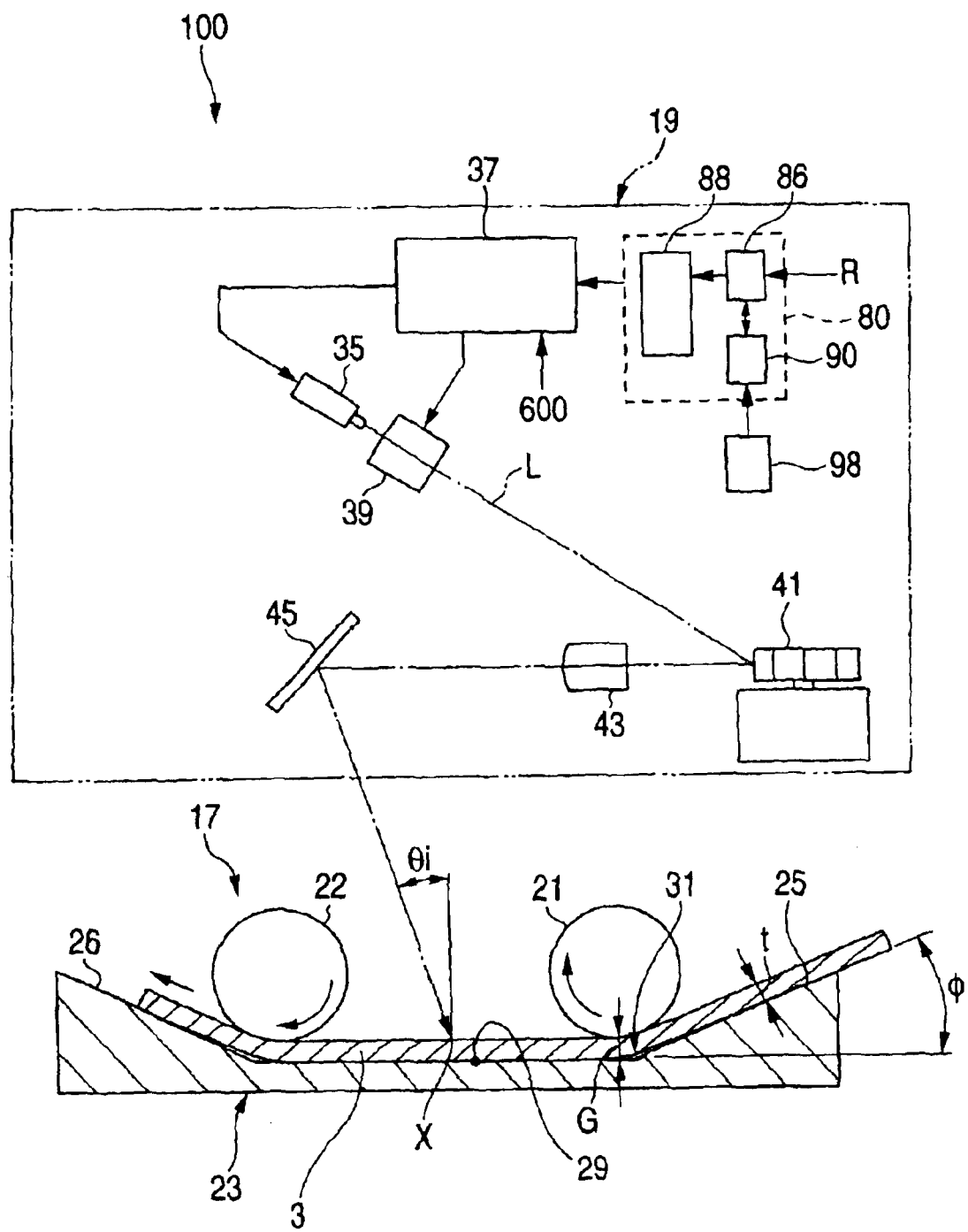
FIG. 2 schematically illustrates a slow scan part and a scan exposure part of the laser recording unit.

The imagewise exposure section B, which is a laser recording unit 100, will be described in more detail by referring to FIG. 2. FIG. 2 schematically shows the laser recording unit 100 composed of a slow scan part and a scan exposure part. The imagewise exposure section B (laser recording unit 100) is a section where the photothermographic recording material is scanned with a light beam L. The section B has a slow scan part 17 and a scan exposure part (laser irradiation means) 19. The slow scan part 17 has a flopping-preventive mechanism for conveying the photothermographic recording material in the slow scan direction while preventing the material from flopping. The scan exposure part 19 scans the photothermographic recording material with a laser beam with output controlled according to separately prepared image data. During the fast scanning, the photothermographic recording material is forwarded in the slow scan direction by the slow scan part 17.

The slow scan part 17 has a guide plate 23 supporting the moving photothermographic recording material 3 and a pair of drive rollers 21 and 22 which face the guide plate 23 and are disposed on opposite sides of the fast scan line with their axes substantially parallel to the fast scan line. The guide plate 23 is made up of a pair of slope portions 25 and 26 which are disposed in the upstream and the downstream of the paired drive rollers 21 and 22 and a flat portion 29 disposed between the two slope portions. The slope portions 25 and 26 cause the photothermographic recording material 3 to be bent around part of the drive rollers 21 and 22, and the flat portion 29 keeps the moving photothermographic recording material 3 in flat contact therewith, receiving the elastic repulsion of the bent recording material 3.

The slope portions 25 and 26 each connect to the flat portion 29 making a slope at an angle φ of up to 45° with the flat portion 29. While the example shown in FIG. 2 has a slope portion in both the upstream and the downstream of the flat portion 29, it suffices that a slope (angle φ>0°) is provided in at least the upstream of the flat portion 29.

The drive roller 21 is provided on the boarder (bend) 31 between the slope portion 25 and the flat portion 29. The drive roller 21 is adapted to be rotated clockwise in FIG. 2 by driving force transmitted from a driving unit, e.g, a motor (not shown) shown) via a gear, a belt or a like transmission member. The drive roller 22, which is configured similarly to the drive roller 21, is provided on the boarder between the slope portion 26 and the flat portion 29 for discharging the exposed photothermographic recording material 3.

Figure 3:
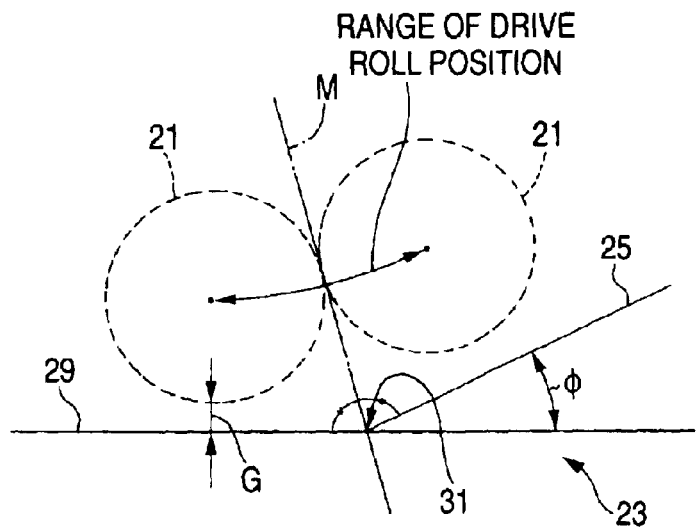
FIG. 3 is a schematic enlarged side view showing the position of a drive roller with respect to a guide plate.
Figure 4:
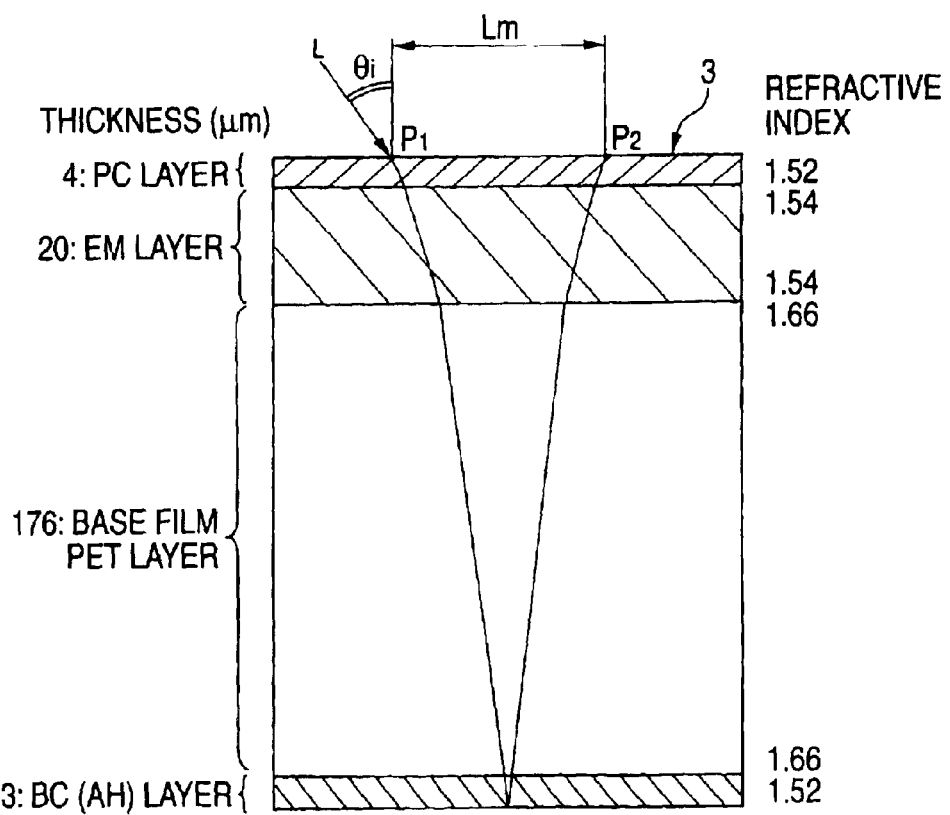
FIG. 4 shows the layer structure of a photothermographic recording material.
Figure 5:
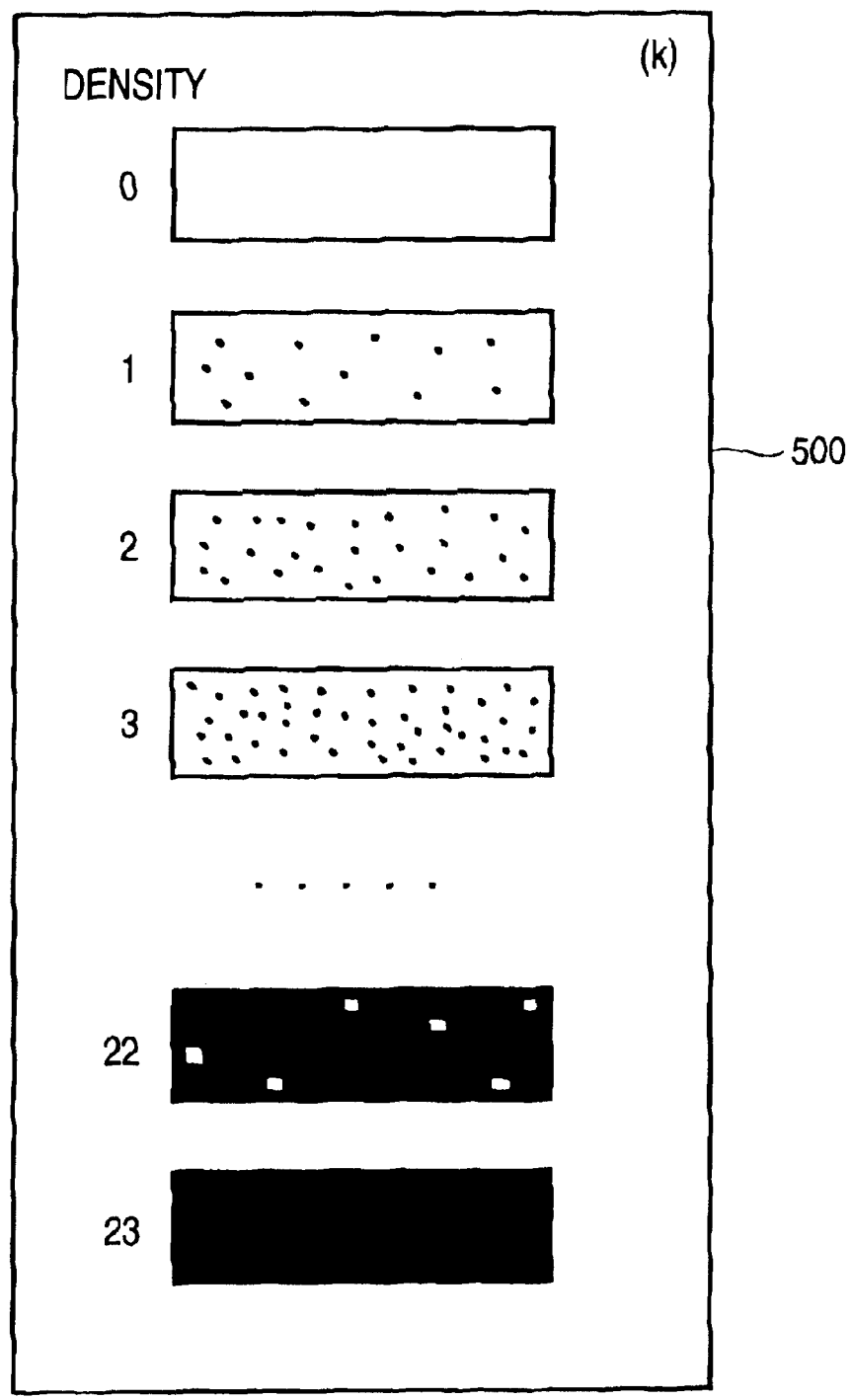
FIG. 5 is an example of a density correcting chart outputted by a heat developing apparatus.

A preferred position of the drive roller 21 with respect to the guide plate 23 will be described by referring to the schematic enlarged side view shown in FIG. 3. The same description applies to the drive roller 22. As shown in FIG. 3, it is preferred that the drive roller 21 be positioned such that the circumference of the drive roller 21 is in contact with or intersecting with line M which bisects the interior angle of the guide plate 23 (180°-φ) formed between the slope portion 25 and the flat portion 29 and passes the bend point of the guide plate 23 (i.e., the boarder 31 between the slope portion 25 and the flat portion 29). The left and right arrow in FIG. 3 indicates the range in which the axis of the driving roller 21 is located. The relationship between the diameter of the drive roller 21 and the length of the guide plate 23 is not particularly limited.

The drive roller 21 is positioned to leave a prescribed gap G between its periphery and the guide plate 23. The gap G is preferably in a range of from 1 to 10 times the thickness t of the photothermographic recording material 3 ($t \leq G \leq 10t$).

The photothermographic recording material 3 enters the slow scan part 17 from the upstream end of the slope portion 25 and then goes through between the guide plate 23 and the drive roller 21. Since the slope portion 25 and the flat portion 29 of the guide plate 23 make an angle φ, the photothermographic recording material 3 bends when moving from the slope portion 25 to the flat portion 29 and develops elastic repulsion, by which a prescribed frictional force occurs between the recording material 3 and the drive roll 21. As a result, the driving force of the drive roller 21 is securely transmitted to the recording material 3 to forward the recording material 3.

Since the gap G between the clockwise rotating drive roller 21 and the guide plate 23 ranges from t to 10t (t=thickness of the recording material 3) as stated above, conveyance of the photothermographic recording material 3 being entering between the drive roller 21 and the guide plate 23 is not influenced by, for example, vibration of the drive roller 21 caused by external disturbance. External disturbance, if any, will be absorbed by the elasticity (through-thickness displacement) of the photothermographic recording material 3.

Similarly, when the photothermographic recording material 3 is delivered out of the slow scan part 17 by the drive roller 22, the elastic repulsion of the recording material 3 generated by bending develops a prescribed frictional force against the drive roller 22, whereby the recording material 3 is securely conveyed.

Since the recording material 3 presses itself onto the flat portion 29 because of its elastic repulsion, it is prevented from vertically flopping on the flat portion 29. Thus, the recording material 3 between the two drive rollers is exposed with a laser beam with satisfactory pattern position accuracy.

The scan exposure part 19 deflects a laser beam L modulated according to image signals in the fast scan direction and makes the beam incident on a predetermined recording position X as shown in FIG. 2. The scan exposure part 19 comprises a laser light source 35 which emits laser light in a narrow wavelength range (wavelength: 350 to 900 nm) according with the spectral sensitivity characteristics of the photothermographic recording material 3, a recording controller 37 which drives the laser light source 35, a cylindrical lens 39, a polygon mirror 41 as a light deflector, an fθ lens 43, and a cylindrical mirror 45 for deflecting the beam downward.

According to necessity, the scan exposure part 19 can have various known members used in beam scanning exposure optical systems, such as a collimator lens and a beam expander used for beam shaping, an optical face tangle error correction system, and a mirror for optical path adjustment. The recording beam diameter on the photothermographic recording material 3 is set between 50 μm and 200 μm. In particular, the recording beam diameter in the slow scan direction is preferably small within the above range to reduce the interference region.

Exposure for image recording is performed by pulse width modulation. The recording controller 37 drives the laser light source 35 in pulse width modulation according to the image signals to have the light source 35 emit a pulse-width modulated beam according to the image signals. The laser beam L from the light source 35 is deflected in the fast scan direction by the polygon mirror 41, adjusted to be focused on the recording position X by the fθ lens 43, and directed by the cylindrical mirror 45 so as to be incident on the recording position X at a prescribed incidence angle θi. That is, the laser beam is incident on the photothermographic recording material 3 at an incidence angle θi of 4 to 15° (an angle of inclination from the normal to the photothermographic recording material 3 toward the slow scan direction).

The heat development section C operates to heat an imagewise exposed photothermographic recording material of the type designed to be heat treated for achieving heat development. Back to FIG. 1, the section C has a plurality of plate heaters 51a, 51b, and 51c which are capable of elevating their temperature to a processing temperature for the photothermographic recording material 3, have a concave surface, and are arranged in series in the moving direction of the photothermographic recording material 3 so that the plate heaters may provide an arc as a whole.

The photothermographic recording material 3 is transferred in contact with the concave surface of the plate heaters. As a means for transferring the recording material 3, the heat development section C has a feed roller 53 and a plurality of press rollers 55 which also serve for heat conduction from the plate heaters to the recording material 3. The press rollers 55 are in contact with a drum 52 and rotate with the rotation of the drum 52. The press rollers 55 include metal rollers, resin rollers, and rubber rollers. The photothermographic recording material 3 is prevented from bunching while sliding because it is pressed onto the plate heaters 51a, 51b, and 51c by the press rollers 55. Discharge rollers 57 are provided at the downstream end of path in the heat development section C for transferring the photothermographic recording material to the cooling section D.

The plate heater with a concave surface, which is given as an example of the heating element, can be replaced with a plate heater with a flat surface or a heating drum which is used in combination with an endless belt, and a separation claw.

The photothermographic recording material 3 discharged from the heat development section C is cooled in the cooling section D with care not to cause wrinkling or curling. The recording material 3 discharged from the cooling section D is led in between guide plates 61 by pairs of cooling rollers 59 provided in the path and discharged through a pair of discharge rollers 63 onto an output tray 16.

A plurality of cooling roller pairs 59 are arranged in the cooling section D so as to make a path for the photothermographic recording material 3 with a desired curvature radius R. This means that the recording material 3 moves drawing a curve at a constant curvature radius R until it is cooled down to or below its glass transition point. By intentionally curving the recording material in this way, the recording material is prevented from excessive curling before it is cooled to or below the glass transition point. Once the photothermographic recording material has been cooled to or below the glass transition point, no further curling occurs. As a result, the output shows a constant amount of curl with no variation.

The cooling rollers 59 and the interior atmosphere of the cooling section D are under temperature control. Such temperature control minimizes density variation due to changes between conditions immediately after the start-up of the heat development recording apparatus 150 and conditions after sufficient running of the apparatus 150.

For the details regarding image recording techniques on the photothermographic recording material 3, reference can be made in WO95/31754 and WO95/30934.

Conditions for correcting density values measured with a densitometer can be set in accordance with the method disclosed in JP-A-9-307767 as follows. In FIG. 2, numeral 80 indicates an image processor having a density correction section 86, an image processing section 88, and a measured value correction section 90. Numeral 98 is an input means. A sheet having a reference chart for densitometer calibration is prepared. The sheet has a reference chart recorded with the same dye as used for image recording at known densities in agreement with visual densities. An operator puts the laser recording unit 100 in density correcting condition setting mode (the mode for setting conditions for correcting the measured values of the densitometer), has the built-in densitometer, which is to be calibrated, measure the image density of the patches of the reference chart, and inputs the results of measurement and the known image densities of the reference chart by the input means 98. The input means 98 and means for issuing the command for the density correcting condition setting mode are typically an operating panel of the laser recording unit 100. The results of measuring the density correcting chart under the density correcting conditions are also inputted through the input means 98.

The density measurements and the known density data of the reference chart are sent to the measured value correction section 90. The measured value correction section 90 compares the data furnished and sets the conditions for correcting the values from the densitometer so as to agree with the known densities of the reference chart. The set conditions are stored in the memory of the image processing section 88 in the form of correction functions, tables, etc.

In the laser recording unit 100, the measured densities of the density correcting chart inputted through the input means 98 are corrected by the measured value correction section 90 according to set conditions for correcting measured values. The corrected values are used to set density correcting conditions in the density correction section 86. According to this method, proper density correcting conditions can be set for an individual recording apparatus for imaging by dye color formation irrespective of the differences among different densitometers. As a result, high quality images with densities in good agreement with image data can be produced stably.

The built-in densitometer uses a red LED (center wavelength: 660 nm) as a light source and measures red transmitted densities of a recording material. As previously mentioned, since the photothermographic recording material shows instable and considerable scatter in red transmitted density in a high density area, the state-of-the-art built-in densitometer has very poor measurement accuracy in a high density area. The present invention adopts the following method that solves this problem: the measured values of a high density area are not used to perform calculations for density correction because of their unreliability. That is, the high density data are deleted from the date on the chart (24-patch pattern) measured with the built-in densitometer. Since mere deletion of the data prohibits performing normal calculations, the deletion is made up for by substitute data by the following strategy.

The present inventor has noted the fact that the photothermographic recording material as used in the present invention, shows large scatter in red transmitted density in a high density area but has small scatter in its standard tone curve (visual density) that agrees with visual densities. Based on this fact, the measured density values in a high density area (e.g., densities of 2.0 or higher) as obtained with the built-in densitometer are substituted by the standard tone curve of the recording material.

Figure 7:
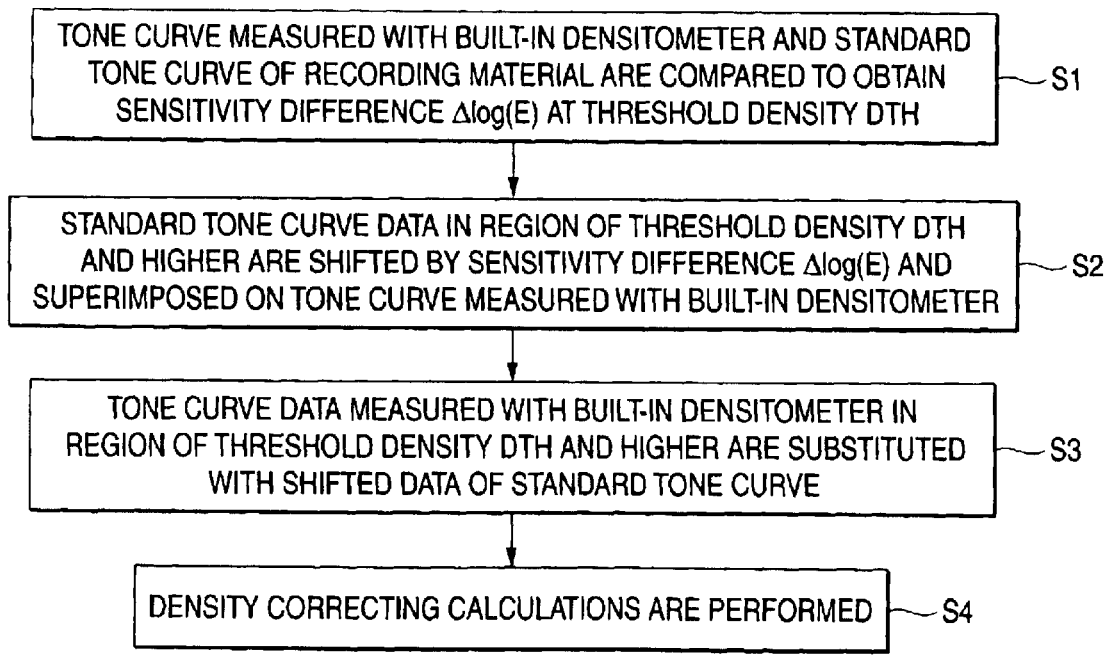
FIG. 7 is a flow chart describing the procedures for data substitution.

FIG. 7 presents a flow chart for the data substitution. In a first step (S1), a tone curve measured with the built-in densitometer and a standard tone curve of the recording material are compared to obtain a sensitivity difference $\Delta\log(E)$ at a threshold density $D_{th}$. In a second step (S2), the standard tone curve data in the region of the threshold density $D_{th}$ and higher are shifted by the sensitivity difference $\Delta\log(E)$ and superimposed on the tone curve measured with the built-in densitometer. In a third step (S3), the tone curve data measured with the built-in densitometer in the region of the threshold density $D_{th}$ and higher are substituted with the shifted data of the standard tone curve. In a fourth step (S4), density correcting calculations are performed according to the following way of thinking.

Figure 6:
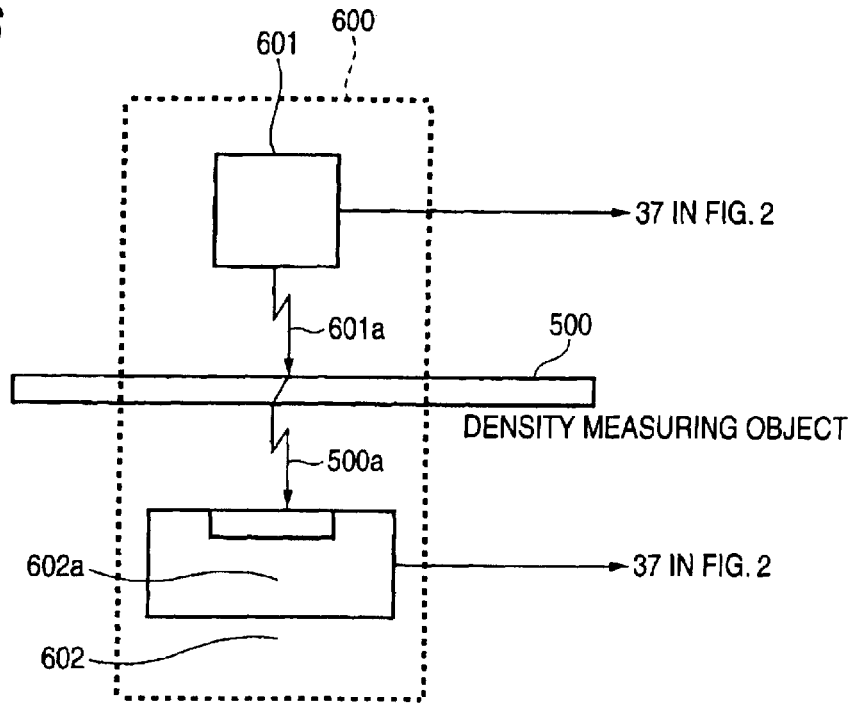
FIG. 6 shows the basic configuration of a built-in densitometer of a heat developing apparatus.

FIG. 8 presents example 1 of density correcting calculations, in which (A) is a table of density values measured with the built-in densitometer 600 shown in FIG. 6, (B) is a table of visual density values (parameters), and (C) is a table of densities which was prepared in example 1. In the tables, Di represents densities measured with the built-in densitometer; xi and XVi represent 24-patch image data; yi represents 24-patch tone output data; and DV represents visual densities.

In the measured density values of FIG. 8A, density 200 is taken as a threshold visual density $D_{th}$ (parameter). The maximum measured density that does not exceed the threshold density $D_{th}$=200 is:

$DR_{max}$=181, which corresponds to $xR_{max}$=204.

On the other hand, in the visual densities of FIG. 8B, the maximum measured density that does not exceed the threshold density $D_{th}$=200 is DV=180→$XV_{max}$=148.

The $XV_{max}$ for a visual density DV=181 that does not exist in FIG. 8B is obtained by interpolation between XV=148 and the next density XV=174. The interpolation gives $XV_{max}$=149 for DV=181, which is an intermediate between 148 and 174 obtained by quadratic B-spline interpolation because:

$i=15; i<24; i++$ $XVi = XVi \times (xR_{max}/XV_{max})$

In this way, the data of the built-in densitometer in the range of $D_{th}$ and hither are substituted with the visual density data. That is, the built-in densitometer's data up to (D16, x16, y16)=(181, 204, 816) are left, and the other built-in densitometer's data exceeding $D_{th}$ are replaced with the visual density data of (DV15, XV15, XV15×4)=(202, 236, 956) and higher.

Figure 9:
FIGS. 9(A) and 9(B) show substitution of the $24^{th}$ point data, wherein A is a table before substitution, and B is a table after substitution.

The density data after substitution are shown in Table C. Because Table C contains 26 pieces of data (two pieces of data added), D giving (D, 1023) is obtained from the equation of a straight line passing two points, (D23, x23) and (D25, x25), and the highest point (24th point) is obtained by approximation by substituting (D23, x23, y23) with (D, 1023, 1023×4) thereby determining a set of 24 points. FIG. 9 shows the substitution of the 24th point data, wherein C is the table before substitution, and D is the table after substitution. It is understood that the 24th piece of data has been altered by the above-described approximation.

Figure 10:
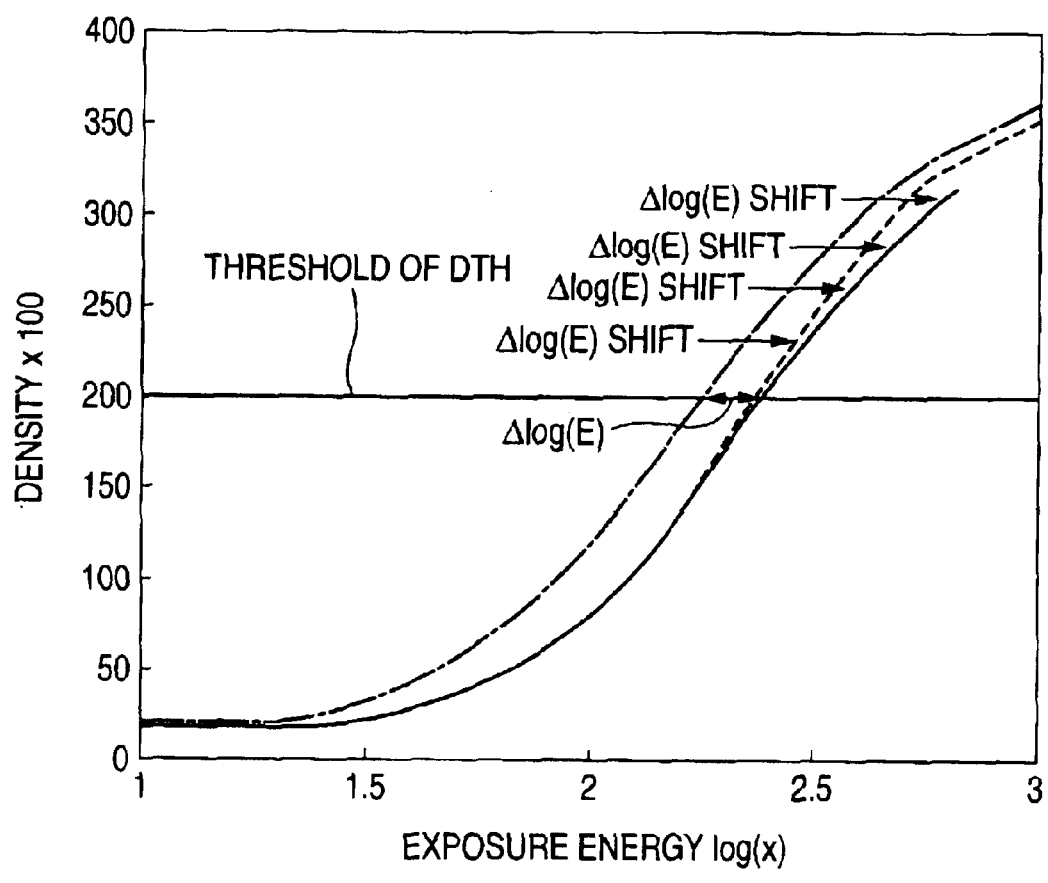
FIG. 10 shows exposure energy vs. density plots prepared by the methods of FIGS. 8 and 9.

FIG. 10 shows curves of exposure energy vs. density plots prepared by the methods of FIGS. 8 and 9. In FIG. 10, density (x100) is plotted as ordinate and exposure energy x(log(x)) as abscissa. The dotted line is densities measured with the built-in densitometer; the chain line is visual densities; and the solid line is the plot after data substitution. The threshold visual density $D_{th}$ is set at density=200. The part of the plot of the solid line at and below the threshold value $D_{th}$ is the values measured with the built-in densitometer, and the part of the plot above the $D_{th}$ is the visual densities, provided that the vidual density data above the $D_{th}$ have been shifted from the visual density plot to the direction indicated by the arrows by the sensitivity difference $\Delta\log(E)$.

FIG. 11 presents another example (example 2) of density correcting calculations, in which (A) is a table of density values measured with the built-in densitometer 600 shown in FIG. 6, (B) is a table of visual density values (parameters), and (C) is a table of densities which was prepared in example 2. In the tables, Di represents densities measured with the built-in densitometer; xi and XVi represent 24-patch image data; yi represents 24-patch tone output data; and DVi represents visual densities. Calculations are carried out in the following sequence.

Threshold visual density $D_{th}$=200 (parameter)

$DR_{max}$=192

$xR_{max}$=107

DV=192→$XV_{max}$=162 (the intermediate between 148 and 174 obtained by quadratic B-spline interpolation)

Reason:

$i=15; i<24; i++>$ $XVi = XVi \times (xR_{max}/XV_{max})$

The data of the built-in densitometer in the range of $D_{th}$ and hither are substituted with the visual density data. That is, the built-in densitometer's data up to (D12, x12, y12)=(192, 107, 428) are left, and the other built-in densitometer's data from $D_{th}$ and up are replaced with the visual density data of (DV15, XV15, XV15×4)=(202, 115, 460) and higher.

Figures 11A, 11B, 11C:
FIGS. 11(A) to 11(C) show example 2 of density correcting calculations, in which (A) is a table of density values measured with the built-in densitometer, (B) is a table of visual density values (parameters), and (C) is a table of densities prepared in example 2.

Because the number of data is 22 (two pieces of data are missing), the same data as (DV21, XV21, XV21×4) are added to make up for the missing two pieces of data. FIG. 11C shows the thus obtained density data.

Figure 12:
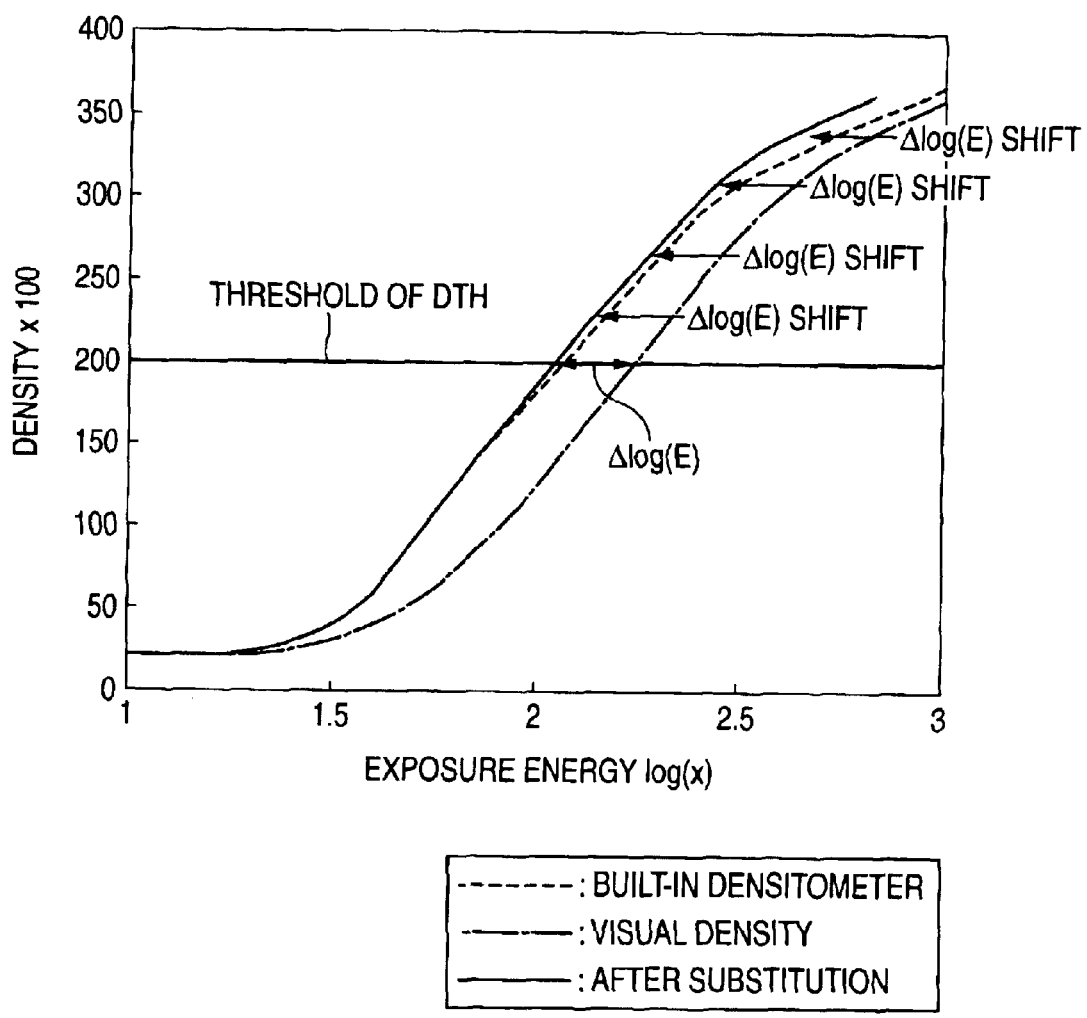
FIG. 12 shows exposure energy vs. density plots prepared by the method of FIG. 11.

FIG. 12 shows the plot of exposure energy vs. density as obtained by the method of FIG. 11. In FIG. 12, density (x100) is plotted as ordinate and exposure energy ×(log(x)) as abscissa. The dotted line is densities measured with a built-in densitometer; the chain line is visual densities; and the solid line is the plot after data substitution. The threshold visual density $D_{th}$ is set at density=200. The part of the plot of the solid line at and below the threshold value $D_{th}$ is the values measured with the built-in densitometer, and the part of the plot above the $D_{th}$ is the visual densities, provided that the vidual density data above the $D_{th}$ have been shifted from the visual density plot to the direction indicated by the arrows by the sensitivity difference $\Delta\log(E)$.

There is another conceivable way of thinking applicable to density correction in a high density area. Where there is observed a large variation in shoulder tone due to lot-to-lot variation or changes of types of recording materials, the densities in a high density area also varies. In such cases, it would be convenient for a user if he or she can raise or lower the densities in the shoulder tone of a reference recording material by selecting an input key within a range of +4 to −3. This correction function is particularly effective for an experienced user.

Figure 13:
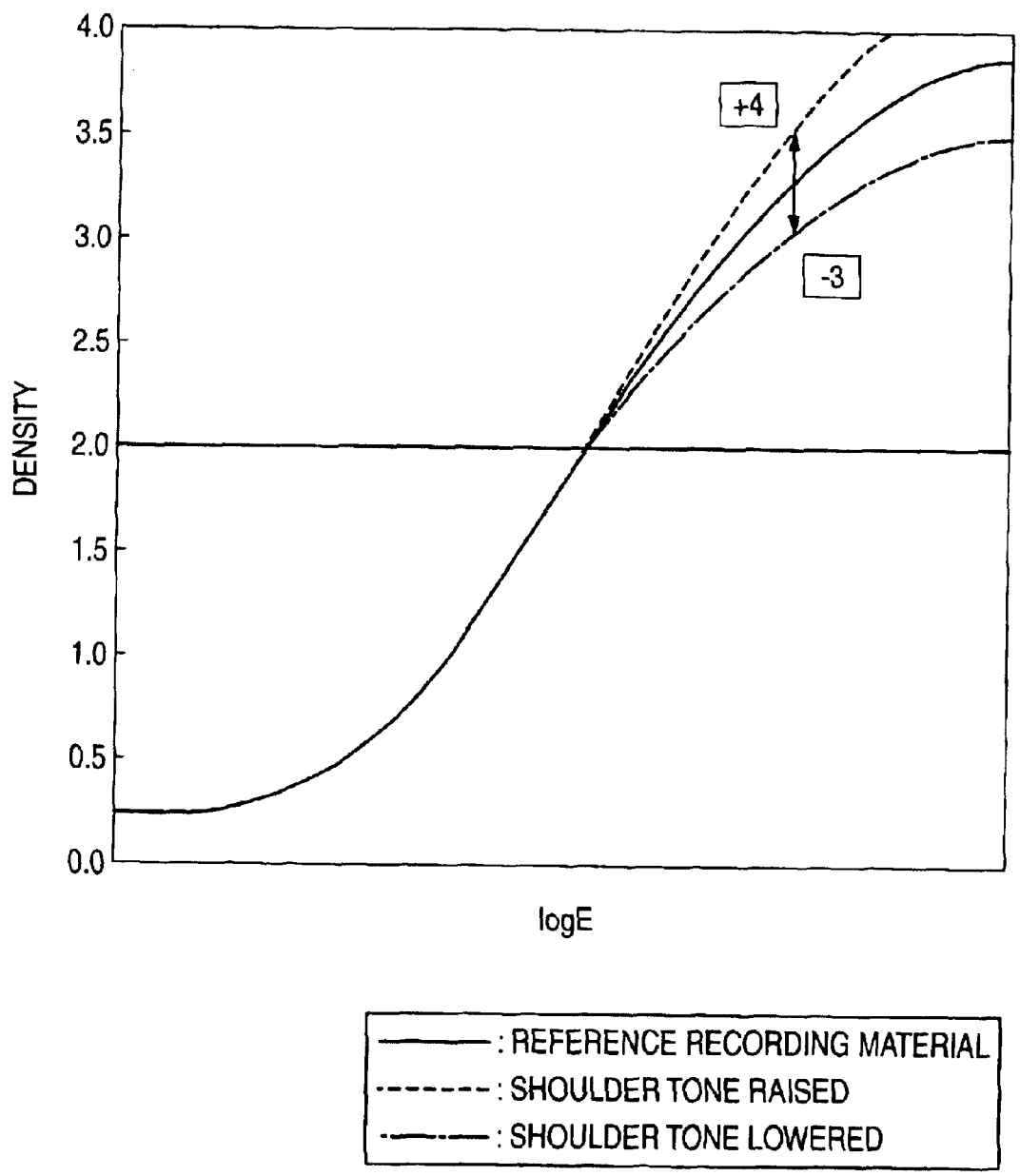
FIG. 13 shows density (ordinate) vs. exposure energy (abscissa) plots having the shoulder tone raised or lowered by a user through accessible means.

FIG. 13 shows density (ordinate) vs. exposure energy (abscissa) plots having the shoulder tone raised or lowered from the tone curve of a reference recording material. The dotted line is the plot with the shoulder tone raised; the chain line is the plot with the shoulder tone lowered; and the solid line is the plot of a reference recording material. A user can manually adjust the densities in the region exceeding the threshold density 2.0 within a range of from +4 to −3. For example, raising a density in that region by 4 from the reference value gives the dotted line, and lowering by 3 results in the chain line. The reason why the density adjustment is to be made within a range from +4 to −3 is that too many scales result in too small change of density per scale, which will make adjustment difficult. Within the range between +4 and −3, the density is changed from about +0.4 to −0.3, which will be convenient for a user to make a desired adjustment.

The photothermographic recording material which can be used in the present invention will now be described.

The organic silver salt used in the present embodiment is a silver salt which is relatively stable against light (light-insensitive) but functions as a silver ion donator to form a silver image when heated at 80° C. or higher temperatures in the presence of an exposed light-sensitive silver halide and a reducing agent. The organic silver salt includes arbitrary organic substances capable of supplying silver ions reducible by a reducing agent. Such light-insensitive organic silver salts are described in JP-A-10-62899 (para. Nos. 0048 to 0049), EP 0803764A1 (page 18, line 24 to page 19, line 37), EP 0962812A1, JP-A-11-349591, JP-A-2000-7683, and JP-A-2000–72711. Silver salts of organic acids, particularly long-chain fatty acids having 10 to 30 carbon atoms, especially 15 to 28 carbon atoms, are preferred. Suitable fatty acid silver salts include silver lignocerate, silver behenate, silver arachidate, silver stearate, silver oleate, silver laurate, silver caproate, silver myristate, silver palmitate, silver erucate, and mixtures thereof. In the present embodiment, it is preferred to use silver behenate at a content of 50 mol % or higher, particularly 85 mol % or higher, especially 95 mol % or higher, based on total organic silver salt.

The organic silver salt grains are not particularly limited in shape and include needles, rods, plates, and flakes. In the present embodiment, flaky organic silver salt grains are preferred. Short needles having an aspect ratio of 5 or smaller, rectangular parallelepipeds, cubes, and potato-like irregular shapes are also preferably used. These organic silver salt grains are characterized by less susceptibility to fogging on heat development as compared with long needles having an aspect ratio greater than 5. Grains having an aspect ratio or 3 or smaller are particularly preferred for improving mechanical stability of the coating film.

The term "flaky" in "flaky organic silver salt grains" as used in the present invention is defined as follows. An organic silver salt grain as observed under an electron microscope is approximated to a rectangular parallelepiped, the three sides of which are taken as a, b, and c in increasing order (c and b may be the same). A value b/a (=x) is calculated for about 200 grains to obtain an average x. Flaky grains are defined to have an x (average) equal to or greater than 1.5. Flaky grains having an x (average) of 1.5 to 30, particularly 2.0 to 20, are preferred. Incidentally, needle-like grains are grains having an x (average) of 1 or greater and smaller than 1.5.

In the flaky grains, "a" is regarded as a thickness of a tabular grains having a main plane defined by sides b and c. "a" preferably averages 0.01 to 0.23 µm, particularly 0.1 to 0.20 µm. "c/b" preferably averages 1 to 6, still preferably 1.05 to 4, particularly preferably 1.1 to 3, especially preferably 1.1 to 2.

The organic silver salt grains preferably have a monodisperse size distribution. The "monodisperse" state can be expressed in term of a percentage of a standard deviation of the minor or major axis length to the average minor or major axis length, respectively. The percentage is preferably 100% or less, still preferably 80% or less, particularly preferably 50% or less. The dimensions of the grains can be obtained from a transmission electron micrograph of a dispersion of the grains. The monodisperse state can also be expressed in terms of a percentage of a standard deviation of volume weighted average diameter of grains to the volume weighted average diameter (=coefficient of variation). The percentage is preferably 100% or less, still preferably 80% or less, particularly preferably 50% or less. The grain size (volume weighted average diameter) can be determined by irradiating a dispersion of organic silver salt grains with laser light and obtaining an autocorrelation function of the change of fluctuation of scattered light with time.

With respect to the methods of preparing and dispersing the organic silver salt used in the present embodiment, reference can be made in JP-A-10-62899, EP 0803764A1, EP 0962812A1, JP-A-11-349591, JP-A-2000-7683, and JP-A-2000-72711 cited supra and, in addition, JP-A-11-348228 to 348230, JP-A-11-203413, and Japanese Patent Application Nos. 2000-90093, 2000-195621, 2000-191226, 2000-213813, 2000-214155, and 2000-191226.

It is advisable that the system for preparing the organic silver salt dispersion be substantially free from a light-sensitive silver salt. Presence of a light-sensitive silver salt in the system can increase fog and markedly reduce the sensitivity. In the present embodiment, the amount of a light-sensitive silver salt in the aqueous medium in which the organic silver salt is dispersed is preferably not more than 1 mol %, still preferably not more than 0.1 mol %, based on the organic silver salt. It is the most advisable that no light-sensitive silver salt be added positively.

A light-sensitive recording material can be prepared by mixing an organic silver salt aqueous dispersion and a light-sensitive silver salt aqueous dispersion. The mixing ratio of the light-sensitive silver salt to the organic silver salt, which is subject to variation according to the use, preferably ranges 1 to 30 mol %, still preferably 2 to 20 mol %, particularly preferably 3 to 15 mol %, based on the organic silver salt. Two or more kinds of organic silver salt aqueous dispersions and two or more kinds of light-sensitive silver salt aqueous dispersions may be mixed, which is a practice preferably followed for photographic characteristics adjustment.

The organic silver salt is used in an arbitrary amount. A preferred coating weight of total silver, inclusive of silver of silver halide, is 0.1 to 5.0 g/m$^2$, particularly 0.3 to 3.0 g/m$^2$, especially 0.5 to 2.0 g/m$^2$. For improving archival stability, in particular, the coating weight of total silver is preferably 1.8 g/m$^2$ or less, still preferably 1.6 g/m$^2$ or less. Where a preferred reducing agent which will be described below is used, sufficiently high image densities can be obtained even with such a low silver content.

The photothermographic recording material according to the present embodiment preferably contains a reducing agent (heat developing agent) for the organic silver salt. The reducing agent for the organic silver salt includes an arbitrary substance (preferably an organic substance) capable of reducing Ag$^+$ to Ag. Examples of such reducing agents are given in JP-A-11-65021 (para. Nos. 0043 to 0045) and EP 0803764A1 (page 7, line 34 to page 18, line 12).

The reducing agents which can be preferably used in the present embodiment include hindered phenol reducing agents or bisphenol reducing agents having a substituent on the ortho position with respect to the phenolic hydroxyl group. Still preferred of them are compounds represented by formula (R):

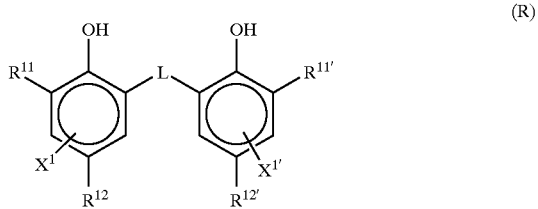

(R)

wherein $R^{11}$ and $R^{11'}$ each represent an alkyl group having 1 to 20 carbon atoms; $R^{12}$ and $R^{12'}$ each represent a hydrogen atom or a substituent capable of bonding to the benzene ring; L represents —S— or —CHR$^{13}$—; R$^{13}$ represents a hydrogen atom or an alkyl group having 1 to 20 carbon atoms; and $X^1$ and $X^{1'}$ each represent a hydrogen atom or a substituent capable of bonding to the benzene ring.

The alkyl group as represented by $R^{11}$ and $R^{11'}$ may be substituted or unsubstituted. Suitable substituents of the substituted alkyl group include an aryl group, a hydroxyl group, an alkoxy group, an aryloxy group, an alkylthio group, an arylthio group, an acylamino group, a sulfonamide group, a sulfonyl group, a phosphoryl group, an acyl group, a carbamoyl group, an ester group, a ureido group, a urethane group, and a halogen atom.

The substituent as represented by $R^{12}$, $R^{12'}$, $X^1$ and $X^{1'}$ which is capable of bonding to the benzene ring preferably includes an alkyl group, an aryl group, a halogen atom, an alkoxy group, and an acylamino group.

The alkyl group as represented by $R^{13}$ (of —CHR$^{13}$— representing L) may be substituted or unsubstituted. Examples of unsubstituted alkyl group as $R^{13}$ are methyl, ethyl, propyl, butyl, heptyl, undecyl, isopropyl, 1-ethylpentyl, and 2,4,4-trimethylpentyl. The substituents recited above for the substituted alkyl group $R^{11}$ apply to the alkyl group $R^{13}$.

$R^{11}$ and $R^{11'}$ each preferably represent a secondary or tertiary alkyl group having 3 to 15 carbon atoms, which includes isopropyl, isobutyl, t-butyl, t-amyl, t-octyl, cyclohexyl, cyclopentyl, 1-methylcyclohexyl, and 1-methylcyclopropyl. Still preferably, $R^{11}$ and $R^{11'}$ each represent a tertiary alkyl group having 4 to 12 carbon atoms. Particularly preferred are t-butyl, t-amyl, and 1-methylcyclohexyl, with t-butyl being especially preferred.

$R^{12}$ and $R^{12'}$ each preferably represent an alkyl group having 1 to 20 carbon atoms, such as methyl, ethyl, propyl, butyl, isopropyl, t-butyl, t-amyl, cyclohexyl, 1-methylcyclohexyl, benzyl, methoxymethyl, and methoxyethyl. Preferred of them are methyl, ethyl, propyl, isopropyl, and t-butyl.

$X^1$ and $X^{1'}$ each preferably represent a hydrogen atom, a halogen atom or an alkyl group. A hydrogen atom is still preferred.

L is preferably —CHR$^{13}$—. R$^{13}$ preferably represents a hydrogen atom or an alkyl group having 1 to 15 carbon atoms. The alkyl group preferably includes methyl, ethyl, propyl, isopropyl, and 2,4,4-trimethylpentyl. It is particularly preferred for $R^{13}$ to represent a hydrogen atom, a methyl group, an ethyl group, a propyl group or an isopropyl group.

When $R^{13}$ is a hydrogen atom, it is preferred for $R^{12}$ and $R^{12'}$ to represent an alkyl group having 2 to 5 carbon atoms, particularly ethyl or propyl, especially ethyl. When $R^{13}$ is a primary or secondary alkyl group having 1 to 8 carbon atoms, $R^{12}$ and $R^{12'}$ each preferably represent a methyl group. Suitable examples of the primary or secondary alkyl group having 1 to 8 carbon atoms as $R^{13}$ are methyl, ethyl, propyl, and isopropyl, with methyl, ethyl, and propyl being preferred.

Where $R^{11}$, $R^{11'}$, $R^{12}$, and $R^{12'}$ all represent a methyl group, it is preferred that $R^{13}$ be a secondary alkyl group. The secondary alkyl group for this $R^{13}$ is preferably isopropyl, isobutyl or 1-ethylpentyl. Isopropyl is the most desirable.

The reducing agents represented by formula (R) show differences in heat developing properties, tone of resultant developed silver, and the like depending on the combination of $R^{11}$, $R^{11'}$, $R^{12}$, $R^{12'}$, and $R^{13}$. Taking advantage of these differences, two or more compounds of formula (R) can be used in combination to obtain desired performance.

Specific examples of reducing agents, (R-1) to (R-34), which can be used in the present embodiment including the compounds of formula (R) are shown below for illustrative purposes only but not for limitation.

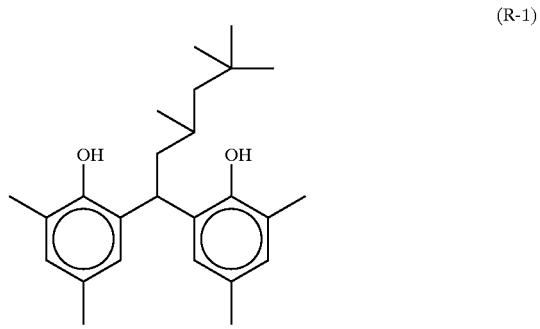

(R-1)

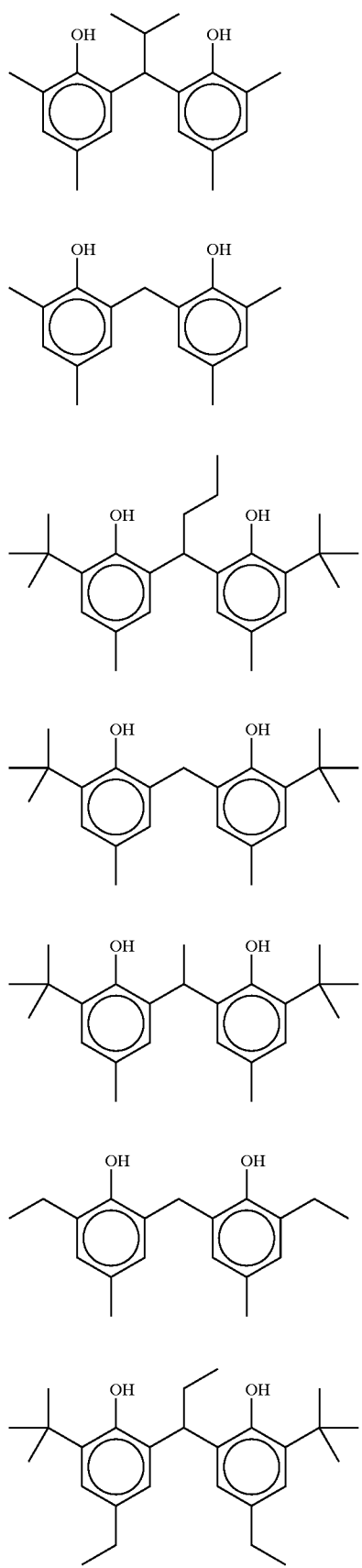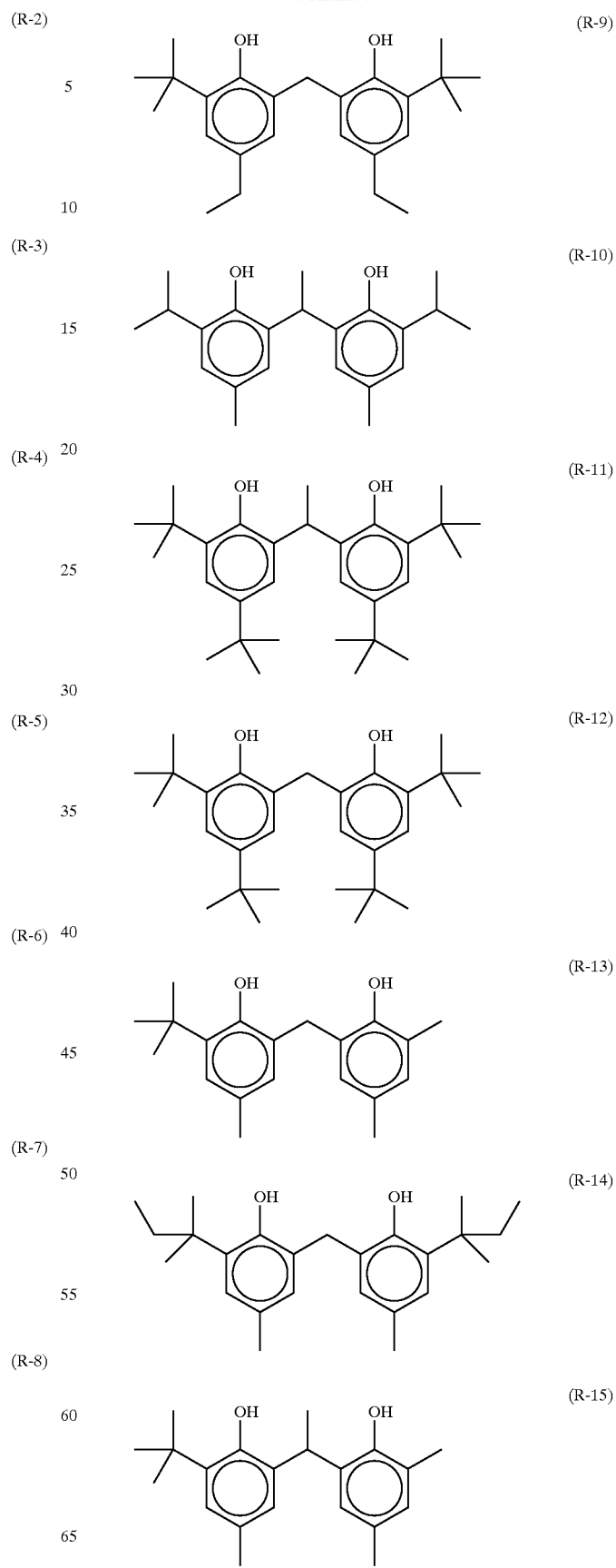

(R-16) 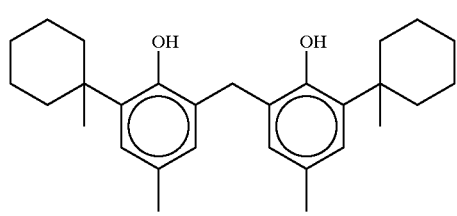
(R-17) 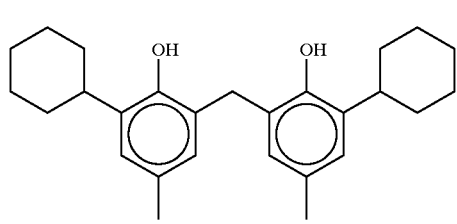
(R-18) 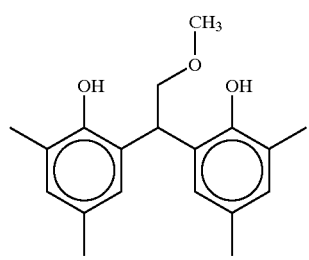
(R-19) 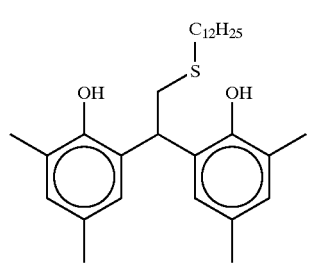
(R-20) 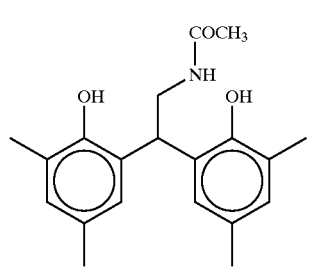
(R-21) 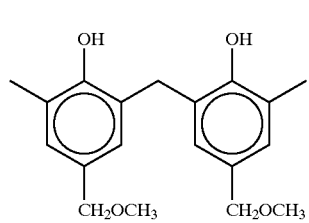
(R-22) 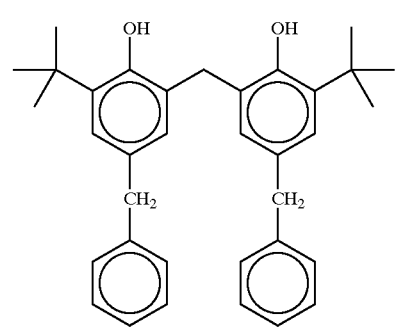
(R-23) 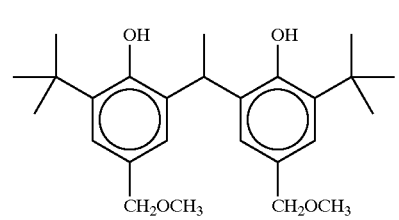
(R-24) 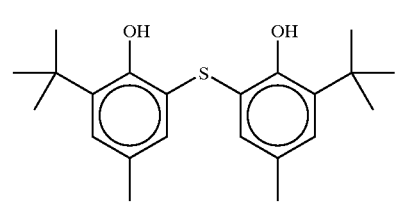
(R-25) 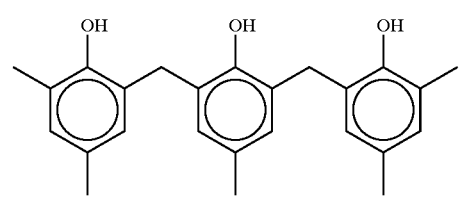
(R-26) 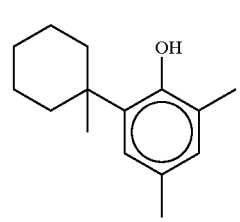
(R-27) 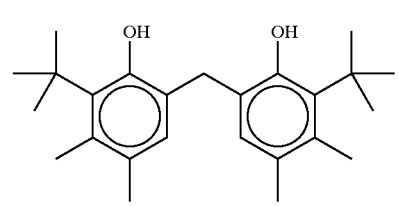
(R-28) 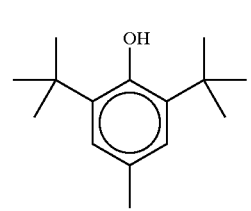

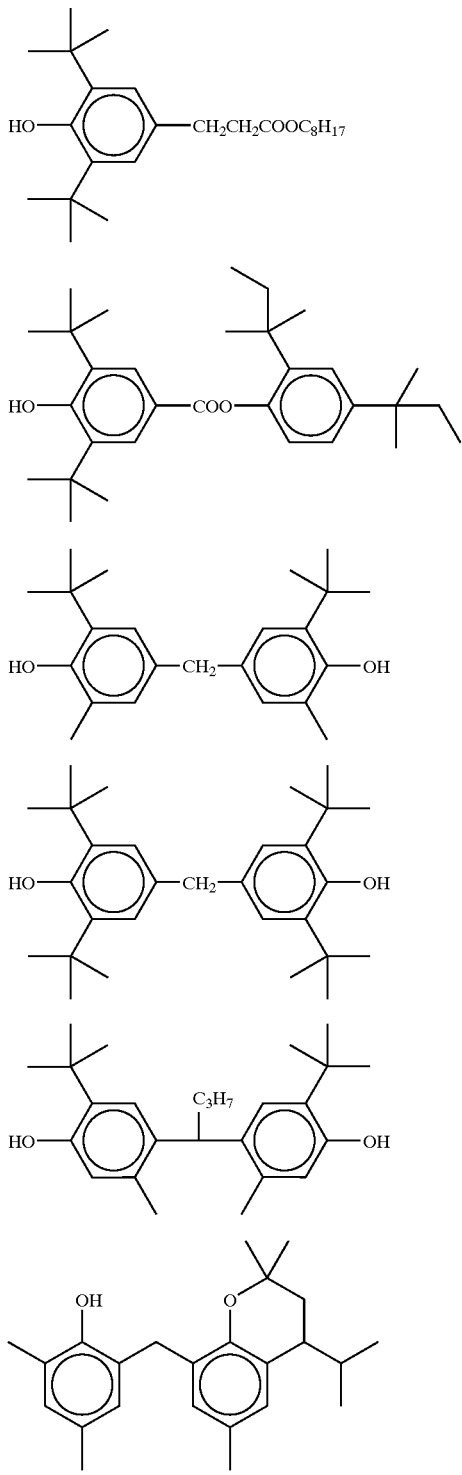

The reducing agent is preferably used in an amount of 0.1 to 3.0 g/m², particularly 0.2 to 1.5 g/m², especially 0.3 to 1.0 g/m². The reducing agent is preferably used in an amount of 5 to 50 mol %, particularly 8 to 30 mol %, especially 10 to 20 mol %, based on the silver on the image-forming layer side of the photothermographic recording material. The reducing agent is preferably incorporated into the image-forming layer.

The reducing agent is added to a coating composition for forming the recording material by any method, for example, in the form of a solution (a solution method) or a dispersion (an emulsion method or a suspension method).

The emulsion method which is well known in the art includes a method comprising mechanically dispersing the reducing agent using an oil, such as dibutyl phthalate, tricresyl phosphate, glycerol triacetate or diethyl phthalate, and an auxiliary solvent, such as ethyl acetate or cyclohexanone.

The suspension method includes a method in which the reducing agent in powder form is dispersed in an appropriate medium such as water by means of a ball mill, a colloid mill, a vibration ball mill, a sand mill, a jet mill or a roller mill or by ultrasonication to prepare a suspension. In dispersing, a protective colloid (e.g., polyvinyl alcohol) or a surface active agent (such as an anionic surface active agent, e.g., sodium triisopropylnaphthalenesulfonate (a mixture of compounds having three isopropyl groups at different positions)) can be used. Where beads of zirconia, etc. are used as a grinding medium as is usual with the above-mentioned mills, zirconium, etc. dissolved from the beads may be incorporated into the dispersion usually in a concentration of 1 to 1000 ppm while varying according to dispersing conditions. Incorporation of up to 0.5 mg of zirconium per gram of silver into the recording material is allowable in the practice.

Addition of an antiseptic, such as sodium benzoisothiazolinone, to the aqueous dispersion is advisable.

In the present embodiment, the reducing agent is preferably used in the form of a suspension.

The photothermographic recording material according to the present embodiment preferably contains a development accelerator. Useful development accelerators include sulfonamidophenol compounds represented by formula (A) described in JP-A-2000-267222 and JP-A-2000-330234, hindered phenol compounds represented by formula (II) described in JP-A-2001-92075, hydrazine compounds represented by formula (I) described in JP-A-10-62895 and JP-A-11-15116 and formula (1) described in Japanese Patent Application No. 2001-74278, and phenol or naphthol compounds represented by formula (2) described in Japanese Patent Application No. 2000-76240.

The development accelerator is used in an amount of 0.1 to 20 mol %, preferably 0.5 to 10 mol %, still preferably 1 to 5 mol %, based on the reducing agent. The development accelerator can be incorporated into the recording material in the same manner as for the reducing agent. It is preferably incorporated in the form of a suspension or an emulsion. Where incorporated in emulsion form, it is preferably added as dispersed in a mixed medium of a high-boiling solvent that is solid at ambient temperature and a low-boiling auxiliary solvent or in the form of a so-called oilless emulsion prepared by using no high-boiling solvent.

Of the above-recited development accelerators, the hydrazine compounds represented by formula (1) described in Japanese Patent Application No. 2001-74278, and phenol or naphthol compounds represented by formula (2) described in Japanese Patent Application No. 2000-76240 are particularly preferred. Specific but non-limiting examples of preferred development accelerators, (A-1) to (A-10), are shown below.

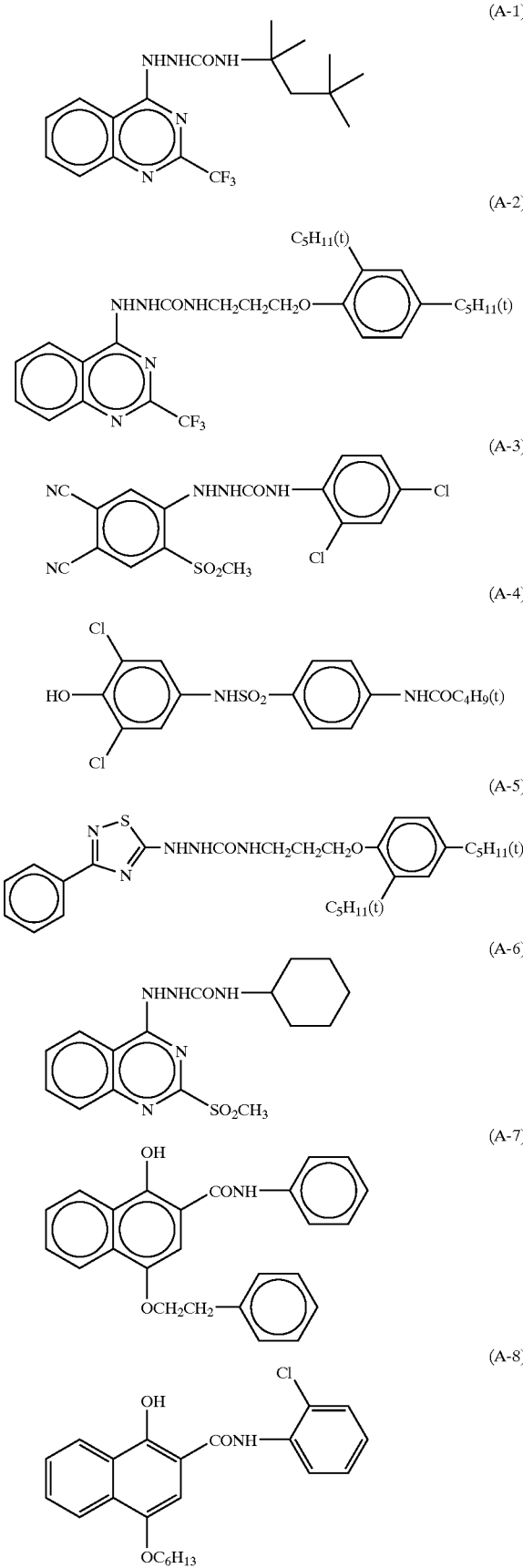

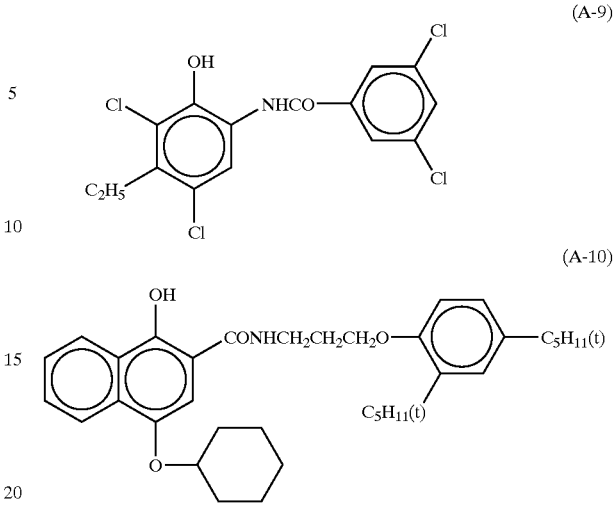

Where a reducing agent having an aromatic hydroxyl group, particularly the above-described bisphenol compound is used, it is preferable to use a non-reducing compound having a group capable of forming a hydrogen bond with the hydroxyl group (hereinafter referred to as a hydrogen-bonding compound) in combination. The group capable of forming a hydrogen bond with a hydroxyl group or an amino group includes a phosphoryl group, a sulfoxide group, a sulfonyl group, a carbonyl group, an amide group, an ester group, a urethane group, a ureido group, a tertiary amino group, and a nitrogen-containing aromatic group. Preferred hydrogen-bonding compounds are those having a phosphoryl group, a sulfoxide group, an N-terminally blocked amido group (having no >N—H and blocked like >N—Ra), an N-terminally blocked urethane group (having no >N—H and blocked like >N—Ra), or an N-terminally blocked ureido group (having no >N—H and blocked like >N—Ra), wherein Ra is a substituent (≠H).

Particularly preferred hydrogen-bonding compounds are represented by formula (D):

wherein $R^{21}$, $R^{22}$, and $R^{23}$ each represent an alkyl group, an aryl group, an alkoxy group, an aryloxy group, an amino group or a heterocyclic group, each of which may be substituted or unsubstituted.

Substituents of the substituted groups as $R^{21}$, $R^{22}$, and $R^{23}$ include a halogen atom, an alkyl group, an aryl group, an alkoxy group, an amino group, an acyl group, an acylamino group, an alkylthio group, an arylthio group, a sulfonamide group, an acyloxy group, a hydroxycarbonyl group, a carbamoyl group, a sulfamoyl group, a sulfonyl group, and a phosphoryl group. Preferred of them are an alkyl group and an aryl group, including methyl, ethyl, isopropyl, t-butyl, t-octyl, phenyl, 4-alkoxyphenyl, and 4-acyloxyphenyl.

The alkyl group as $R^{21}$, $R^{22}$, and $R^{23}$ includes methyl, ethyl, butyl, octyl, dodecyl, isopropyl, t-butyl, t-amyl, t-octyl, cyclohexyl, 1-methylcyclohexyl, benzyl, phenethyl, and 2-phenoxypropyl. The aryl group includes phenyl, cresyl, xylyl, naphthyl, 4-t-butylphenyl, 4-t-octylphenyl, 4-anisidyl, and 3,5-dichlorophenyl. The alkoxy group includes methoxy, ethoxy, butoxy, octyloxy, 2-ethylhexyloxy, 3,5,5-trimethylhexyloxy, dodecyloxy, cyclohexyloxy, 4-methylcyclohexyloxy, and benzyloxy. The aryloxy group includes phenoxy, cresyloxy, isopropylphenoxy, 4-t-butylphenoxy, naphthoxy, and biphenyloxy. The amino group includes dimethylamino, diethylamino, dibutylamino dioctylamino, N-methyl-N-hexylamino, dicyclohexylamino, diphenylamino, and N-methyl-N-phenylamino.

$R^{21}$, $R^{22}$, and $R^{23}$ each preferably represent an alkyl group, an aryl group, an alkoxy group or an aryloxy group. From the standpoint of effects of the present embodiment, it is preferred that at least one, particularly two or all, of $R^{21}$, $R^{22}$, and $R^{23}$ represent an alkyl group or an aryl group. From the standpoint of availability at a low price, compounds of formula (D) in which all of $R^{21}$, $R^{22}$, and $R^{23}$ are the same are preferred.

Specific but non-limiting examples of the hydrogen-bonding compounds, (D-1) to (D-21) which can be used in the present embodiment including the compounds of formula (D) are listed below.

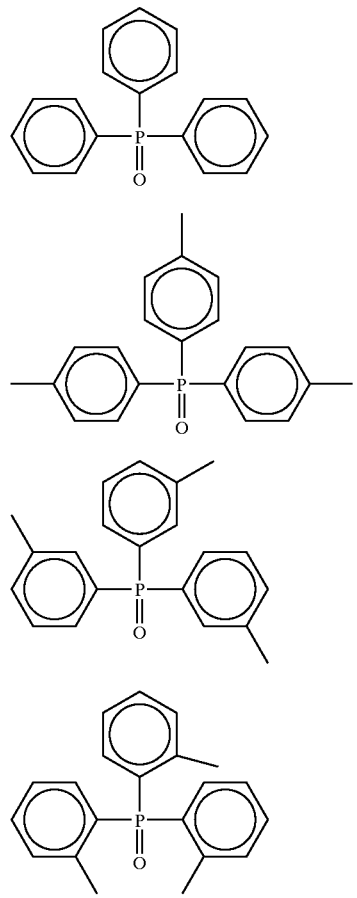

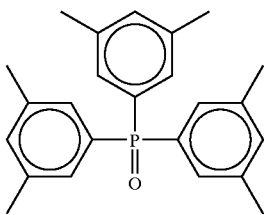
(D-6)

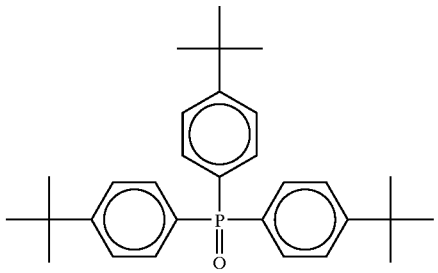
(D-7)

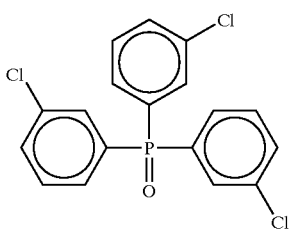
(D-8)

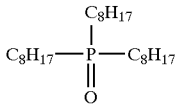
(D-9)

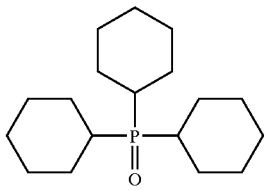
(D-10)

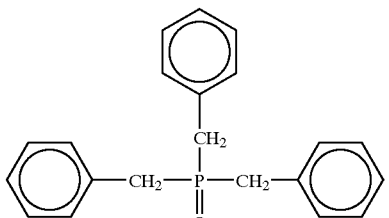
(D-11)

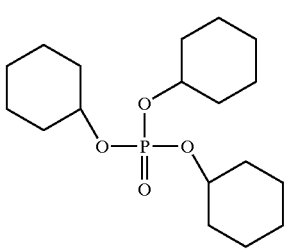
(D-12)

(D-13) 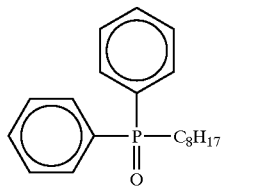

(D-14) 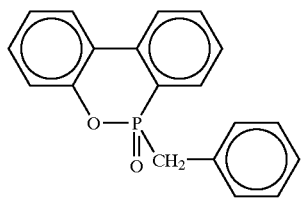

(D-15) 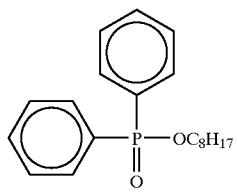

(D-16) 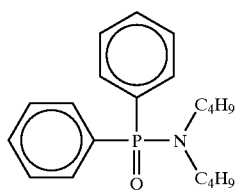

(D-17) 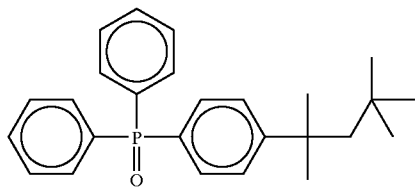

(D-18) 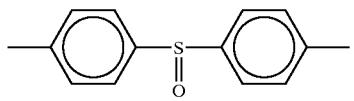

(D-19) 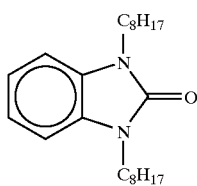

(D-20) 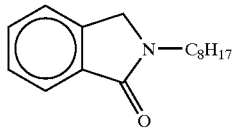

(D-21) 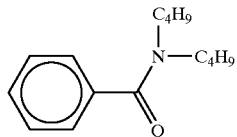

Additional examples of the hydrogen-bonding compounds are given in European Patent No. 1096310 and Japanese Patent Application Nos. 2000-270498 and 2001-124796.

The compound of formula (D) can be incorporated into the coating composition in the form of a solution, an emulsion or a suspension, preferably in the form of a suspension, similarly to the reducing agent. The hydrogen-bonding compound forms a complex with a compound having a phenolic hydroxyl group or an amino group through hydrogen bonding in a solution. Some combinations of a reducing agent and a compound of formula (D) can provide a complex that can be isolated as crystals. Use of such isolated crystal grains in the form of a suspension is particularly favorable for obtaining stable performance. It is also favorable that a reducing agent and a compound of formula (D), both in powder form, are dry mixed and dispersed in a sand grinder mill, etc. with an appropriate dispersant to form a complex.

The compound of formula (D) is preferably used in an amount of 1 to 200 mol %, particularly 10 to 150 mol %, especially 20 to 100 mol %, based on the reducing agent.

The light-sensitive silver halide which can be used in the present embodiment is not particularly limited in halogen composition and includes silver chloride, silver chlorobromide, silver bromide, silver iodobromide, silver iodochlorobromide, and silver iodide. Silver bromide and silver iodobromide are preferred. The halogen composition in a grain may be uniform or may be changed stepwise or continuously. For example, silver halide grains having a core/shell structure are preferably used. The number of layers making up a core/shell silver halide grain is preferably 2 to 5, still preferably 2 to 4. Silver chloride, silver bromide or silver chlorobromide grains having silver bromide or silver iodide localized on the grain surface are also preferred.

Methods of forming light-sensitive silver halides are well known in the art. The techniques disclosed in Research Disclosure, No. 17029 (June 1978) and U.S. Pat. No. 3,700,458 can be used, for example. In some detail, a silver supplying compound and a halogen supplying compound are added to a gelatin or other polymer solution to form a light-sensitive silver halide, which is then mixed up with an organic silver salt. The methods taught in JP-A-11-119374 (para. No. 0217 to 0224), Japanese Patent Application No. 11-98708, and JP-A-2000-347335 are also preferred.

It is preferred for the light-sensitive silver halide to have a small grain size for suppressing white turbidity after image formation. Specifically, the grain size is preferably 0.20 $\mu$m or smaller, still preferably 0.01 to 0.15 $\mu$m, particularly preferably 0.02 to 0.12 $\mu$m. The term "grain size" as referred to here denotes a projected area diameter (a tabular grain is to be projected in the direction normal to its main plane).

The shape of the light-sensitive silver halide grains includes cubes, octahedrons, plates, spheres, rods, and potato-like irregular shapes. Cubic grains are preferred for use in the present embodiment. Grains with rounded corners are also preferred. While the indices of plane (Miller indices) of the light-sensitive silver halide grains are not particularly limited, it is preferred that the grains have a higher proportion of a [100] plane which has high spectral sensitization efficiency when a spectral sensitizing dye is adsorbed thereon. A preferred proportion of a [100] plane is 50% or higher, particularly 65% or higher, especially 80% or more. The proportion of a [100] plane can be determined by the method utilizing crystal plane dependence of adsorption of a sensitizing dye on [111] and [100] planes (T. Tani, *J. Imaging Sci.*, vol. 29, p. 165 (1985)).

Silver halide grains-having a hexacyanometal complex on the surface thereof are preferably used in the present embodiment. Useful hexacyanometal complexes include $[Fe(CN)_6]^{4-}$, $[Fe(CN)_6]^{3-}$, $[Ru(CN)_6]^{4-}$, $[Os(CN)_6]^{4-}$, $[Co(CN)_6]^{3-}$, $[Rh(CN)_6]^{3-}$, $[Ir(CN)_6]^{3-}$, $[Cr(CN)_6]^{3-}$, and $[Re(CN)_6]^{3-}$, with hexacyanoiron complexes being preferred.

Although counter cations are not so important because the hexacyanometal complex exists in ionic form in an aqueous solution, it is advisable to use such cations that are water-miscible and fit for flocculation of silver halide emulsion grains, including alkali metal ions (e.g., sodium, potassium, rubidium, cesium or lithium ions), ammonium ions, and alkylammonium ions (e.g., tetramethylammonium, tetraethylammonium, tetrapropylammonium or tetra(n-butyl)ammonium ions).

The hexacyanometal complex can be added as mixed with water, a mixed solvent of water and an appropriate water-miscible organic solvent (e.g., alcohols, ethers, glycols, ketones, esters or amides), or gelatin. The hexacyanometal complex is preferably added in an amount of $1\times10^{-5}$ to $1\times10^{-2}$ mol, particularly $1\times10^{-4}$ to $1\times10^{-3}$ mol, per mole of silver.

In order for the hexacyanometal complex be present on the surface of silver halide grains, it is added directly to the silver halide grain forming system after completion of addition of a silver supplying compound (silver nitrate aqueous solution) and before completion of charging the silver supplying compound and a halogen supplying compound, during washing with water, during dispersing, or before chemical sensitization (chalcogen (e.g., sulfur, selenium or tellurium) sensitization or noble metal (e.g., gold) sensitization). In order not to allow the silver halide fine grains to grow, it is preferred to rapidly add the hexacyanometal complex immediately after grain formation and before completion of charging the silver supplying compound and a halogen supplying compound. Addition of the hexacyanometal complex may be started when the amount of silver nitrate added for grain formation has reached 96% by weight, preferably 98% by weight, still preferably 99% by weight, based on the total amount of silver nitrate to be added.

Where the hexacyanometal complex is added after completion of silver nitrate addition and immediately before completion of grain formation, the complex can be adsorbed on the outermost surface of the silver halide grains, and most of it forms a sparingly soluble salt with silver ions on the grain surface. Since the silver salt of hexacyanoiron (II) is more sparingly soluble than silver iodide, re-dissolution of fine grains can be prevented, making it possible to prepare small size silver halide grains.

The light-sensitive silver halide grains can contain a metal of the groups 8 to 10 of the Periodic Table (from groups 1 to 18) or a complex of the metal. The metal (or the center metal of the metal complex) preferably includes rhodium, ruthenium, and iridium. Two or more metal complexes having the same center metal or different center metals may be used in combination. The metal or the metal complex is suitably added in an amount of $1\times10^{-9}$ to $1\times10^{-3}$ mol per mole of silver. As for useful metals or metal complexes and the manner of addition, reference can be made in JP-A-7-225449, JP-A-11-65021 (para. Nos. 0018 to 0024), and JP-A-11-119374 (para. Nos. 0227 to 0240).

As for metal atoms that can be incorporated into the silver halide grains (e.g., $[Fe(CN)_6]^{4-}$) and useful methods of desalting and chemical sensitization of silver halide emulsions, refer to JP-A-11-84574 (para. Nos. 0046 to 0050), JP-A-11-65021 (para. Nos. 0025 to 0031), and JP-A-11-119374 (para. Nos. 0242 to 0250).

Various kinds of gelatin can be used in the light-sensitive silver halide emulsion. Gelatin having a molecular weight of 10,000 to 1,000,000 is preferred for maintaining a good dispersed condition of the emulsion in an organic silver salt-containing coating composition. Phthalated gelatin is also preferred. The gelatin can be added at the time of grain formation or at the time of dispersing after desalting. It is preferred to use the gelatin at the time of grain formation.

Sensitizing dyes which can be used in the present embodiment are dyes which are adsorbed on the silver halide grains to spectrally sensitize the grains in an intended wavelength region. Sensitizing dyes having spectral sensitivities fit for the spectral characteristics of an exposure light source are selected to advantage. The sensitizing dyes and the method of adding the sensitizing dyes are described in JP-A-11-65021 (para. Nos. 0103 to 0109), JP-A-10-186572 (compounds of formula (II)), JP-A-11-119374 (compounds of formula (I) and para. No. 0106), U.S. Pat. Nos. 5,510,236 and 3,871,887 (Example 5), JP-A-2-96131, JP-A-59-48753, EP 0803764A (page 19, line 38 to page 20, line 35), and Japanese Patent Application Nos. 2000-86865, 2000-102560, and 2000-205399. The sensitizing dyes can be used either individually or as a combination of two or more thereof. The time of adding the sensitizing dye to the silver halide emulsion is preferably after desalting and before application, still preferably after desalting and before completion of chemical sensitization.

The amount of the sensitizing dye to be added is chosen according to the performance, such as sensitivity and fog, and preferably ranges $10^{-6}$ to 1 mol, particularly $10^{-4}$ to $10^{-1}$ mol, per mole of silver halide of the light-sensitive layer.

Supersensitizers can be used for increasing the spectral sensitization efficiency. Useful supersensitizers include the compounds disclosed in European Patent Publication No. 587,338, U.S. Pat. Nos. 3,877,943 and 4,873,184, JP-A-5-341432, JP-A-11-109547, and JP-A-10-111543.

The light-sensitive silver halide grains are preferably chemically sensitized by sulfur sensitization, selenium sensitization or tellurium sensitization with compounds known therefor, such as the compounds described in JP-A-7-128768. Tellurium sensitization is particularly preferred for the present embodiment. Preferred compounds for performing tellurium sensitization include the compounds described in JP-A-11-65021 (para. No. 0030) and the compounds represented by formulae (II), (III) or (IV) described in JP-A-5-313284.

The light-sensitive silver halide grains are preferably chemically sensitized by gold sensitization or a combination of gold sensitization and the above-described chalcogen sensitization. Commonly used monovalent or trivalent gold sensitizers are used for preference. Typical examples of gold sensitizers are chloroauric acid, bromoauric acid, potassium chloroaurate, potassium bromoaurate, auric trichloride, potassium auric thiocyanate, potassium iodoaurate, tetracyanoauric acid, ammonium aurothiocyanate, and pyridyl trichlorogold. The gold sensitizers recited in U.S. Pat. No. 5,858,637 and Japanese Patent Application No. 2001-79450 are also preferred.

Chemical sensitization can be effected in any stage after grain formation and before application. Conceivable stages include (1) after desalting and before spectral sensitization, (2) simultaneous with spectral sensitization, (3) after spectral sensitization, and (4) immediately before application.

The amount of the chemical sensitizer for sulfur, selenium or tellurium sensitization is usually about $1\times10^{-8}$ to $1\times10^{-2}$ mol, preferably about $1\times10^{-7}$ to $1\times10^{-3}$ mol, per mole of silver halide, while somewhat varying according to the silver halide grains, chemical ripening conditions, and the like. The amount of the gold sensitizer is usually $1 \times 10^{-7}$ to $1 \times 10^{-3}$ mol, preferably $1 \times 10^{-6}$ to $5 \times 10^{-4}$ mol, per mole of silver halide, while somewhat varying according to various conditions. While not limiting, the chemical sensitization is carried out at a pH of 5 to 8, a pAg of 6 to 11, and a temperature of about 40 to 95° C.

The silver halide emulsion may contain a thiosulfonic acid compound according to the method taught in European Patent Publication No. 293,917.

The light-sensitive silver halide grains are preferably chemically sensitized by reduction sensitization. Suitable reducing agents used for reduction sensitization include ascorbic acid, thiourea dioxide, stannous chloride, aminoiminomethanesulfinic acid, hydrazine derivatives, borane compounds, silane compounds, and polyamine compounds. The reducing agent is added in any stage of light-sensitive emulsion preparation from crystal growth up to application. Reduction sensitization of light-sensitive silver halide grains can also be effected by ripening the emulsion at a pH of 7 or higher and a pAg of 8.3 or lower or by introducing a silver ion single addition part during grain formation.

It is preferred for the light-sensitive silver halide emulsion to contain a fragmentable electron-donating (FED) sensitizer which generates two electrons per photon. Preferred FED sensitizers are described in U.S. Pat. Nos. 5,747,235, 5,747,236, 6,054,260, and 5,994,051, and Japanese Patent Application No. 2001-86161. The FED sensitizer can be added in any stage of the light-sensitive emulsion preparation, i.e., from the crystal growth stage up to the stage immediately before application. The amount of the FED sensitizer to be added is usually $1 \times 10^{-7}$ to $1 \times 10^{-1}$ mol, preferably $1 \times 10^{-6}$ to $5 \times 10^{-2}$ mol, per mole of silver halide, while varying depending on various conditions.

If desired, two or more kinds of light-sensitive silver halide emulsions different in, for example, average grain size, halogen composition, crystal habit or conditions adopted in chemical sensitization can be used in combination. Use of a plurality of light-sensitive silver halide emulsions having different sensitivities facilitates gradation control. With reference to usage of different kinds of emulsions, the disclosure in JP-A-57-119341, JP-A-53-106025, JP-A-47-3929, JP-A-48-55730, JP-A-46-5187, JP-A-50-73627, and JP-A-57-150841 can be referred to. In using two or more emulsions of different sensitivities, a recommended difference of sensitivity between two emulsions is 0.2 logE or greater.

The light-sensitive silver halide emulsion is preferably used in an amount to give a silver coating weight of 0.03 to 0.6 g, particularly 0.05 to 0.4 g, especially 0.07 to 0.3 g, per m² of a recording material. This amount would correspond to 0.01 to 0.5 mol, particularly 0.02 to 0.3 mol, especially 0.03 to 0.2 mol, of silver halide per mole of the organic silver salt.

The method and conditions for mixing a light-sensitive silver halide and an organic silver salt separately prepared are not particularly restricted as long as the effects of the present embodiment are manifested to the full. For example, a light-sensitive silver halide and an organic silver salt separately prepared are mixed by use of a high-speed stirrer, a ball mill, a sand mill, a colloid mill, a vibration mill, a homogenizer or the like. Otherwise, a separately prepared light-sensitive silver halide can be mixed into a system of preparing an organic silver salt in any stage of organic silver salt preparation. Mixing two or more organic silver salt aqueous dispersions and two or more light-sensitive silver halide aqueous dispersions is an effective manipulation for adjusting photographic characteristics.

The light-sensitive silver halide is mixed into a coating composition for forming an image-forming layer preferably in a stage from 3 hours before to immediately before application, particularly from 2 hours before to 10 seconds before application. The method and conditions of mixing are not particularly limited as far as the effects of the present embodiment are manifested sufficiently. For example, mixing is conducted in a tank designed to provide a desired average retention time, the average retention time being calculated from the rate of adding the light-sensitive silver halide emulsion and the rate of feeding the coating composition to a coater. The methods using a static mixer, etc. described in N. Harnby, M. F. Edwards, and A. W. Nienow, *Mixing in the Process Industries*, ch. 8, Butterworths (1985) are also useful.

Any polymeric binder can be used in the organic silver salt-containing layer. Suitable binders are transparent or semitransparent and generally colorless and include natural resins, synthetic polymers or copolymers, and other film-forming high-molecular weight compounds. Examples are gelatins, rubbers, polyvinyl alcohols, hydroxyethyl celluloses, cellulose acetates, cellulose acetate butyrates, polyvinylpyrrolidones, casein, starch, polyacrylic acids, polymethyl methacrylates, polyvinyl chlorides, polymethacrylic acids, styrene-maleic anhydride copolymers, styrene-acrylonitrile copolymers, styrene-butadiene copolymers, polyvinyl acetals (e.g., polyvinyl formal and polyvinyl butyral), polyesters, polyurethanes, phenoxy resins, polyvinylidene chlorides, polyepoxides, polycarbonates, polyvinyl acetates, polyolefins, cellulose esters, and polyamides. The binder may be used in the form of a solution in water or an organic solvent or an emulsion.

It is preferred for the binder used in the organic silver salt-containing layer to have a glass transition temperature (Tg) of 10 to 80° C., particularly 15 to 70° C., especially 20 to 65° C. The Tg of a polymeric binder comprising one to n monomer(s) was calculated according to equation: $1/Tg = \Sigma (X_i/Tg_i)$, wherein $X_i$ is a weight fraction of the i'th monomer ($\Sigma X_i = 1$); and $Tg_i$ is the glass transition temperature (absolute temperature) of a homopolymer of the i'th monomer; provided that $\Sigma$ is the sum of from i=1 to i=n. With respect to the Tg of a homopolymer of each monomer ($Tg_i$), data given in J. Brandchup and E. H. Immergut, *Polymer Handbook* (3rd ed.), Wiley-Interscience (1989) were adopted.

Two or more binders may be used if necessary. A binder having a Tg of 20° C. or higher and a binder having a Tg lower than 20° C. may be used in combination. In using two or more binders having different Tg's, it is preferred that the weight average Tg be in the above-specified range.

The organic silver salt-containing layer is preferably formed by applying a coating composition containing water in a proportion of at least 30% by weight based on the total solvent and drying the coating film. In this preferred case, it is desirable for obtaining improved performance to use an aqueous solvent (water)-soluble or dispersible binder, particularly a binder comprising a latex of a polymer having an equilibrium moisture content of 2% by weight or less at 25° C. and 60% RH. In the most desirable mode, the polymer latex be prepared so as to have an ion conductivity of 2.5 mS/cm or less. Such a polymer latex can be prepared by, for example, purifying a synthesized polymer by a separation membrane.

The aqueous solvent in which the polymer is soluble or dispersible includes water and a mixed solvent of water and not more than 70% by weight of a water-miscible organic solvent. The water-miscible organic solvent includes alcohols, such as methyl alcohol, ethyl alcohol, and propyl alcohol; cellosolve solvents, such as methyl cellosolve, ethyl cellosolve, and butyl cellosolve; ethyl acetate, and dimethylformamide. Here, the term "aqueous solvent" applies even to a system in which the polymer is not dissolved thermodynamically but held in a dispersed state.

The term "equilibrium moisture content at 25° C. and 60% RH" as used herein is defined by formula: $[(W_1-W_0)/W_0] \times 100$ (wt %), wherein $W_1$ is the weight of a polymer equilibrated in an atmosphere of 25° C. and 60% RH, and $W_0$ is the weight of the polymer in an absolutely dried condition at 25° C. With regard to the definition of moisture content and method of measurement, reference can be made to it, e.g., in Kobunshi Kogaku Koza 14, Hobunshi Zairyo Shikenho, edited by The Society of Polymer Science Japan, Chizin Shokan.

The binder polymers which can be used in the present embodiment preferably have an equilibrium moisture content (25° C., 60% RH) of 2% by weight or less, particularly 0.01 to 1.5% by weight, especially 0.02 to 1% by weight.

It is particularly preferred to use an aqueous solvent-dispersible polymer as a binder. Conceivable disperse systems include a latex comprising fine particles of a water-insoluble and hydrophobic polymer and a system having polymer molecules dispersed in a molecular state or in the form of micelle. A latex is preferred. The average particle size of the dispersed particles ranges 1 to 50,000 nm, preferably 5 to 1000 nm, still preferably 10 to 500 nm, particularly preferably 50 to 200 nm. The polymer particles may be monodispersed or polydispersed. It is a preferred manipulation to use two or more dispersions having different monodisperse particle size distributions to obtain controlled physical properties of the coating composition.

Preferred aqueous solvent-dispersible polymers include hydrophobic polymers, such as acrylic polymers, polyesters, rubbers (e.g., SBR resins), polyurethanes, polyvinyl chlorides, polyvinyl acetates, polyvinylidene chlorides, and polyolefins, which may be straight-chain or branched polymers or crosslinked polymers and may be homopolymers or copolymers including random copolymers and block copolymers. These polymers usually have a number average molecular weight of 5,000 to 1,000,000, preferably 10,000 to 200,000. Those having too small a molecular weight result in insufficient mechanical strength of the emulsion layer. Those with too large a molecular weight have poor film-forming properties. Crosslinkable polymer latices are particularly suitable.

Specific but non-limiting examples of preferred polymer latices are listed below. In the following list, the polymer latices are represented by their constituent monomers. The values in the parentheses immediately following monomers (abbreviated) are weight percents. The molecular weights are number average ones (Mn). Because polymers comprising a polyfunctional monomer form a crosslinked structure to which the concept of molecular weight is unapplicable, they are described only as being "crosslinking" instead of the molecular weight. "Tg" is a glass transition temperature. Abbreviations have the following meanings.

MMA: methyl methacrylate
EA: ethyl acrylate
MAA: methacrylic acid
2EHA: 2-ethylhexyl acrylate
St: styrene
Bu: butadiene
AA: acrylic acid
DVB: divinylbenzene
VC: vinyl chloride
AN: acrylonitrile
VDC: vinylidene chloride
Et: ethylene
IA: itaconic acid
P-1: MMA(70)/EA(27)/MAA(3) (Mn: 37,000; Tg: 61° C.)
P-2: MMA(70)/2EHA(20)/St(5)-AA(5) (Mn: 40,000; Tg: 59° C.)
P-3: St(50)/Bu(47)/MAA(3) (crosslinking; Tg: 17° C.)
P-4: St(68)/Bu(29)/AA(3) (crosslinking; Tg: 17° C.)
P-5: St(71)/Bu(26)/AA(3) (crosslinking; Tg: 24° C.)
P-6: St(70)/Bu(27)/IA(3) (crosslinking)
P-7: St(75)/Bu(24)AA(1) (crosslinking; Tg: 29°)
P-8: St(60)/Bu(35)/DVB(3)/MAA(2) (crosslinking)
P-9: St(70)/Bu(25)/DVB(2)/AA(3) (crosslinking)
P-10: VC(50)/MAA(20)/EA(20)/AN(5)/AA(5) (Mn: 80,000)
P-11: VDC(85)/MMA(5)/EA(5)/MAA(5) (mn: 67,000)
P-12: Et(90)/MAA(10) (Mn: 12,000)
P-13: St(70)/2EHA(27)/AA(3) (Mn: 130,000; Tg: 43° C.)
P-14: MMA(63)/EA(35)/AA(2) (Mn: 33,000; Tg: 47° C.)
P-15: St(70.5)/Bu(26.5)/AA(3) (crosslinking; Tg: 23° C.)
P-16: St(69.5)/Bu(27.5)/AA(3) (crosslinking: Tg: 20.5° C.)

The above-listed polymer latices are commercially available. Commercially available polymer latices include those of acrylic polymers such as Cevian A series (4635, 4718, and 4601) from Daicel Polymer, Ltd. and Nipol Lx series (811, 814, 821, 820, and 857) from Zeon Corp.; those of polyesters such as Finetex ES series (650, 611, 675, and 850) from Dainippon Ink & Chemicals, Inc. and WD-size and WMS from Eastman Chemical Co.; those of polyurethanes such as Hydran AP series (10, 20, 30, and 40) from Dainippon Ink & Chemicals, Inc.; those of rubbers such as Lacstar series (7310K, 3307B, 4700H, and 7132C) from Dainippon Ink & Chemicals, Inc. and Nipol Lx series (416, 410, 438C, and 2507) from Zeon Corp.; those of polyvinyl chlorides such as G351 and G576 from Zeon Corp.; those of polyvinylidene chloride such as L502 and L513 from Asahi Chemical Industry Co., Ltd.; and those of polyolefins such as Chemipearl series (S120 and SA100) from Mitsui Chemicals, Inc.

These polymer latices can be used either individually or as a mixture of two or more thereof.

Particularly preferred polymer latices are styrene-butadiene copolymer latices. A preferred styrene to butadiene weight ratio is 40:60 to 95:5. The styrene monomer unit and the butadiene monomer unit preferably form a total weight proportion of 60 to 99% in the copolymer. The styrene-butadiene copolymer latices preferably contain 1 to 6% by weight, particularly 2 to 5% by weight, of an acrylic acid or methacrylic acid monomer unit, particularly an acrylic acid unit, based on the total of styrene and butadiene monomer units.

The styrene-butadiene copolymer latices that are fit for use in the present embodiment include P-3 to P-8 and P-15 in the above list and commercially available ones such as Lacstar 3307B and 7132C and Nipol Lx 416.

If necessary, the organic silver salt-containing layer may contain a hydrophilic polymer, such as gelatin, polyvinyl alcohol, methyl cellulose, hydroxypropyl cellulose or carboxymethyl cellulose, in a proportion of not more than 30% by weight, preferably not more than 20% by weight, based on the total binder of the layer.

The organic silver salt-containing layer (i.e., the image-forming layer) is preferably formed by using the polymer latex as a binder. The weight ratio of the total binder of the layer to the organic silver salt is preferably 1/10 to 10/1, still preferably 1/3 to 5/1, particularly preferably 1/1 to 3/1.

Usually the organic silver salt-containing layer (image-forming layer) is also a light-sensitive layer (emulsion layer) containing the light-sensitive silver halide. In this case, the weight ratio of the total binder of the layer to the silver halide is preferably 5 to 400, still preferably 10 to 200.

The image-forming layer preferably has a total binder content of 0.2 to 30 g/m², particularly 1 to 15 g/m², especially 2 to 10 g/m². The image-forming layer can contain a crosslinking agent for polymer crosslinking, a surface active agent for improving coating properties, and so forth.

As previously stated, the solvent (inclusive of a dispersing medium) of the coating composition containing the organic silver salt is preferably an aqueous solvent containing water in a proportion of at least 30% by weight, particularly 50% by weight or more, especially 70% by weight or more, based on the total solvent. Solvents other than water are selected arbitrarily from water-miscible organic solvents such as methyl alcohol, ethyl alcohol, isopropyl alcohol, methyl cellosolve, ethyl cellosolve, dimethylformamide, and ethyl acetate. Preferred solvent compositions (the ratios are given by weight) include water, water/methyl alcohol=90/10, water/methyl alcohol=70/30, water/methyl alcohol/dimethylformamide=80/15/5, water/methyl alcohol/ethyl cellosolve=85/10/5, and water/methyl alcohol/isopropyl alcohol=85/10/5.

Antifoggants, stabilizers or stabilizer precursors which can be used in the present embodiment include those described in JP-A-10-62899 (para. No. 0070), EP 0803764A1 (page 20, line 57 to page 21, line 7), JP-A-9-281637, JP-A-9-329864, U.S. Pat. No. 6,083,681, and European Patent 1048975.

Organic halogen compounds are preferred antifoggants in the present embodiment. Those described in JP-A-11-65021 (para. Nos. 0111 to 0112) are useful. The organic halogen compounds represented by formula (P) described in JP-A-2000-284399, the organic polyhalogen compounds represented by formula (II) described in JP-A-10-339934, and the organic polyhalogen compounds described in JP-A-2001-31644 and JP-A-2001-33911 are particularly preferred.

The polyhalogen compounds which are preferably used in the present embodiment are represented by formula (H):

$$Q-(Y)_n-C(Z_1)(Z_2)X \quad (H)$$

wherein Q represents an alkyl group, an aryl group or a heterocyclic group; Y represents a divalent linking group; n represents 0 or 1; $Z_1$ and $Z_2$ each represent a halogen atom; and X represents a hydrogen atom or an electron-attracting group.

In formula (H) Q preferably represents an aryl group or a heterocyclic group. The heterocyclic group as Q is preferably one containing 1 or 2 nitrogen atoms, still preferably 2-pyridyl or 2-quinolyl. The aryl group as Q is preferably a phenyl group substituted with an electron-attracting group having a positive Hammet's substituent constant op. *Journal of Medicinal Chemistry*, (1973), vol. 16, No. 11, pp. 1207–1216 can be referred to as for Hammet's substituent constants. Examples of such electron-attracting groups are halogen atoms (e.g., fluorine (op: 0.06), chlorine (op: 0.23), bromine (op: 0.23), and iodine (op: 0.18)), trihalomethyl groups (e.g., tribromomethyl (op: 0.29), trichloromethyl (op: 0.33), and trifluoromethyl (op: 0.54)), a cyano group (op: 0.66), a nitro group (op: 0.78), aliphatic aryl or heterocyclic sulfonyl groups (e.g., methanesulfonyl (op: 0.72)), aliphatic aryl or heterocyclic acyl groups (e.g., acetyl (op: 0.50) and benzoyl (op: 0.43)), alkynyl groups (e.g., ethynyl (op: 0.23)), aliphatic aryl or heterocyclic oxycarbonyl groups (e.g., methoxycarbonyl (op: 0.45) and phenoxycarbonyl (op: 0.44)), a carbamoyl group (op: 0.36), a sulfamoyl group (op: 0.57), a sulfoxide group, heterocyclic groups, and phosphoryl groups. Groups (and atoms) having a up in a range of from 0.2 to 2.0, particularly from 0.4 to 1.0, are preferred. Particularly preferred electron-attracting groups are a carbamoyl group, an alkoxycarbonyl group, an alkylsulfonyl group, and an alkylphosphoryl group, with a carbamoyl group being especially preferred.

X preferably represents an electron-attracting group, particularly a halogen atom, an aliphatic aryl or heterocyclic sulfonyl group, an aliphatic aryl or heterocyclic acyl group, an aliphatic aryl or heterocyclic oxycarbonyl group, a carbamoyl group or a sulfamoyl group, with a halogen atom being especially preferred. Of halogen atoms preferred are chlorine, bromine, and iodine. Chlorine and bromine are still preferred. Bromine is particularly preferred.

Y is preferably —C(=O)—, —SO— or —SO₂—, still preferably —C(=O)—or —SO₂—, particularly preferably —SO₂—.

n is preferably 1.

Specific examples of the compounds represented by formula (H-1) to (H-24) are shown below.

(H-1)

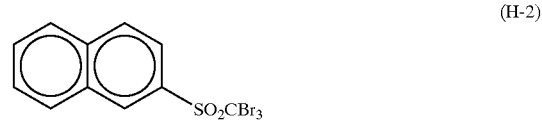
(H-2)

(H-3)

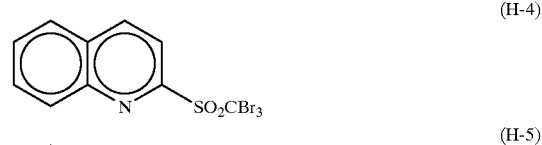
(H-4)

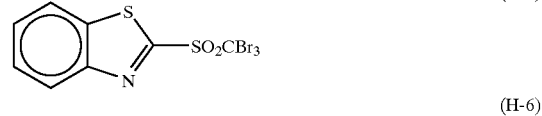
(H-5)

(H-6)

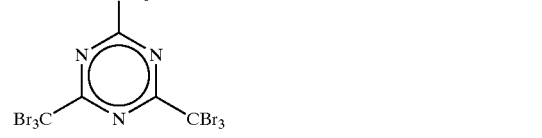
(H-7)

(H-8)

(H-9) 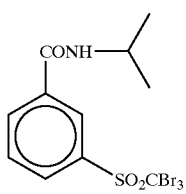

(H-10) 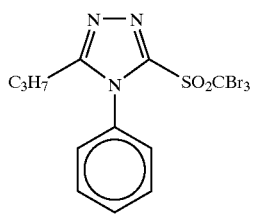

(H-11) 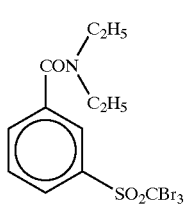

(H-12) 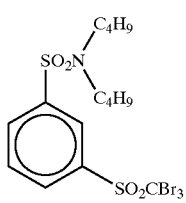

(H-13) 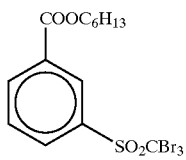

(H-14) 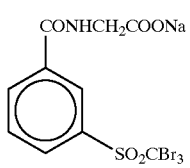

(H-15) 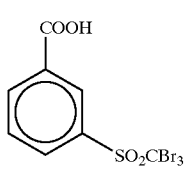

(H-16) 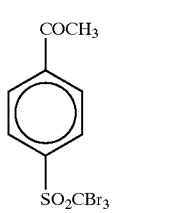

(H-17) 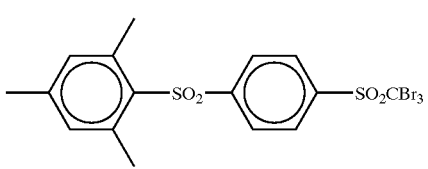

(H-18) 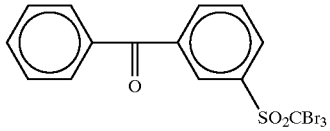

(H-19) 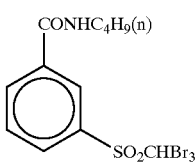

(H-20) 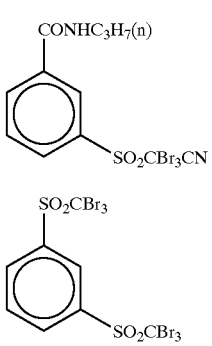

(H-21) 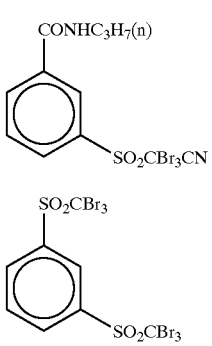

(H-22) 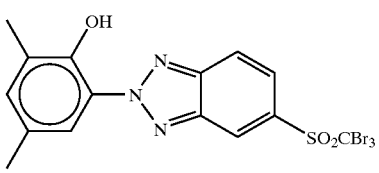

(H-23) 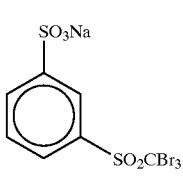

(H-24) 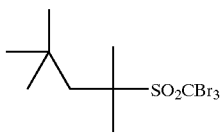

The organic polyhalogen compound of formula (H) is preferably used in an amount of $1 \times 10^{-4}$ to 1 mol, particularly $1 \times 10^{-3}$ to 0.5 mol, especially $1 \times 10^{-2}$ to 0.2 mol, per mole of the light-insensitive silver salt of the image-forming layer. The antifoggant can be incorporated into the recording material in the same manner as described with respect to the reducing agent. The suspension method is the preference to adopt for incorporation of the organic polyhalogen compound.

Other useful antifoggants include the silver (II) salts and the benzoic acid derivatives described in JP-A-11-65021 (para. Nos. 0113 and 0114, respectively), the salicylic acid derivatives of JP-A-2000-206642, the formalin scavenger compounds represented by formula (S) described in JP-A-2000-221634, the triazine compounds claimed in claim 9 of JP-A-11-352624, the compounds represented by formula (III) described in JP-A-6-11791, and 4-hydroxy-6-methyl-1,3,3a,7-tetraazaindene.

The photothermographic recording material of the present embodiment can contain an azolium salt for fog restraint. Useful azolium salts include the compounds represented by formula (XI) described in JP-A-59-193447, the compounds of JP-B-55-12581, and the compounds represented by formula (II) described in JP-A-60-153039. The azolium salt can be added to any layer of the recording material but is preferably added to a layer present on the light-sensitive layer side, particularly the organic silver salt-containing layer.

The azolium salt can be added at any stage of preparing a coating composition. Where added to the organic silver salt-containing layer, it may be added at any stage of from the preparation of the organic silver salt to the preparation of the coating composition but is preferably added after the organic silver salt preparation and by the time of application. The azolium salt can be added in any form, such as powder, solution or fine dispersion. It may be added in the form of a solution mixed with other additives such as a sensitizing dye, a reducing agent, and a toning agent. The azolium salt can be added in an arbitrary amount. A recommended amount is $1 \times 10^{-6}$ to 2 mol, particularly $1 \times 10^{-3}$ to 0.5 mol, per mole of silver.

The photothermographic recording material according to the present embodiment can contain a mercapto compound, a disulfide compound or a thione compound for the purpose of controlling (i.e., suppressing or accelerating) development, increasing spectral sensitization efficiency or improving preservability before and after development. Compounds fit for these purposes include those described in JP-A-10-62899 (para. Nos. 0067 to 0069), the compounds represented by formula (I) described in JP-A-10-186572 (examples are given in para. Nos. 0033 to 0052), and EP 0803764A1 (p. 20, ll. 36–56). In particular, mercapto-substituted aromatic heterocyclic compounds described in JP-A-9-297367, JP-A-9-304875, JP-A-2001-100358, and Japanese Patent Application Nos. 2001-104213 and 2001-104214 are preferred.

Toning agents are preferably used in the photothermographic recording material of the present embodiment. Useful toning agents are described in JP-A-10-62899 (para. Nos. 0054 to 0055), EP 0803764A1 (p. 21, ll. 23–48), JP-A-2000-356317, and Japanese Patent Application No. 2000-187298. Preferred toning agents include phthalazinones, i.e., phthalazinone and derivatives or metal salts thereof, such as 4-(1-naphthyl)phthalazinone, 6-chlorophthalazinone, 5,7-dimethoxyphthalazinone, and 2,3-dihydro-1,4-phthalazinedione; combinations of phthalazinones and phthalic acids (e.g., phthalic acid, 4-methylphthalic acid, 4-nitrophthalic acid, diammonium phthalate, sodium phthalate, potassium phthalate, and tetrachlorophthalic anhydride); phthalazines, i.e., phthalazine and derivatives or metal salts thereof, such as 4-(1-naphthyl)phthalazine, 6-isopropylphthalazine, 6-t-butylphthalazine, 6-chlorophthalazine, 5,7-dimethoxyphthalazine, and 2,3-dihydrophthalazine; and combinations of phthalazines and phthalic acids. Combinations of phthalazines and phthalic acids are still preferred. A combination of 6-isopropylphthalazine and phthalic acid or 4-methylphthalic acid is particularly preferred.

Plasticizers and lubricants that can be used in the light-sensitive layer are described in JP-A-11-65921, para. No. 0117. Superhigh contrast agents for forming superhigh contrast images and methods of adding the agents are described in JP-A-11-65921 (para. No. 0118), JP-A-11-223898 (para. Nos. 0136 to 0193), JP-A-2000-284399 (compounds represented by formulae (H), (1), (2), (3), (A), and (B)), and Japanese Patent Application No. H11-91652 (compounds represented by formulae (I) through (V), typified by formula Nos. 21 to 24). Useful contrast accelerators are described in JP-A-11-65021 (para. No. 0102) and JP-A-11-223898 (para. Nos. 0194 and 0195).

Where forming acid or a formic acid salt is used as a powerful fogging agent, it is preferably added to the side of the light-sensitive silver halide-containing image-forming layer in an amount not more than 5 mmol, particularly not more than 1 mmol, per mole of silver.

Where a superhigh contrast agent is used, it is preferably used in combination with an acid formed as a result of hydration of diphosphorus pentoxide or a salt of the acid. Acids formed by hydration of diphosphorus pentoxide (and salts thereof) include metaphosphoric acid (salts), pyrophosphoric acid (salts), orthophosphoric acid (salts), triphosphoric acid (salts), tetraphosphoric acid (salts), and hexametaphosphoric acid (salts), with orthophosphoric acid (salts) and hexametaphosphoric acid (salts) being preferred. Salts of orthophosphoric acid or hexametaphosphoric acid include sodium orthophosphate, sodium dihydrogenorthophosphate, sodium hexametaphosphate, and ammonium hexametaphosphate. The amount of the phosphoric acid (or salt) to be added is selected as desired according to such performance as sensitivity and fog, preferably ranging from 0.1 to 500 mg, particularly 0.5 to 100 mg, per $m^2$ of the recording material.

The photothermographic recording material can have a surface protective layer, either single- or multi-layered, to protect the image-forming layer against, for example, blocking. For the details, JP-A-11-65021 (para. Nos. 0119 to 0120) and Japanese Patent Application No. 2000-171936 can be referred to.

Gelatin is preferably used as a binder of the surface protective layer. It is also preferred to use polyvinyl alcohols (PVAs) in place of, or in addition to, gelatin. Useful gelatins include inert gelatin (e.g., Nitta Gelatin 750 available from Nitta Gelatin, Inc.) and phthalated gelatin (e.g., Nitta Gelatin 801 from Nitta Gelatin, Inc.). Useful PVAs are described in JP-A-2000-171936 (para. Nos. 0009 to 0020) and include fully saponified PVAs (e.g., PVA-105), partially saponified PVAs (e.g., PVA-205 and PVA-335), and modified PVAs (e.g., MP-203), the products in the parentheses all supplied by Kuraray Co., Ltd. PVA is preferably applied in an amount of 0.3 to 4.0 $g/m^2$, particularly 0.3 to 2.0 $g/m^2$, per protective layer.

In printing applications where dimensional stability is of great concern, it is preferred for the photothermographic recording material to contain a polymer latex in the surface protective layer or a back layer. Polymer latex technology for this use is taught in T. Okuda, et al. (ed.), *GOSEI JUSHI EMULSION*, Kobunshikankokai (1978), T, Sugimura, et al. (ed.), *GOSEI LATEX NO OHYO*, Kobunshikankokai (1993), and S. Muroi, *GOSEI LATEX NO KAGAKU*, Kobunshikankokai (1970). Useful polymer latices include a methyl methacrylate/ethyl acrylate/methacrylic acid (33.5/50/16.5; the ratio given by weight, hereinafter the same) copolymer latex, a methyl methacrylate/butadiene/itaconic acid (47.5/47.5/5) copolymer latex, an ethyl acrylate/methacrylic acid copolymer latex, a methyl methacrylate/2-ethylhexyl acrylate/styrene/2-hydroxyethyl methacrylate/acrylic acid (58.9/25.4/8.6/5.1/2.0) copolymer latex, and a methyl methacrylate/styrene/butyl acrylate/2-hydroxyethyl methacrylate/acrylic acid (64.0/9.0/20.0/5.0/2.0) copolymer latex. The polymer latex combinations described in Japanese Patent Application No. H11-6872 and the techniques described in Japanese Patent Application Nos. H11-143058 (paras. Nos. 0021 to 0025), H11-6872 (paras. No. 0027 to 0028), and H10-199626 (paras. Nos. 0023 to 0041) are also applicable to the binder of the surface protective layer. A preferred proportion of the polymer latex in the surface protective layer is 10 to 90% by weight, particularly 20 to 80% by weight, based on the total binder of the layer. A suitable coating weight of the total binder (inclusive of water-soluble polymers and latex polymers) in the surface protective layer is 0.3 to 5.0 $g/m^2$, particularly 0.3 to 2.0 $g/m^2$.

The temperature of the system for preparing the image-forming layer coating composition is preferably kept at 30 to 65° C., still preferably 35° C. or higher and lower than 60° C., particularly preferably 35 to 55° C. Immediately after a polymer latex is added, the image-forming layer coating composition is preferably maintained at 30 to 65° C.

In the present embodiment, the image-forming layer provided on a support has a single- or multi-layer structure. A single-layered image-forming layer comprises the above-described organic silver salt, light-sensitive silver halide, reducing agent, binder, and necessary additional components such as a toning agent, a coating aid, and other assistants. Where the image-forming layer has a multi-layered structure, a first image-forming layer, usually the layer adjacent to the support, contains at least the organic silver salt and the light-sensitive silver halide. Some other components are incorporated into a second layer or both the first and the second layers. Where the photothermographic recording material has multicolor sensitivity, the image-forming layer may have the above-described multi-layer structure for each color, or a single image-forming layer can contain all the components as taught in U.S. Pat. No. 4,708,928. In the case of multi-dye multi-color sensitive photothermographic recording materials, light-sensitive layers are separated by a functional or non-functional barrier layer as taught in U.S. Pat. No. 4,460,681.

The light-sensitive layer can contain various dyes and pigments (e.g., C.I. Pigment Blue 60, C.I. Pigment Blue 64, and C.I. Pigment Blue 15:6) for tone improvement and prevention of interference fringe and irradiation phenomena on laser exposure. For the details, refer to WO98/36322, JP-A-10-268465, and JP-A-11-338098.

The photothermographic recording material of the present embodiment preferably has an anti-halation layer farther from a light source than the light-sensitive layer.

A photothermographic recording material generally has a light-insensitive layer in addition to the light-sensitive layer. The light-insensitive layer includes (1) a protective layer which is provided farther from the support than the light-sensitive layer, (2) an intermediate layer provided between adjacent light-sensitive layers (when there are two or more light-sensitive layers) or between the light-sensitive layer and the protective layer, (3) a subbing layer provided between the light-sensitive layer and the support, and (4) a back layer provided on the back side of the support (opposite to the light-sensitive layer). A filter layer is provided as the layer (1) or (2), and an antihalation layer is provided as the layer (3) or (4).

With regard to the antihalation layer, reference can be made in JP-A-11-65021 (para. Nos. 0123 to 0124), JP-A-11-223898, JP-A-9-230531, JP-A-10-36695, JP-A-10-104779, JP-A-11-231457, JP-A-11-352625, and JP-A-11-352626. The antihalation layer comprises an antihalation dye having an absorption in the exposure wavelength region. For example, in using an exposure light source having wavelengths in the infrared region, dyes showing an absorption in the infrared region can be used. In this case, dyes having no absorption in the visible region are preferred.

Where an antihalation dye having an absorption in the visible region is used, it is desirable for the dye to leave substantially no color after image formation. To this end, the heat of heat development is preferably taken advantage of for dye decoloration. It is an effective manipulation to add a thermally decolorable dye and a base precursor to a light-insensitive layer to make the layer function as an antihalation layer. Details of this technique are described in JP-A-11-231457.

The amount of the thermally decolorable dye depends on the use of the dye. In general, the decolorable dye is used in such an amount as to give an optical density (absorbance) higher than 0.1, preferably 0.15 to 2, still preferably 0.2 to 1, as measured at a wavelength used for exposure. This amount would correspond to about 0.001 to 1 $g/m^2$. Upon being heat treated, the thermally decolorable dye reduces its optical density to 0.1 or lower. Two or more decolorable dyes may be used in combination, in which cases two or more base precursors may be used in combination, too.

In such a thermal decoloration system using the decolorable dye and the base precursor, thermal decoloration will be ensured by using a substance which, when mixed with a base precursor, drops the melting point of the base precursor by 3° C. or more, such as diphenylsulfone, 4-chlorophenyl (phenyl)sulfone or 2-naphthyl benzoate, as suggested by JP-A-11-352626.

The photothermographic recording material of the present embodiment can contain a colorant having an absorption maximum in a wavelength between 300 nm and 450 nm for the purpose of improving a silver color tone and suppressing image change with time. Colorants usable for these purposes are described in JP-A-62-210458, JP-A-63-104046, JP-A-63-103235, JP-A-63-208846, JP-A-63-306436, JP-A-63-314535, JP-A-1-61745, and JP-A-2001-100363. Such a colorant is added in an amount usually of 0.1 to 1 $g/m^2$. It is preferably incorporated into the back layer that is provided on the side opposite to the light-sensitive layer.

The photothermographic recording material used in the present embodiment is preferably what we call a single-sided light-sensitive material which has at least one light-sensitive layer containing a silver halide emulsion on one side of the support and a back layer on the other side.

A matting agent is preferably used for good transportability of the recording material in the image-forming apparatus. Suitable matting agents are described in JP-A-11-65021, para. Nos. 0126 to 0127. An advisable amount of the matting agent to be incorporated into the recording material is 1 to 400 $mg/m^2$, particularly 5 to 300 $mg/m^2$.

The matting agent particles can have regular or irregular shapes, preferably regular shapes. Spherical shapes are preferred. The average particle size preferably ranges from 0.5 to 10 $\mu$m, particularly 1.0 to 8.0 $\mu$m, especially 2.0 to 6.0 $\mu$m. The coefficient of variation of particle size distribution is preferably 50% or less, still preferably 40% or less, particularly preferably 30% or less, the "coefficient of variation" being defined to be a standard deviation of particle size divided by a mean particle size and multiplied by 100. A combined use of two matting agents having small coefficients of variation and an average particle size ratio of 3 or greater is a preferred embodiment.

The degree of matting on the emulsion layer side is not particularly limited as long as a star dust defect does not occur. A preferred Bekk smoothness of the emulsion layer side is 30 to 2,000 seconds, particularly 40 to 1500 seconds, and that of the back layer is 10 to 1200 seconds, particularly 20 to 800 seconds, especially 40 to 500 seconds. A Bekk smoothness is easily determined according to JIS P-8119 (paper and board-determination of smoothness by Bekk method) or TAPPI T479.

The matting agent is preferably added to the outermost surface layer or a layer functioning as an outermost surface layer or a layer near the outer surface of the recording material. It is preferably added to a layer functioning as a protective layer.

With regard to the back layer which can be used in the present embodiment, reference can be made to it in JP-A-11-65021, para. Nos. 0128 to 0130.

The photothermographic recording material of the present embodiment preferably has a film surface pH of 7.0 or less, particularly 6.6 or less, before heat development. The lower limit of the film surface pH is, while not limited to, about 3. An especially preferred film surface pH is in a range 4 to 6.2. For lowering the film surface pH, film surface pH adjustment is preferably effected with nonvolatile acids including organic acids (e.g., phthalic acid derivatives) and sulfuric acid or volatile bases such as ammonia. Ammonia is particularly preferred for achieving a low film surface pH because it is easily removable by volatilization before application of a coating composition or heat development. A combined use of a nonvolatile base, such as sodium hydroxide, potassium hydroxide or lithium hydroxide, and ammonia is also preferred. A film surface pH is determined by the method described in JP-A-12-284399, para. No. 0123.

The light-sensitive layer, the protective layer, the back layer, etc. can each contain a hardening agent. Hardening techniques are described in T. H. James, *The Theory of the Photographic Process* (4th ed.), (1977), Macmillan Publishing Co., Inc., pp. 77–87. Suitable hardening agents include chrome alum, sodium 2,4-dichloro-6-hydroxy-s-triazine, N,N-ethylenebis(vinylsulfonacetamide), N,N-propylenebis (vinylsulfonacetamide), polyvalent metal ions described in ibid, p. 78, polyisocyanates described in U.S. Pat. No. 4,281,060 and JP-A-6-208193, epoxy compounds described in U.S. Pat. No. 4,791,042, and vinylsulfone compounds described in JP-A-62-89048.

The hardening agent is added in the form of a solution. A hardening agent solution is added to a coating composition from 3 hours to immediately before application, preferably from 2 hours to 10 seconds before application. Mixing methods and conditions are not limited as long as are consistent with the effects of the present embodiment. For example, the methods previously described with respect to mixing the light-sensitive silver halide emulsion into a coating composition are useful.

With regard to other additives and techniques applicable to the present embodiment, reference can be made in JP-A-11-65021, para. No. 0132 as for surface active agents, para. No. 0133 as for solvents, para. No. 0134 as for supports, para. No. 0135 as for static prevention or a conductive layer, and para. No. 0136 as for method of obtaining a color image. JP-A-11-84573, para. Nos. 0061 to 0064 and Japanese Patent Application No. 11-106881, para. Nos. 0049 to 0062 can be referred to as for slip agents.

The photothermographic recording material preferably has a conductive layer containing a metal oxide as a conducting material. A metal oxide having an oxygen defect or a hetero metal atom introduced therein to have enhanced conductivity is preferably used. Suitable metal oxides include ZnO, $TiO_2$, and $SnO_2$. ZnO is preferably doped with Al or In. $SnO_2$ is preferably doped with Sb, Nb, P, a halogen element, etc. $TiO_2$ is preferably doped with Nb, Ta, etc. Sb-doped $SnO_2$ is particularly preferred. The dopant hetero atom is preferably added in an amount of 0.01 to 30 mol %, particularly 0.1 to 10 mol %. The metal oxide particles can be of any shape including spheres, needles, and plates. From the standpoint of imparting conductivity, particles having an aspect ratio of 2.0 or more, particularly needle-like particles with an aspect ratio of 3.0 to 5.0, are preferred.

The metal oxide is preferably used in an amount of 1 to 1000 $mg/m^2$, particularly 10 to 500 $mg/m^2$, especially 20 to 200 $mg/m^2$. The conductive layer can be provided on either side of the recording material, preferably between the support and the back layer. Specific examples of the conductive layer are recited in JP-A-7-295146 and JP-A-11-223901.

A fluorine-containing surface active agent (hereinafter referred to as "fluorosurfactant") is preferably used in the present embodiment. Examples of suitable fluorosurfactants are described in JP-A-10-197985, JP-A-2000-19680, and JP-A-2000-214554. The polymeric fluorosurfactants described in JP-A-9-281636 are also preferred. The fluorosurfactants described in Japanese Patent Application Nos. 2000-206560, 2001-203462, 2001-242357, and 2001-264110 are specially preferred for the photothermographic recording material according to the present embodiment. Especially, the fluorosurfactants of Japanese Patent Application Nos. 2001-242357 and 2001-264110 exhibit satisfactory performance in charge control capabilities, stabilization of coating layer surface conditions, and slip properties when applied to aqueous coating compositions. Those of No. 20901-264110 are particularly preferred; for they have high charge control capabilities at reduced amounts.

The fluorosurfactants are applicable to the emulsion layer side and/or the back side, preferably both sides, of the recording material. It is a preferred mode to use the fluorosurfactant in combination with the above-mentioned metal oxide-containing conductive layer. This mode permits reduction in amount of the fluorosurfactant to be used on the conductive layer side while retaining sufficient performance.

A suitable amount of the fluorosurfactant to be used is in a range 0. 1 to 100 $mg/m^2$, preferably 0.3 to 30 $mg/m^2$, still preferably 1 to 10 $mg/m^2$, per side. The fluorosurfactants of Japanese Patent Application Nos. 2001-264110 supra, in particular, are effective in reduced amounts preferably of 0.01 to 10 mg, still preferably of 0.1 to 5 $mg^2$, per side for their high surface activity.

Transparent supports which are used in the present embodiment include polyesters, particularly polyethylene terephthalate, having been subjected to heat treatment at 130 to 185° C. so as to relax residual internal strain after biaxial stretching and to prevent thermal shrinkage strain from occurring in heat development. For diagnostic applications, the transparent support may be either colorless or tinged with a blue dye (e.g., dye-1 used in Example of JP-A-8-240877). A subbing layer is preferably provided on the support. The subbing layer can be of a water-soluble polyester of JP-A-11-84574, a styrene-butadiene copolymer of JP-A-10-186565, or a vinylidene chloride copolymer of JP-A-12-39684 and Japanese Patent Application No. 11-106881 (para. Nos. 0063 to 0080). With respect to an antistatic layer or the subbing layer, reference can be made in JP-A-56-143430, JP-A-56-143431, JP-A-58-62646, JP-A-56-120519, JP-A-11-84573 (para. Nos. 0040 to 0051), U.S. Pat. No. 5,575,957, and JP-A-11-223898 (para. Nos. 0078 to 0084).

The photothermographic recording material is preferably of monosheet type, which forms an image on itself without using another sheet such as an image-receiving sheet.

The photothermographic recording material can contain antioxidants, stabilizers, plasticizers, ultraviolet absorbers, or coating aids. Such additives are added to either the light-sensitive layer or the light-insensitive layer. Reference can be made to it in WO98/36322, EP 803764A1, JP-A-10-186567, and JP-A-10-186568.

The photothermographic recording material is produced by any coating techniques including extrusion coating, slide coating, curtain coating, dip coating, knife coating, flow coating, and extrusion coating using a hopper of the type disclosed in U.S. Pat. No. 2,681,294. Extrusion coating and slide coating techniques described in Stephen F. Kistler and Petert M. Schweizer, *Liquid Film Coating*, (1997), Chapman & Hall, pp. 399–536 are preferred. A slide coating technique is particularly preferred. An example of slide coater configurations used in slide coating is illustrated in ibid, p. 427, FIG. 11b.1. If desired, two or more layers can be formed by simultaneous coating according to the methods taught in ibid, pp. 399–536, U.S. Pat. No. 2,761,791, and British Patent 837,095.

The organic silver salt-containing coating composition used in the present embodiment is preferably a thixotropic fluid. With respect to this technique JP-A-11-52509 can be referred to. The organic silver salt-containing coating composition preferably has a viscosity of 400 to 100,000 mPa.s, particularly 500 to 20,000 mPa.s, at a shear rate of 0.1 s$^{-1}$ and 1 to 200 mPa.s, particularly 5 to 80 mPa.s, at a shear rate of 100 s$^{-1}$.

In addition, techniques disclosed in the following publications can be applied to the photothermographic recording material for use in the present embodiment: EP803764A1, EP883022A1, WO98/36322, JP-A-56-62648, JP-A-58-62644, JP-A-9-43766, JP-A-9-281637, JP-A-9-297367, JP-A-9-304869, JP-A-9-311405, JP-A-9-329865, JP-A-10-10669, JP-A-10-62899, JP-A-10-69023, JP-A-10-186568, JP-A-10-90823, JP-A-10-171063, JP-A-10-186565, JP-A-10-186567, JP-A-10-186569 to 186572, JP-A-10-197974, JP-A-10-197982, JP-A-10-197983, JP-A-10-197985 to 197987, JP-A-10-207001, JP-A-10-207004, JP-A-10-221807, JP-A-10-282601, JP-A-288823, JP-A-10-288824, JP-A-10-307365, JP-A-10-312038, JP-A-10-339934, JP-A-11-7100, JP-A-11-15105, JP-A-11-24200, JP-A-11-24201, JP-A-11-30832, JP-A-11-84574, JP-A-11-65021, JP-A-11-109547, JP-A-125880, JP-A-129629, JP-A-11-133536 to 133539, JP-A-11-133542, JP-A-11-133543, JP-A-11-223898, JP-A-11-352627, JP-A-11-305377, JP-A-JP-A-11-305378, JP-A-11-305384, JP-A-11-305380, JP-A-11-316435, JP-A-11-327076, JP-A-11-338096, JP-A-11-338098, JP-A-11-338099, JP-A-11-343420, and Japanese Patent Application Nos. 2000-187298, 2000-10229, 2000-47345, 2000-206642, 2000-98530, 2000-98531, 2000-112059, 2000-112060, 2000-112104, 2000-112064, and 2000-171936.

The photothermographic recording material (raw stock) is preferably packaged in a packaging material having low oxygen and/or moisture permeability to suppress variation of photographic performance or curling during storage before exposure. A preferred oxygen permeability is 50 ml/atm.m$^2$.day or less, particularly 10 ml/atm.m$^2$.day or less, especially 1.0 ml/atm.m$^2$.day or less, at 25° C. A preferred moisture permeability is 10 g/atm.m$^2$.day or less, particularly 5 g/atm.m$^2$.day or less, especially 1 g/atm.m$^2$.day. The packaging materials described in JP-A-8-254793 and JP-A-12-206653 are examples of those with low oxygen and/or moisture permeability.

Methods for carrying out heat development of the photothermographic recording material are not restricted. The imagewise exposed recording material of the present embodiment is usually heat developed by heating the recording material. A preferred heating temperature is 80 to 250° C., particularly 100 to 140° C., especially 110 to 130° C. The heating time is preferably 1 to 60 seconds, still preferably 3 to 30 seconds, particularly preferably 5 to 25 seconds, especially preferably 7 to 15 seconds.

The heat development can be performed by either a drum heater system or a plate heater system. A plate heater system is preferred. The heat developing apparatus of plate heater system disclosed in JP-A-11-133572 is recommended, in which a photothermographic material having a latent image is brought into contact with a heating unit in a heat developing section to visualize the latent image. The apparatus has a plate heater as a heating unit and a plurality of press rollers arranged to face one side of the plate heater. A photothermographic material is heat developed while passing between the plate heater and the press rollers. It is preferred that the heating unit be divided into 2 to 6 sections, and the temperature of the most upstream section be lower than the temperature of the other sections by about 1 to 10° C. In an example, the heating unit has four plate heaters whose temperature are independently controllable, and the plate heaters are controlled at 112° C., 119° C., 121° C., and 120° C. in the order of contact with the recording material. Such a technique is proposed in JP-A-54-30032. According to the proposal, the water content and the organic solvent present in the recording material can be driven out of the system, and the recording material is prevented from being abruptly heated which can cause deformation of the support of the recording material.

The method for imagewise exposing the photothermographic recording material is not limited. Laser light is preferably used as an exposure light source. Preferred lasers include gas lasers (Ar$^+$ and He—Ne lasers), YAG lasers, dye lasers, and semiconductor lasers. A combination of a semiconductor laser and an SHG (second harmonic generation) element is useful. Gas or semiconductor lasers emitting light in the red to infrared region are preferred.

Commercially available medical imaging systems having an imagewise exposure section and a heat development section include Fuji Medical Dry Imager FM-DP L from Fuji Medical Systems Inc. The details of FM-DP L are described in Fuji Medical Review, No. 8, pp. 39–55. Needless to say, the technology of FM-DP L applies to imaging on the photothermographic recording materials according to the present embodiment. The photothermographic recording materials of the present embodiment is also applicable to the laser imager adapted in "Ad Network" Fuji Medical Systems Inc. has established in conformity to the DICOM standard.

The photothermographic recording material according to the above-described embodiment provides a black- anf-white image of developed silver and is suitable for diagnostic application, industrial photography, printing, and computer output microfilm (COM) application.

The present invention will now be illustrated in greater detail with reference to Examples, but it should be understood that the invention is not deemed to be limited thereto. Unless otherwise noted, all the percents and ratios are given by weight.

EXAMPLE 1

1) Preparation of PETP Support

Polyethylene terephthalate (PETP) having an intrinsic viscosity of 0.66 (measured in phenol/tetrachloroethane=6/4 at 25° C.) was prepared from terephthalic acid and ethylene glycol in a usual manner. PETP was pelletized, dried at 130° C. for 4 hours, melted at 300° C., extruded through a T-die, and quenched to obtain an unstretched film which would have a thickness of 175 µm after biaxial stretch and heat set.

The film was stretched 3.3 times in the machine direction by means of rolls having different peripheral speeds and then 4.5 times in the transverse direction with a tenter at 110° C. and 130° C., respectively. The biaxially stretched film was heat set at 240° C. for 20 seconds, followed by 4% relaxation at the same temperature in the transverse direction. Both lateral edges were trimmed and knurled, and the film (thickness: 175 µm) was wound under tension of 4 kg/cm$^2$ into a roll.

Both sides of the PETP film was treated in a solid-state corona surface treatment system (6KVA Model, supplied by Pillar Technologies) at a rate of 20 m/min at room temperature. Current and voltage readings showed that the film was given a corona treatment of 0.375 kV.A.min/m$^2$. The treating frequency was 9.6 kHz, and the air gap between electrodes and the dielectric roll was 1.6 mm.

2) Preparation of Support with Subbing Layers

Formulation (a) shown below was applied to one side (on which a light-sensitive emulsion was to be applied) of the biaxially stretched and corona treated PETP support (thickness: 175 µm) with a wire bar coater at a wet spread of 6.6 ml/m$^2$ and dried at 180° C. for 5 minutes. Formulation (b) shown below was applied to the opposite side (back side) of the support with a wire bar coater at a wet spread of 5.7 ml/m$^2$ and dried at 180° C. for 5 minutes. Formulation (c) shown below was applied on the formulation (b) subbing layer with a wire bar at a wet spread of 7.7 ml/m$^2$ and dried at 180° C. for 6 minutes to prepare a support with subbing layers.

Formulation (a) (for light-sensitive layer side subbing layer):
  Pesresin A-520 (30% solution), available from Takamatsu Oil & Fat Co., Ltd. 59 g
  Polyethylene glycol monononylphenyl ether (average mole number of ethylene oxide units: 8.5; 10% solution) 5.4 g MP-1000 (fine polymer particles; average particle size: 0.4 µm), available from Soken Chemical & Engineering Co., Ltd. 0.91 g
  Distilled water 935 ml
Formulation (b) (for 1st subbing layer on back side):
  Styrene-butadiene copolymer latex (solid content: 40%; styrene/butadiene=68/32) 158 g
  Sodium 2,4-dichloro-6-hydroxy-s-triazine (8% aqueous solution) 20 g
  Sodium laurylbenzenesulfonate (1% aqueous solution) 10 ml
  Distilled water 854 ml
Formulation (c) (or 2nd subbing layer on back side):
  SnO$_2$/SbO (=9/1; average particle size: 0.038 µm; 17% dispersion) 84 g
  Gelatin (10% aqueous solution) 89.2 g
  Metholose TC-5 (2% aqueous solution), available from Shin-Etsu Chemical Co., Ltd. 8.6 g
  MP-1000, from Soken Chemical & Engineering Co., Ltd. 0.01 g
  Sodium dodecylbenzenesulfonate (1% aqueous solution) 10 ml
  NaOH (1% aqueous solution) 6 ml
  Proxel, available from ICI 1 ml
  Distilled water 805 ml 3) Preparation of Back Side Coating Compositions 3-1) Preparation of Base Precursor Dispersion (a)

Base precursor-1 shown below (1.5 kg), 225 g of a surface active agent (Demol N, available from Kao Corp.), 937.5 g of diphenylsulfone, 15 g of butyl p-hydroxybenzoate (Mekkins, available from Ueno Seiyaku), and distilled water were mixed up to make 5.0 kg. The mixture was delivered by a diaphragm pump to a transverse sand mill (UVM-2, supplied by Aimex Co., Ltd.) containing zirconia beads having an average diameter of 0.5 mm and dispersed under an inner pressure of 50 hPa or higher until the dispersed particles were reduced to a desired average particle size (until the dispersion had a ratio of the absorbance (optical density) at 450 nm to the absorbance at 650 nm (D450/D650), measured by spectral absorption analysis, of 2.2 or greater). The resulting dispersion was diluted with distilled water to the base precursor concentration of 20% and filtered through a polypropylene filter having an average pore size of 3 µm to remove foreign matter, such as dust, and stored.

3-2) Preparation of Dye Dispersion

Cyanine dye-1 shown below (6.0 kg), 3.0 kg of sodium p-dodecylbenzenesulfonate, 0.6 kg of a surfactant (Demol SNB, available from Kao Corp.), 0.15 kg of a defoaming agent (Surfynol 104E, available from Nisshin Chemical Industry Co., Ltd.), and distilled water were mixed up to make 60 kg. The mixture was dispersed in a transverse sand mill UVM-2 containing zirconia beads having an average diameter of 0.5 mm and dispersed until the dispersion had a ratio of the absorbance at 650 nm to the absorbance at 750 nm (D650/D750) as measured by spectral absorption analysis of 5.0 or greater. The resulting dispersion was diluted with distilled water to the cyanine dye concentration of 6% and filtered through a filter having an average pore size of 1 µm to remove foreign matter.

3-3) Preparation of Antihalation Layer Coating Composition

An antihalation layer coating composition was prepared by mixing 30 g of gelatin, 24.5 g of polyacrylamide, 2.2 g of a 1 mol/l aqueous solution of sodium hydroxide, 2.4 g of monodispersed polymethyl methacrylate particles (average particle size: 8 µm; particle size standard deviation: 0.4), 0.08 g of benzoisothiazolinone, 35.9 g of the dye dispersion prepared in (3-2) above, 74.2 g of the base precursor dispersion (a) prepared in (3-1) above, 0.6 g of sodium polyethylenesulfonate, 0.21 g of blue dye compound-1 shown below, 0.15 g of yellow dye compound-1 shown below, and 8.3 g of an acrylic acid/ethyl acrylate (5/95) copolymer latex were mixed, and water was added to make 818 ml to prepare a coating composition for antihalation layer.

3-4) Preparation of Protective Layer (Back Side) Coating Composition

In a container maintained at 40° C., 40 g of gelatin, a liquid paraffin emulsion containing 1.5 g of liquid paraffin, 35 mg of benzoisothiazolinone, 6.8 g of a 1 mol/l aqueous solution of sodium hydroxide, 0.5 g of sodium t-octylphenoxyethoxyethanesulfonate, 0.27 g of sodium polystyrenesulfonate, 5.4 ml of a 2% aqueous solution of a fluorosurfactant (F-1) shown below, 5.4 ml of a 2% aqueous solution of a fluorosurfactant (F-2) shown below, 6.0 g of an acrylic acid/ethyl acrylate (5/95) copolymer, and 2.0 g of N,N-ethylenebis(vinylsulfonacetamide) were mixed, and water was added to make 1000 ml to prepare a coating composition for back side protective layer.

4) Preparation of Silver Halide Emulsion 4-1) Preparation of Silver Halide Emulsion-1

To 1421 ml of distilled water was added 3.1 ml of a 1% aqueous solution of potassium iodide, and 3.5 ml of 0.5 mol/l sulfuric acid and 31.7 g of phthalated gelatin were added thereto. While stirring the mixture in a stainless steel reaction vessel at a liquid temperature kept at 30° C., solution A prepared by diluting 22.22 g of silver nitrate with distilled water to make 95.4 ml and solution B prepared by diluting 15.3 g of potassium bromide and 0.8 g of potassium iodide with distilled water to make 97.4 ml were added to the mixture at a constant rate over a 45 second period. To the mixture were added 10 ml of a 3.5% aqueous solution of hydrogen peroxide and then 10.8 ml of a 10% aqueous solution of benzimidazole.

Solution C was prepared by diluting 51.86 g of silver nitrate with distilled water to make 317.5 ml. Solution D was prepared by diluting 44.2 g of potassium bromide and 2.2 g of potassium iodide with distilled water to make 400 ml. Solution C was added to the mixture at a constant rate over a 20 minute period. Solution D was added according to a controlled double jet method while maintaining the pAg at 8.1. Ten minutes from the start of the addition of solutions C and D, potassium hexachloroiridate (III) was added to the system to give a final concentration of $1 \times 10^{-4}$ mol per mole of silver. Five seconds after completion of addition of solution C, an aqueous solution of $3 \times 10^{-4}$ mol, per mole of silver, of potassium hexacyanoferrate (II) was added to the system. The pH of the system was adjusted to 3.8 with 0.5 mol/l sulfuric acid. The stirring was stopped, and the mixture was subjected to flocculation, desalting, and washing with water. The pH was adjusted to 5.9 with 1 mol/l sodium hydroxide to obtain a silver halide dispersion having a pAg of 8.0.

While maintaining the silver halide dispersion at 38° C. with stirring, 5 ml of a 0.34% methanolic solution of 1,2-benzoisothiazolin-3-one was added thereto. Forty minutes later, a methanol solution containing $1.2 \times 10^{-3}$ mol, per mole of silver, of a 1:1 (by mole) mixture of spectral sensitizing dyes A and B shown below was added. One minute later, the system was heated to 47° C. Twenty minutes after the temperature reached 47° C., a methanol solution of $7.6 \times 10^{-5}$ mol, per mole of silver, of sodium benzenethiosulfonate was added. Five minutes later, a methanol solution of $2.9 \times 10^{-4}$ mol, per mole of silver, of tellurium sensitizer C shown below was added, followed by ripening for 91 minutes. To the system was added 1.3 ml of a 0.8% methanol solution of N,N'-dihydroxy-N"-diethylmelamine. Four minutes later, a methanol solution of $4.8 \times 10^{-3}$ mol, per mole of silver, of 5-methyl-2-mercaptobenzimidazole and a methanol solution of $5.4 \times 10^{-3}$ mol, per mole of silver, of 1-phenyl-2-heptyl-5-mercapto-1,3,4-triazole were added to prepare silver halide emulsion-1.

Silver halide emulsion-1 contained silver iodobromide grains having an average sphere-equivalent diameter of 0.042 μm with a size variation coefficient of 20% and an iodide content of 3.5 mol % uniformly distributed therein. The particle size and its distribution were calculated from the data of 1000 grains under electron microscopic observation. The area ratio of the [100] plane of the grains was 80% as calculated by Kubelka Munk transformation.

4-2) Preparation of Silver Halide Emulsion-2

A silver halide emulsion was prepared in the same manner as in (4-1) above, except that the liquid temperature during the grain formation was changed from 30° C. to 47° C., solution B was prepared by diluting 15.9 g of potassium bromide with distilled water to make 97.4 ml, solution D was prepared by diluting 45.8 g of potassium bromide with distilled water to make 400 ml, solution C was added over a 30 minute period, and potassium hexacyanoferrate (II) was not added.

The emulsion was subjected to the steps of flocculation, desalting, washing, and dispersion in the same manner as in (4-1). The resulting silver halide emulsion was spectrally and chemically sensitized, and 1-phenyl-2-heptyl-5-mercapto-1,3,4-triazole was added to the emulsion in the same manner as in (4-1), except for changing the amount of the 1:1 (by mole) mixture of spectral sensitizing dyes A and B in the form of a methanol solution to $7.5 \times 10^{-4}$ mol, per mole of silver, the amount of tellurium sensitizer C to $1.1 \times 10^{-4}$ mol per mole of silver, and the amount of 1-phenyl-2-heptyl-5-mercapto-1,3,4-triazole to $3.3 \times 10^{-3}$ mol per mole of silver, to obtain silver halide emulsion-2. Silver halide emulsion-2 contained pure silver bromide cubic grains having an average spherical-equivalent diameter of 0.080 μm with a particle size variation coefficient of 20%.

4-3) Preparation of Silver Halide Emulsion-3

A silver halide emulsion was prepared in the same manner as in (4-1) above, except that the liquid temperature during the grain formation was changed from 30° C. to 27° C. The resulting emulsion was subjected to the steps of flocculation, desalting, washing, and dispersion in the same manner as in (4-1). Silver halide emulsion-3 was prepared in the same manner as for silver halide emulsion-1, except that the amount of the 1:1 (by mole) mixture of spectral sensitizing dyes A and B in the form of a methanol solution was changed to $6 \times 10^{-3}$ mol, per mole of silver, the amount of tellurium sensitizer C was changed to $5.2 \times 10^{-4}$ mol per mole of silver, and $5 \times 10^{-4}$ mol of bromoauric acid and $2 \times 10^{-3}$ mol of potassium thiocyanate, each per mole of silver, were added three minutes after the addition of the tellurium sensitizer. Silver halide emulsion-3 contained silver iodobromide grains having an average spherical-equivalent diameter of 0.034 μm with a particle size variation coefficient of 20% and an iodide content of 3.5 mol % uniformly distributed therein.

4-4) Preparation of Mixed Emulsion A (To Be Compounded into Emulsion Layer Coating Composition)

Silver halide emulsion-1, silver halide emulsion-2, and silver halide emulsion-3 were mixed at a ratio of 70:15:15, and a 1% aqueous solution of $7 \times 10^{-3}$ mol, per mole of silver, of benzothiazolium iodide was added thereto. Water was added to give a final silver halide content of 38.2 g in terms of silver per kilogram of the resulting silver halide emulsion A.

5) Preparation of Fatty Acid Silver Salt Dispersions 5-1) Preparation of Fatty Acid Silver Salt Dispersion A A mixture of 87.6 kg of bebenic acid (Edenor C22-85R, available from Henkel Chemical), 423 l of distilled water, 49.2 l of a 5 mol/l sodium hydroxide aqueous solution, and 120 l of t-butyl alcohol was allowed to react at 75° C. for 1 hour while stirring to prepare sodium behenate solution A. Separately, 206.2 l of an aqueous solution (Ph 4.0) of 40.4 kg of silver nitrate was prepared and kept at 10° C. A reaction vessel containing 635 l of distilled water and 30 l of t-butyl alcohol was maintained at 30° C., and the whole amount of the sodium behenate solution A and the whole amount of the silver nitrate aqueous solution were fed thereto while thoroughly stirring at the respective constant rates over a period of 93 minutes and 15 seconds and a period of 90 minutes, respectively. It was only the silver nitrate aqueous solution that was fed for the first 11 minutes from the start of addition. Addition of sodium behenate solution A was started thereafter. It was only sodium behenate solution A that was fed for the last 14 minutes and 15 seconds. During the addition, the inner temperature of the reaction vessel was maintained at 30° C., and the outside temperature was controlled so as to maintain the liquid temperature constant.

Sodium behenate solution A was fed through a double-pipe, and warm water was circulated in the outer pipe for heat insulation so that the liquid temperature at the tip of the feed nozzle might be 75° C. On the other hand, the silver nitrate aqueous solution was fed through a double-pipe with cooling water circulating in the outer pipe for heat insulation. The feeding positions for sodium behenate solution A and the silver nitrate aqueous solution were symmetric about the axis of stirring and at such heights where the nozzles might not touch the reaction mixture.

After completion of addition of sodium behenate solution A, the reaction system was kept stirred for an additional 20 minute period, then heated to 35° C. over a period of 30 minutes, followed by aging for 210 minutes. Immediately after the end of aging, solid matter was collected by centrifugal filtration and washed with water until the washing had a conductivity of 30 µS/cm. The solid (silver behenate) as filtered was stored as a wet cake.

The morphology of the resulting silver behenate particles was evaluated by electron microscopic imaging. As a result, they were found to be flaky crystals having average a, b, and c values (previously defined) of 0.14 µm, 0.4 µm, and 0.6 µm, respectively; an average aspect ratio of 5.2; and an average sphere-equivalent diameter of 0.52 µm with a size variation coefficient of 15%.

To 260 kg (on dry basis) of the wet cake were added 19.3 kg of polyvinyl alcohol (PVA-217, available from Kuraray Co., Ltd.) and water to make 1000 kg, and the mixture was slurried by means of a dissolver blade and preliminarily dispersed in a pipe line mixer (Model PM-10, supplied by Mizuho Industrial Co., Ltd.).

The preliminarily dispersed stock liquid was treated three times in a dispersing machine (Microfluidizer M-610 with interaction chamber Z, supplied by Microfluidics International Corp.) under an operating pressure of 1260 kg/cm$^2$ to obtain silver behenate dispersion A. The dispersing temperature was kept at 18° C. by controlling the coolant temperature of a serpentine tube heat exchanger attached to the front and the rear of the interaction chamber.

5-2) Preparation of Fatty Acid Silver Salt Dispersion B

In 1200 kg of isopropyl alcohol was dissolved 100 kg of behenic acid (Edenor C22-85R) by heating at 50° C. The solution was filtered through a 10 µm filter and cooled to 30° C. for recrystallization at a cooling rate of 3° C./hr. The crystals thus formed were collected by centrifugal filtration, washed under running isopropyl alcohol, and dried. The resulting crystals were found to have a silver behenate content of 96%, a lignoceric acid content of 2%, and an arachidic acid content of 2% as a result of GC-FID measurement on an esterified sample.

The recrystallized behenic acid (88 kg), 422 l of distilled water, 49.2 l of a 5 mol/l aqueous solution of sodium hydroxide, and 120 l of t-butyl alcohol were mixed and stirred at 75° C. for 1 hour to prepare sodium behenate solution B. Separately, 206.2 l of an aqueous solution (Ph 4.0) of 40.4 kg of silver nitrate was prepared and kept at 10° C. A reaction vessel containing 635 l of distilled water and 30 l of t-butyl alcohol was maintained at 30° C., and the whole amount of sodium behenate solution B and the whole amount of the silver nitrate aqueous solution were fed thereto while thoroughly stirring at the respective constant rates over a period of 93 minutes and 15 seconds and a period of 90 minutes, respectively. It was only the silver nitrate aqueous solution that was fed for the first 11 minutes from the start of addition. Addition of sodium behenate solution B was started thereafter. It was only the sodium behenate solution B that was fed for the last 14 minutes and 15 seconds. During the addition, the inner temperature of the reaction vessel was maintained at 30° C., and the outside temperature was controlled so as to maintain the liquid temperature constant. Sodium behenate solution B was fed through a double-pipe, and warm water was circulated in the outer pipe for heat insulation so that the liquid temperature at the tip of the feed nozzle might be 75° C. On the other hand, the silver nitrate aqueous solution was fed through a double-pipe with cooling water circulating in the outer pipe for heat insulation. The feeding positions for sodium behenate solution B and the silver nitrate aqueous solution were symmetric about the axis of stirring and at such heights where the nozzles might not touch the reaction mixture.

After completion of addition of sodium behenate solution B, the reaction system was kept stirred for an additional 20 minute period at the same temperature, then heated to 35° C. over a period of 30 minutes, followed by aging for 210 minutes. Immediately after the end of aging, solid matter was collected by centrifugal filtration and washed with water until the washing had a conductivity of 30 µS/cm. The solid (silver behenate) as filtered was stored as a wet cake.

The morphology of the resulting silver behenate particles was evaluated by electron microscopic imaging. As a result, they were found to be flaky crystals having average a, b, and c values (previously defined) of 0.21 µm, 0.4 µm, and 0.4 µm, respectively; an average aspect ratio of 2.1; and an average sphere-equivalent diameter of 0.51 µm with a size variation coefficient of 11%.

To 260 kg (on dry basis) of the wet cake were added 19.3 kg of polyvinyl alcohol (PVA-217, available from Kuraray Co., Ltd.) and water to make 1000 kg, and the mixture was slurried by means of a dissolver blade and preliminarily dispersed in a pipe line mixer (Model PM-10, supplied by Mizuho Industrial Co., Ltd.).

The preliminarily dispersed stock liquid was treated three times in a dispersing machine (Microfluidizer M-610 with interaction chamber Z, supplied by Microfluidics International Corp.) under an operating pressure of 1150 kg/cm$^2$ to obtain silver behenate dispersion B. The dispersing temperature was kept at 18° C. by controlling the coolant temperature of a serpentine tube heat exchanger attached to the front and the rear of the interaction chamber.

6) Preparation of Reducing Agent Dispersions 6-1) Preparation of Reducing Agent Complex-1 Dispersion Ten kilograms of water was added to a mixture of 10 kg of a 1:1 complex (reducing agent complex-1) of 6,6'-di-t-butyl-4,4'-dimethyl-2,2'-butylidenediphenol and triphenylphosphine oxide, 0.12 kg of triphenylphosphine oxide, and 16 kg of a 10% aqueous solution of modified polyvinyl alcohol (Poval MP203, available from Kuraray Co., Ltd.), and the mixture was stirred well into a slurry. The slurry was delivered by a diaphragm pump to a transverse sand mill (UVM-2, supplied by Aimex Co., Ltd.) containing zirconia beads having an average diameter of 0.5 mm and dispersed for 4.5 hours. To the dispersion were added 0.2 g of sodium benzoisothiazolinone and an adequate amount of water to obtain a dispersion having a reducing agent complex-1 concentration of 22%.

The dispersed particles of reducing agent complex-1 had a median diameter of 0.45 µm and a maximum diameter of 1.4 µm. The resulting dispersion was filtered through a polypropylene filter having a pore size of 3.0 µm to remove foreign matter, such as dust, and stored.

6-2) Preparation of Reducing Agent-2 Dispersion

Ten kilograms of water was added to a mixture of 10 kg of 6,6'-di-t-butyl-4,4'-dimethyl-2,2'-butylidenediphenol (reducing agent-2) and 16 kg of a 10% aqueous solution of modified polyvinyl alcohol (Poval MP203, available from Kuraray Co., Ltd.), and the mixture was stirred well into a slurry. The slurry was delivered by a diaphragm pump to a transverse sand mill (UVM-2) containing zirconia beads having an average diameter of 0.5 mm and dispersed for 3.5 hours. To the dispersion were added 0.2 g of sodium benzoisothiazolinone and an adequate amount of water to obtain a dispersion having a reducing agent-2 concentration of 25%. The dispersion was heat treated at 60° C. for 5 hours to prepare a reducing agent-2 dispersion.

The dispersed particles of reducing agent-2 had a median diameter of 0.40 μm and a maximum diameter of 1.5 μm. The resulting dispersion was filtered through a polypropylene filter having a pore size of 3.0 μm to remove foreign matter, such as dust, and stored.

7) Preparation of Hydrogen-bonding Compound-1 Dispersion

Ten kilograms of water was added to a mixture of 10 kg of tri(4-t-butylphenyl)phosphine oxide (hydrogen-bonding compound-1) and 16 kg of a 10% aqueous solution of modified polyvinyl alcohol (Poval MP203), and the mixture was stirred well into a slurry. The slurry was delivered by a diaphragm pump to a transverse sand mill (UVM-2) containing zirconia beads having an average diameter of 0.5 mm and dispersed for 3.5 hours. To the dispersion were added 0.2 g of sodium benzoisothiazolinone and an adequate amount of water to adjust the hydrogen-bonding compound-1 concentration to 25%. The dispersion was heated at 80° C. for 1 hour to obtain a hydrogen-bonding compound-1 dispersion.

The dispersed particles of hydrogen-bonding compound-1 had a median diameter of 0.35 μm and a maximum particle diameter of 1.5 μm. The resulting dispersion was filtered through a polypropylene filter having a pore size of 3.0 μm to remove foreign matter, such as dust, and stored.

8) Preparation of Development Accelerator-1 Dispersion

Ten kilograms of water was added to a mixture of 10 kg of development accelerator-1 shown below and 20 kg of a 10% aqueous solution of modified polyvinyl alcohol (Poval MP203), and the mixture was stirred well into a slurry. The slurry was delivered by a diaphragm pump to a transverse sand mill (UVM-2) containing zirconia beads having an average diameter of 0.5 mm and dispersed for 3.5 hours. To the dispersion were added 0.2 g of sodium benzoisothiazolinone and an adequate amount of water to prepare a development accelerator-1 dispersion having a development accelerator-1 concentration of 20%. The dispersed particles of development accelerator-1 had a median diameter of 0.48 μm and a maximum particle diameter of 1.4 μm. The resulting dispersion was filtered through a polypropylene filter having a pore size of 3.0 μm to remove foreign matter, such as dust, and stored.

A dispersion containing 20% development accelerator-2 shown below and a dispersion containing 20% toning agent-1 shown below were prepared in the same manner as for the development accelerator-1 dispersion.

9) Preparation of Polyhalogen Compound Dispersions 9-1) Preparation of Polyhalogen Compound-1 Dispersion A mixture of ratio of 10 kg tribromomethanesulfonylbenzene (polyhalogen compound-1), 10 kg of a 20% aqueous solution of modified polyvinyl alcohol (Poval MP203), 0.4 kg of a 20% aqueous solution of sodium triisopropylnaphthalenesulfonate, and 14 kg of water was stirred well to prepare a slurry. The slurry was delivered by a diaphragm pump to a transverse sand mill (UVM-2) containing zirconia beads having an average diameter of 0.5 mm and dispersed for 5 hours. To the dispersion were added 0.2 g of sodium benzoisothiazolinone and an adequate amount of water to prepare an organic polyhalogen compound-1 dispersion having the polyhalogen compound-1 concentration of 26%.

The dispersed particles of polyhalogen compound-1 had a median diameter of 0.41 μm and a maximum particle diameter of 2.0 μm. The resulting dispersion was filtered through a polypropylene filter having a pore size of 10.0 μm to remove foreign matter, such as dust, and stored.

9-2) Preparation of Polyhalogen Compound-2 Dispersion

A mixture of 10 kg of N-butyl-3-tribromomethanesulfonylbenzamide (polyhalogen compound-2), 20 kg of a 10% aqueous solution of modified polyvinyl alcohol (Poval MP203), and 0.4 kg of a 20% aqueous solution of sodium triisopropylnaphthalenesulfonate was stirred well to prepare a slurry. The slurry was delivered by a diaphragm pump to a transverse sand mill (UVM-2) containing zirconia beads having an average diameter of 0.5 mm and dispersed for 5 hours. To the dispersion were added 0.2 g of sodium benzoisothiazolinone and an adequate amount of water to adjust the polyhalogen compound-2 concentration to 30%. The dispersion was heated at 40° C. for 5 hours to a prepare polyhalogen compound-2 dispersion. The dispersed particles of polyhalogen compound-2 had a median diameter of 0.40 μm and a maximum particle diameter of 1.3 μm. The resulting dispersion was filtered through a polypropylene filter having a pore size of 3.0 μm to remove foreign matter, such as dust, and stored.

10) Preparation of Phthalazine Compound-1 Solution

Eight kilograms of modified polyvinyl alcohol MP203 was dissolved in 174.57 kg of water, and 3.15 kg of a 20% aqueous solution of sodium triisopropylnaphthalenesulfonate and 14.28 kg of a 70% aqueous solution of 6-isopropylphthalazine (phthalazine compound-1) were added thereto to prepare a 5% phthalazine compound-1 solution.

11) Preparation of Mercapto Compound Solutions 11-1) Preparation of Mercapto Compound-1 Aqueous Solution Seven grams of sodium 1-(3-sulfophenyl)-5-mercaptotetrazole (mercapto compound-1) was dissolved in 993 g of water to prepare a 0.7% aqueous solution.

11-2) Preparation of Mercapto Compound-2 Aqueous Solution

Twenty grams of sodium 1-(3-methylureido)-5-mercaptotetrazole (mercapto compound-2) was dissolved in 980 g of water to prepare a 2.0% aqueous solution.

12) Preparation of Pigment-1 Dispersion

Sixty-four grams of C.I. Pigment Blue 60 (pigment-1) and 6.4 g of Demol N (available from Kao Corp.) were mixed well in 250 g of water to prepare a slurry. The slurry was put in a vessel together with 800 g of zirconia beads having an average diameter of 0.5 mm and dispersed in a dispersing machine (¼G Sand Grinder Mill, supplied by Aimex Co., Ltd.) for 25 hours to obtain a pigment-1 dispersion. The dispersed pigment particles had an average particle size of 0.21 μm.

13) Preparation of SBR Latex

Styrene, butadiene, and acrylic acid were emulsion polymerized at a ratio of 70.0/27.0/3.0 by using ammonium persulfate as an initiator and an anionic surface active agent as an emulsifying agent. After aging at 80° C. or 8 hours, the emulsion was cooled to 40° C. and adjusted to pH 7.0 with aqueous ammonia. Sandet BL (available from Sanyo Chemical Industries, Ltd.) was added thereto in a concentration of 0.22%, and the emulsion was adjusted to pH 8.3 with a 5% sodium hydroxide aqueous solution and then to pH 8.4 with aqueous ammonia. The molar ratio of $Na^+$ ions to $NH_4^+$ ions was 1:2.3. To 1 kg of the emulsion was added 0.15 ml of a 7% sodium benzoisothiazolinone aqueous solution to prepare an SBR latex.

The resulting SBR latex had the following properties. Tg: 22° C.; average particle size: 0.1 μm; solid content: 43%; equilibrium moisture content (25° C.; 60% RH): 0.6%; ionic conductivity: 4.2 mS/cm (measured on the latex stock (43%) at 25° C. with an ionic conductivity meter CM-30S supplied by Toa Electronics Ltd.); pH: 8.4.

SBR latices having different Tg's were prepared in the same manner as described above, except for changing the copolymerization ratio of styrene and butadiene.

14) Preparation of Emulsion Layer (Light-sensitive Layer) Coating Compositions 14-1) Preparation of Emulsion Layer Coating Composition-1

A thousand grams of the fatty acid silver salt dispersion, 276 ml of water, 33 g of the pigment-1 dispersion, 21 g of the polyhalogen compound-1 dispersion, 58 g of the polyhalogen compound-2 dispersion, 173 g of the phthalazine compound-1 solution, 1082 g of the SBR latex (Tg: 20° C.); 299 g of the reducing agent complex-1 dispersion, 5.7 g of the development accelerator-1 dispersion, 9 ml of the mercapto compound-1 aqueous solution, and 27 ml of the mercapto compound-2 aqueous solution were mixed up successively. Immediately before application, 117 g of the silver halide emulsion A was added thereto, followed by mixing well. The emulsion layer coating composition-1 thus prepared was delivered to a coating die and applied.

The emulsion layer coating composition-1 had a viscosity of 25 mPa.s measured at 40° C. with a Brookfield viscometer (No. 1 rotor, 60 rpm, supplied by Tokyo Keiki) and a viscosity of 230, 60, 46, 24, and 18 mPa.s at a shear rate of 0.1, 1, 10, 100, and 1000 $s^{-1}$, respectively, measured at 25° C. with Rheometrics Fluid Spectrometer (RFS) supplied by Rheometrics Far East. The coating composition had a zirconium content of 0.38 mg per gram of silver.

14-2) Preparation of Emulsion Layer Coating Composition-2

A thousand grams of the fatty acid silver salt dispersion, 276 ml of water, 35 g of the pigment-1 dispersion, 32 g of the polyhalogen compound-1 dispersion, 46 g of the polyhalogen compound-2 dispersion, 173 g of the phthalazine compound-1 solution, 1082 g of the SBR latex (Tg: 20° C.); 153 g of the reducing agent-2 dispersion, 55 g of the hydrogen-bonding compound-1 dispersion, 4.8 g of the development accelerator-1 dispersion, 5.2 g of the development accelerator-2 dispersion, 2.1 g of the toning agent-1 dispersion, and 8 ml of the mercapto compound-2 aqueous solution were mixed up successively. Immediately before application, 140 g of the silver halide emulsion A was added thereto, followed by mixing well. The emulsion layer coating composition-2 thus prepared was delivered to a coating die and applied.

The emulsion layer coating composition-2 had a viscosity of 40 mPa.s measured at 40° C. with a Brookfield viscometer (No. 1 rotor, 60 rpm, supplied by Tokyo Keiki) and a viscosity of 530, 144, 96, 51, and 28 mPa.s at a shear rate of 0.1, 1, 10, 100, and 1000 $s^{-1}$, respectively, measured at 25° C. with Rheometrics Fluid Spectrometer (RFS) supplied by Rheometrics Far East. The coating composition has a zirconium content of 0.25 mg per gram of silver.

15) Preparation of Light-insensitive Layer (Emulsion Layer Side) Coating Compositions 15-1) Preparation of Intermediate Layer Coating Composition A thousand grams of polyvinyl alcohol (PVA-205, from Kuraray Co., Ltd.), 272 g of a 5% pigment dispersion, and 4200 ml of a 19% (solids content) latex of a methyl methacrylate/styrene/butyl acrylate/hydroxyethyl methacrylate/acrylic acid (64/9/20/5/2) copolymer were mixed, and 27 ml of a 5% aqueous solution of aerosol OT (available from American Cyanamid Co:), 135 ml of a 20% aqueous solution of diammonium phthalate, and a requisite amount of water were added thereto to make 10 kg in total. The pH was adjusted to 7.5 with an aqueous sodium hydroxide solution to prepare an intermediate coating composition, which was delivered to a coating die at a rate of 9.1 ml/m². The coating composition had a viscosity of 58 mPa.s measured at 40° C. with a Brookfield viscometer (No. 1 rotor, 60 rpm).

15-2) Preparation of 1st Protective Layer Coating Composition

To an aqueous solution of 64 g of inert gelatin were added 112 g of a 19.0% (solids content) latex of a methyl methacrylate/styrene/butyl acrylate/hydroxyethyl methacrylate/acrylic acid (64/9/20/5/2) copolymer, 30 ml of a 15% methanol solution of phthalic acid, 23 ml of a 10% aqueous solution of 4-methylphthalic acid, 28 ml of 0.5 mol/l sulfuric acid, 5 ml of a 5% aqueous solution of aerosol OT, 0.5 g of phenoxyethanol, and 0.1 g of benzoisothiazolinone. Water was added to the mixture to make a coating composition weighing 750 g. Immediately before application, 26 ml of 4% chrome alum was mixed into the coating composition by means of a static mixer, and the coating composition was fed to a coating die at a rate of 18.6 ml/m².

The coating composition had a viscosity of 20 mPa.s measured at 40° C. with a Brookfield viscometer (No. 1 rotor, 60 rpm).

15-3) Preparation of 2nd Protective Layer Coating Composition

To an aqueous solution of 80 g of inert gelatin were added 102 g of a 27.5% (solids content) latex of a methyl methacrylate/styrene/butyl acrylate/hydroxyethyl methacrylate/acrylic acid (64/9/20/5/2) copolymer, 5.4 ml of a 2% solution of a fluorosurfactant (F-1), 5.4 ml of a 2% aqueous solution of a fluorosurfactant (F-2), 23 ml of a 5% solution of aerosol OT, 4 g of polymethyl methacrylate particles (average particle size: 0.7 μm), 21 g of polymethyl methacrylate particles (average particle size: 4.5 μm), 1.6 g of 4-methylphthalic acid, 4.8 g of phthalic acid, 44 ml of 0.5 mol/l sulfuric acid, and 10 mg of benzoisothiazolinone. Water was added to the mixture to make 650 g in total. Immediately before application, 445 ml of an aqueous solution containing 4% chrome alum and 0.67% phthalic acid was mixed into the coating composition by means of a static mixer, and the coating composition was fed to a coating die at a rate of 8.3 ml/m².

The coating composition had a viscosity of 19 mPa.s measured at 40° C. with a Brookfield viscometer (No. 1 rotor, 60 rpm).

16) Preparation of Photothermographic Recording Materials 16-1) Preparation of Photothermographic Recording Material-1

The antihalation layer coating composition and the back side protective layer coating composition were applied simultaneously to the back side of the support with subbing layers and dried to form a back layer. The gelatin contents of the antihalation layer and the protective layer were 0.44 g/m² and 1.7 g/m², respectively.

The emulsion layer coating composition-1, the intermediate layer coating composition, the 1st protective layer coating composition, and the 2nd protective layer coating composition were simultaneously applied to the subbing layer opposite to the back layer side in this layer order from bottom to top by slide bead coating under the following conditions to form photothermographic recording material-1. The temperatures of the emulsion layer coating composition, the intermediate layer coating composition, the 1st protective layer coating composition, and the 2nd protective layer coating composition were controlled at 31° C., 31° C., 36° C., and 37° C., respectively. The coating weights of the components making up the emulsion layer were as follows.

Silver behenate 5.58 g/m²
Pigment-1 0.036 g/m²
Polyhalogen compound-1 0.12 g/m²
Polyhalogen compound-2 0.37 g/m²
Phthalazine compound-1 0.19 g/m²
SBR latex 9.98 g/m²
Reducing agent complex-1 1.41 g/m²
Development accelerator-1 0.025 g/m²
Mercapto compound-1 0.002 g/m²
Mercapto compound-2 0.012 g/m²
Silver halide (as Ag) 0.091 g-Ag/m²

Coating Conditions

The coating speed was 160 m/min. The gap between the end of the slide and the moving support was 0.10 to 0.30 mm. The vacuum chamber had a pressure 196 to 828 Pa lower than the atmospheric pressure. The support had been destaticized by antistatic cleaning with ionized air before being coated.

The applied coating was air cooled at a dry-bulb temperature of 10 to 20° C. in the subsequent chilling zone, sent by non-contact delivery to a non-contact type helical drier, where it was dried with dry air at a dry-bulb temperature 23 to 45° C. and a wet-bulb temperature 15 to 21° C. After conditioning at 25° C. ant 40 to 60% RH, the film surface was heated to 70 to 90° C. and cooled to 25° C.

The resulting photothermographic recording material-1 had a Bekk smoothness, indicative of degree of matting, of 550 seconds on the light-sensitive layer side and 130 seconds on the back side. The light-sensitive layer side surface pH was 6.0.

16-2) Preparation of Photothermographic Recording Material-2

Photothermographic recording material-2 was prepared in the same manner as for photothermographic recording material-1, except for replacing the emulsion layer coating composition-1 with the emulsion layer coating composition-2, omitting yellow dye compound-1 from the antihalation layer coating composition, and replacing the fluorosurfactants (F-1) and (F-2) used in the back side protective layer and the emulsion layer side 2nd protective layer with fluorosurfactants (F-3) and (F-4) shown below, respectively. The coating weights of the components making up the emulsion layer were as follows.

Silver behenate 5.27 g/m²
Pigment-1 0.036 g/m²
Polyhalogen compound-1 0.17 g/m²
Polyhalogen compound-2 0.28 g/m²
Phthalazine compound-1 0.18 g/m²
SBR latex 9.43 g/m²
Reducing agent-2 0.77 g/m²
Hydrogen-bonding compound-1 0.28 g/m²
Development accelerator-1 0.019 g/m²
Development accelerator-2 0.020 g/m²
Toning agent-1 0.008 g/m²
Mercapto compound-2 0.003 g/m²
Silver halide (as Ag) 0.091 g-Ag/m²

The compounds used in the preparation of photothermographic recording materials-1 and -2 are shown below.

Spectral Sensitizing Dye A

Spectral Sensitizing Dye B

Tellurium Sensitizer C

Base Precursor Compound-1

Cyanine Dye Compound-1

Blue Dye Compound-1
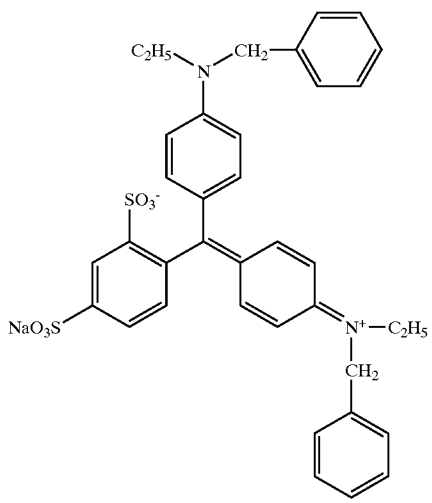
Yellow Dye Compound-1
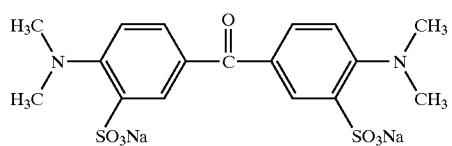
Reducing Agent Complex-1
1:1 Complex of
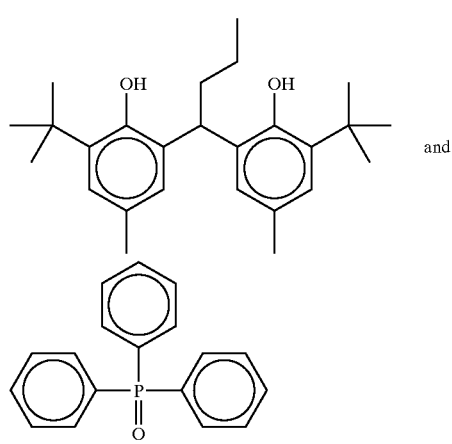 and 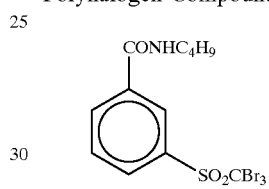
Reducing Agent-2
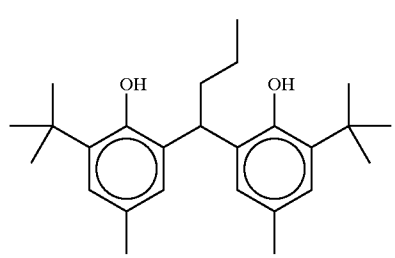
Hydrogen-bonding Compound-1
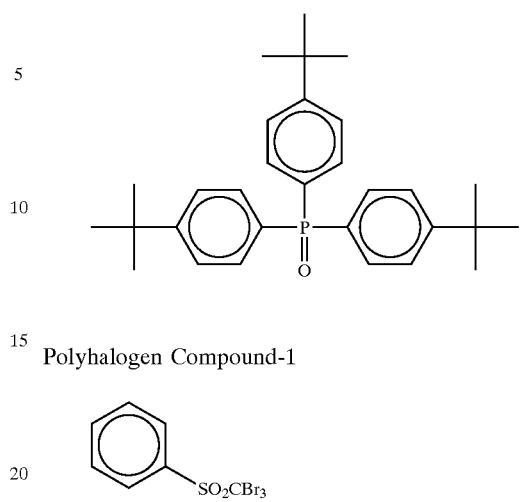
Polyhalogen Compound-1
Polyhalogen Compound-2
Mercapto Compound-1
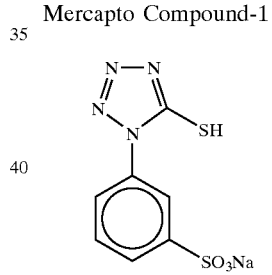
Mercapto Compound-2
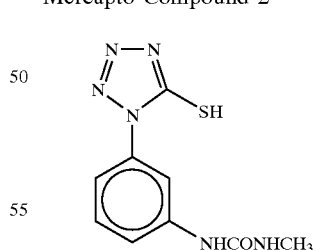
Phthalazine Compound-1
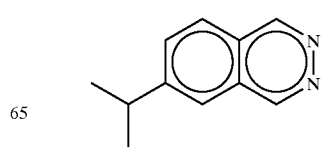

Development Accelerator-1

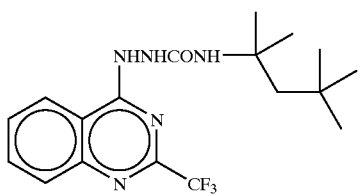

Development Accelerator-2

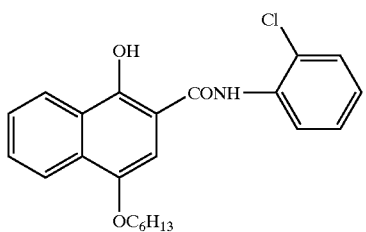

Toning Agent-1

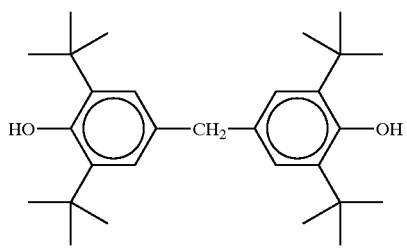

(F-1)

(mixture of n=5 to 11)

(F-2)

(mixture of n=5 to 11 and m=5 to 15)

(F-3):

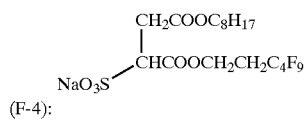

(F-4):

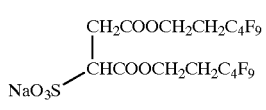

[Evaluation of Photographic Performance]

The photothermographic recording materials prepared were each cut to double legal size (356 mm by 432 mm), packaged in the following packaging material in the atmosphere of 25° C. and 50% RH, and stored at room temperature for 2 weeks. Packaging material: A composite laminate having a structure of PETP 10 µm/polyethylene 12 µm/aluminum foil 9 µm/nylon 15 µm/3% carbon-containing polyethylene 50 µm, an oxygen permeability of 0.02 ml/atm.m².25° C. day, and a moisture permeability of 0.10 g/atm.m².25° C. day.

The photothermographic recording materials were exposed and heat developed by use of Fuji Medical Dry Laser Imager FM-DP L equipped with a semiconductor laser (maximum output: 60 mW (IIIB); wavelength: 660 nm). The four panel heaters arranged in the Imager FM-DP L were set at 112° C.–119° C.–121° C.–121° C. The total processing time was 24 seconds for photothermographic recording material-1 and 14 seconds for photothermographic recording material-2. The densities of the resulting images were measured with the built-in densitometer.

It was confirmed that the same properties and effects as described above are obtained with dry imaging films DI-AL Em. No. 51151 (exp. date: Dec., 2003), available from Fuji Photo Film Co., Ltd.

The present invention provides a method of density correction in a heat developing apparatus in which a photothermographic recording material inclusive of a heat-developable light-sensitive material and a light- anf heat-sensitive recording material is thermally developed by light or heat application, the method comprising having the heat developing apparatus output a density correcting chart for setting density correcting conditions, measuring the image densities of the density correcting chart with a densitometer built in the heat developing apparatus using a monochromatic light source, and correcting density correcting conditions for image recording in the heat developing apparatus based on the measured densities, wherein the density correcting conditions are corrected by using only the densities of low to middle density areas out of the densities of low to high density areas as measured with the built-in densitometer and corrected based on the density correcting chart.

According to the density correcting method of the invention, because the density data from a high density area are not adopted, there is no difference from the visual density even where a recording material showing large scatter in red transmitted density is used or even where a recording material has undergone a change in tone.

In a preferred embodiment of the invention, densities based on a standard tone curve of the photothermographic recording material are extrapolated into the high density area. According to this embodiment, the date of the high density area are corrected to agree with the visual densities so that density correction can be made to substantially eliminate differences from the visual densities.

In a still preferred embodiment of the invention, the density value of the high density area, which is extrapolated based on the standard tone curve of the photothermographic recording material, is adapted to be corrected by a user. This embodiment provides a user-friendly density correction method, allowing a user to alter the density of the high density area at his or her own discretion.

What is claimed is:

1. A method of density correction in a heat developing apparatus in which a photothermographic recording material is thermally developed by light or heat application, comprising:

outputting a density correcting chart for setting density correcting conditions from the heat developing apparatus;

measuring the image densities of the density correcting chart with a densitometer using a monochromatic light source, and adjusting density correcting conditions for image recording in the heat developing apparatus for at least those measured densities in a predetermined density area, wherein:

said predetermined density area includes low to middle density areas measured based on the density correcting chart and excludes high density areas measured based on the density correcting chart.

2. A method according to claim 1, wherein said density correcting conditions are further adjusted by extrapolating densities of the high density area based on a standard tone curve of the photothermographic recording material.

3. A method according to claim 2, wherein the density values of the high density areas, which are extrapolated based on the standard tone curve of the photothermographic recording material, are adapted to be corrected by a user at the discretion of the user.

4. The method according to claim 1, wherein the photothermographic recording material is one of a heat developable light sensitive material and a heat sensitive recording material.

5. The method according to claim 1, wherein the densitometer is built-in to the heat developing apparatus.

6. The method according to claim 1, wherein:

the high density areas are those with densities higher than a threshold density; and the high areas are adjusted by replacing the measured image densities with the densities of a standard ton curve, which has been shifted by a sensitivity difference equal to the sensitivity difference between the measured density and the density of the standard tone curve at the threshold density.

7. A heat developing apparatus for thermally developing a photothermographic recording material by light or heat application, which comprises (1) means for outputting a density correcting chart, (2) a densitometer which measures the image densities of the density correcting chart using a monochromatic light source, and (3) means for adjusting the measured image density values by comparing those measures image density values, at least in a predetermined density area, to the known image densities supplied be the means for outputting a density correcting chart, wherein said predetermined density area includes low to middle density areas measured based on the density correcting chart, and excludes high density areas measured based on the density correcting chart.

8. The heat developing apparatus according to claim 7, which further comprises (4) means for extrapolating density values of the high density areas based on a standard tone curve of the photothermographic recording material so that said measured image density values can be further adjusted by the extrapolated density values, and (5) means for altering the density values in the high density area which allows a user to alter density values in the high density area at the discretion of the user.

9. The heat developing apparatus according to claim 7, wherein the photothermographic recording material is one of a heat developable light sensitive material and a heat sensitive recording material.

10. The heat developing apparatus according to claim 7, wherein the densitometer is built-in to the heat developing apparatus.

* * * * *